US010946976B2

(12) United States Patent
Evulet

(10) Patent No.: US 10,946,976 B2
(45) **Date of Patent: *Mar. 16, 2021**

(54) FLUIDIC PROPULSIVE SYSTEM AND THRUST AND LIFT GENERATOR FOR AERIAL VEHICLES

(71) Applicant: JETOPTERA, INC., Edmonds, WA (US)

(72) Inventor: Andrei Evulet, Edmonds, WA (US)

(73) Assignee: JETOPTERA, INC., Edmonds, WA (US)

( * ) Notice: Subject to any disclaimer, the term of this patent is extended or adjusted under 35 U.S.C. 154(b) by 209 days.

This patent is subject to a terminal disclaimer.

(21) Appl. No.: 16/221,383

(22) Filed: Dec. 14, 2018

(65) Prior Publication Data

US 2020/0023987 A1 Jan. 23, 2020

Related U.S. Application Data

(62) Division of application No. 15/256,178, filed on Sep. 2, 2016, now Pat. No. 10,207,812.

(Continued)

(51) Int. Cl.
*B64C 9/38* (2006.01)
*B64D 33/04* (2006.01)

(Continued)

(52) U.S. Cl.
CPC ................ *B64D 33/04* (2013.01); *B64C 9/38* (2013.01); *B64C 15/00* (2013.01); *B64C 15/14* (2013.01); *B64C 21/00* (2013.01); *B64C 21/04* (2013.01); *B64C 23/005* (2013.01); *B64C 39/024* (2013.01); *B64D 27/10* (2013.01); *B64D 27/18* (2013.01); *B64D 29/02* (2013.01);

(Continued)

(58) Field of Classification Search
CPC ........... B64C 21/00; B64C 21/04; B64C 9/38; B64C 2230/04; B64C 2230/16; B64C 15/00; B64C 23/005; B64D 33/04
See application file for complete search history.

(56) References Cited

U.S. PATENT DOCUMENTS 2,946,540 A * 7/1960 Coanda .................. B64C 21/04 244/15
3,051,413 A * 8/1962 Pouit .................... B64C 23/005 244/12.5

(Continued)

*Primary Examiner* — Philip J Bonzell
*Assistant Examiner* — Tye William Abell
(74) *Attorney, Agent, or Firm* — P.G. Scott Born; Foster Garvey PC

(57) ABSTRACT

A vehicle includes a main body and a gas generator producing a gas stream. At least one fore conduit and tail conduit are fluidly coupled to the generator. First and second fore ejectors are fluidly coupled to the at least one fore conduit. At least one tail ejector is fluidly coupled to the at least one tail conduit. The fore ejectors respectively include an outlet structure out of which gas from the at least one fore conduit flows. The at least one tail ejector includes an outlet structure out of which gas from the at least one tail conduit flows. First and second primary airfoil elements have leading edges respectively located directly downstream of the first and second fore ejectors. At least one secondary airfoil element has a leading edge located directly downstream of the outlet structure of the at least one tail ejector.

11 Claims, 67 Drawing Sheets

903
901
902
800
805
950
904
JetOptera

Related U.S. Application Data

(60) Provisional application No. 62/213,465, filed on Sep. 2, 2015.

(51) Int. Cl.

| | |
|---|---|
| ***B64C 39/02*** | (2006.01) |
| ***B64C 15/14*** | (2006.01) |
| ***B64C 15/00*** | (2006.01) |
| ***B64C 21/00*** | (2006.01) |
| ***B64D 27/10*** | (2006.01) |
| ***B64C 21/04*** | (2006.01) |
| ***F02K 1/36*** | (2006.01) |
| ***F02K 1/00*** | (2006.01) |
| ***F02C 3/04*** | (2006.01) |
| ***F02C 6/04*** | (2006.01) |
| ***B64C 23/00*** | (2006.01) |
| ***B64D 27/18*** | (2006.01) |
| ***B64D 29/02*** | (2006.01) |
| ***B64D 33/02*** | (2006.01) |

(52) U.S. Cl.

CPC ................ *B64D 33/02* (2013.01); *F02C 3/04* (2013.01); *F02C 6/04* (2013.01); *F02K 1/002* (2013.01); *F02K 1/36* (2013.01); *B64C 2201/10* (2013.01); *B64C 2201/104* (2013.01); *B64C 2230/04* (2013.01); *B64C 2230/16* (2013.01); *B64D 2033/0273* (2013.01); *F05D 2220/90* (2013.01); *Y02T 50/10* (2013.01); *Y02T 50/30* (2013.01); *Y02T 50/40* (2013.01)

(56) References Cited

U.S. PATENT DOCUMENTS 3,161,377 A * 12/1964 Balluff ...................... B64C 9/38 244/12.5

4,848,701 A * 7/1989 Belloso .................. B64C 9/146 244/12.5

* cited by examiner

Structure of a Quadrotor (Mechanics)

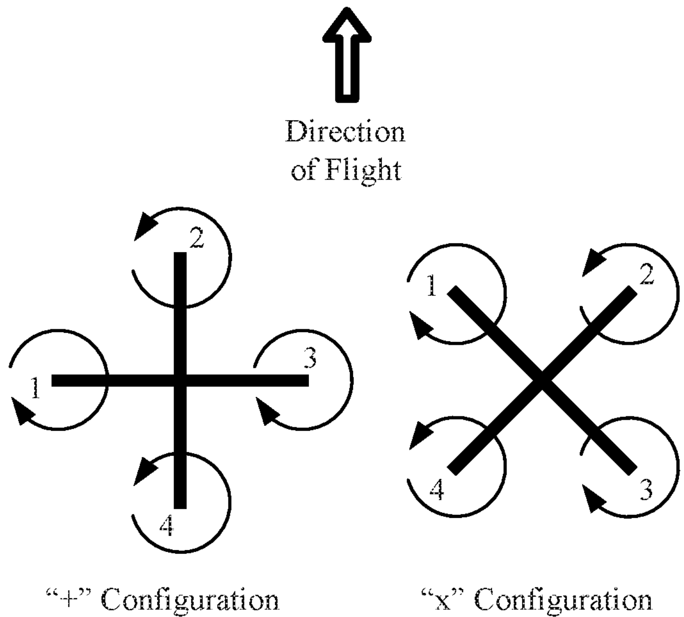

- Four equal propellers generating four thrust forces
- Two possible configurations: "+" and "x"
- Propellers 1 and 3 rotates CW, 2 and 4 rotates CCW
- Required to compensate the action/reaction effect (Third Newton's Law)
- Propellers 1 and 3 have opposite pitch w.r.t. 2 and 4, so all thrusts have the same direction

| Corrado Samoro | How does a Quadcopter fly? |
|---|---|

*Fig. 1A*

Forces and Rotation speeds

- $\omega_1$, $\omega_2$, $\omega_3$, $\omega_4$: rotation speeds of the propellers
- $T_1$, $T_2$, $T_3$, $T_4$: forces generated by the propellers
- $T_i \; \alpha \; w_i^2$: on the basis of propeller shape, air density, etc.
- $m$: mass of the quadrotor
- $mg$: weight of the quadrotor Corrado Samoro | How does a Quadcopter fly?

- W1,W2,W3,W4 motive fluid flowrates to the ejectors
- T1,T2,T3,T4 thrust forces of the ejectors
- Ti~Wi
- Motive fluid supplied by the gas generator
- The ejectors can be shaped flat instead of circular

Typical aircraft
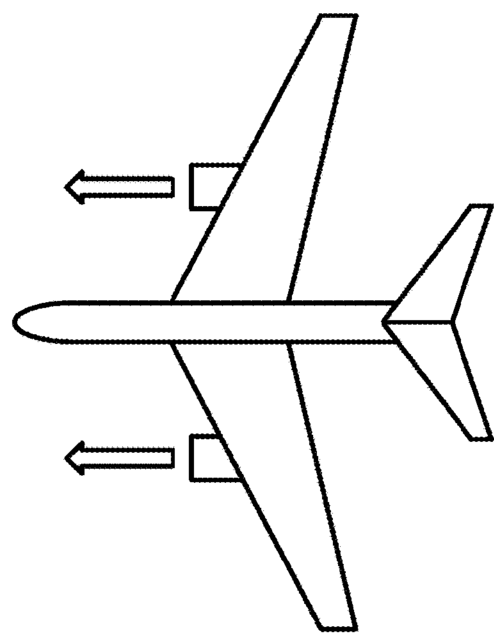
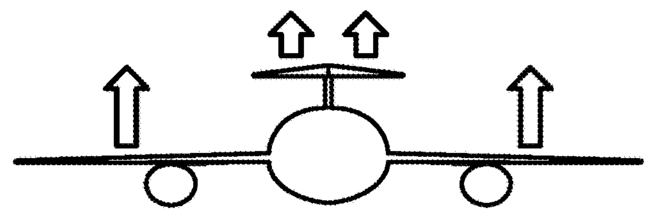
Thrust generating engines
Life generating airfoils
*Fig. 2A*
*Fig. 2B*

Lift & thrust generating system

Lift & thrust generating system

Yaw

DynView

Front

DynView

X
Y
Z

Top

DynView

Mocarski
(Prior Art)

Thorndson
(Prior Art)

Thorndson
(Prior Art)

Reznick
(Prior Art)

Simple nozzle

Primary nozzles

Primary nozzles

Typical turbofan cross section

Invented fluidic fan cross section

FLUIDIC PROPULSIVE SYSTEM AND THRUST AND LIFT GENERATOR FOR AERIAL VEHICLES

PRIORITY CLAIM

This application is a divisional of U.S. patent application Ser. No. 15/256,178, which claims priority to U.S. Provisional Application No. 62/213,465, filed Sep. 2, 2015, the entire disclosures of each of which are hereby incorporated by reference as if fully set forth herein.

COPYRIGHT NOTICE

This disclosure is protected under United States and International Copyright Laws. © 2018 Jetoptera. All rights reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Aircraft that can hover, take off and land vertically are commonly referred to as Vertical Take-Off and Landing (VTOL) aircraft. This classification includes fixed-wing aircraft as well as helicopters and aircraft with tilt-able powered rotors. Some VTOL aircraft can operate in other modes as well, such as Short Take-Off and Landing (STOL). VTOL is a subset of V/STOL (Vertical and/or Short Take-off and Landing).

For illustrative purposes, an example of a current aircraft that has VTOL capability is the F-35 Lightning. Conventional methods of vectoring the vertical lift airflow includes the use of nozzles that can be swiveled in a single direction along with the use of two sets of flat flapper vanes arranged 90 degrees to each other and located at the external nozzle. The propulsion system of the F-35 Lightning, similarly, provides vertical lifting force using a combination of vectored thrust from the turbine engine and a vertically oriented lift fan. The lift fan is located behind the cockpit in a bay with upper and lower clamshell doors. The engine exhausts through a three-bearing swivel nozzle that can deflect the thrust from horizontal to just forward of vertical. Roll control ducts extend out in each wing and are supplied with their thrust with air from the engine fan. Pitch control is affected via lift fan/engine thrust split. Yaw control is through yaw motion of the engine swivel nozzle. Roll control is provided by differentially opening and closing the apertures at the ends of the two roll control ducts. The lift fan has a telescoping "D"-shaped nozzle to provide thrust deflection in the forward and aft directions. The D-nozzle has fixed vanes at the exit aperture.

The design of an aircraft or drone more generally consists of its propulsive elements and the airframe into which those elements are integrated. Conventionally, the propulsive device in aircraft can be a turbojet, turbofan, turboprop or turboshaft, piston engine, or an electric motor equipped with a propeller. The propulsive system (propulsor) in small unmanned aerial vehicles (UAVs) is conventionally a piston engine or an electric motor which provides power via a shaft to one or several propellers. The propulsor for a larger aircraft, whether manned or unmanned, is traditionally a jet engine or a turboprop. The propulsor is generally attached to the fuselage or the body or the wings of the aircraft via pylons or struts capable of transmitting the force to the aircraft and sustaining the loads. The emerging mixed jet (jet efflux) of air and gases is what propels the aircraft in the opposite direction to the flow of the jet efflux.

Conventionally, the air stream efflux of a large propeller is not used for lift purposes in level flight and a significant amount of kinetic energy is hence not utilized to the benefit of the aircraft, unless it is swiveled as in some of the applications existing today (namely the Bell Boeing V-22 Osprey). Rather, the lift on most existing aircraft is created by the wings and tail. Moreover, even in those particular VTOL applications (e.g., take-off through the transition to level flight) found in the Osprey, the lift caused by the propeller itself is minimal during level flight, and most of the lift force is nonetheless from the wings.

The current state of art for creating lift on an aircraft is to generate a high-speed airflow over the wing and wing elements, which are generally airfoils. Airfoils are characterized by a chord line extended mainly in the axial direction, from a leading edge to a trailing edge of the airfoil. Based on the angle of attack formed between the incident airflow and the chord line, and according to the principles of airfoil lift generation, lower pressure air is flowing over the suction (upper) side and conversely, by Bernoulli law, moving at higher speeds than the lower side (pressure side). The lower the airspeed of the aircraft, the lower the lift force, and higher surface area of the wing or higher angles of incidence are required, including for take-off.

Large UAVs make no exception to this rule. Lift is generated by designing a wing airfoil with the appropriate angle of attack, chord, wingspan, and camber line. Flaps, slots and many other devices are other conventional tools used to maximize the lift via an increase of lift coefficient and surface area of the wing, but it will be generating the lift corresponding to at the air-speed of the aircraft. (Increasing the area (S) and lift coefficient (CO allow a similar amount of lift to be generated at a lower aircraft airspeed (V0) according to the formula $L=\frac{1}{2}\rho V^2 SC_L$, but at the cost of higher drag and weight.) These current techniques also perform poorly with a significant drop in efficiency under conditions with high cross winds.

While smaller UAVs arguably use the thrust generated by propellers to lift the vehicle, the current technology strictly relies on control of the electric motor speeds, and the smaller UAV may or may not have the capability to swivel the motors to generate thrust and lift, or transition to a level flight by tilting the propellers. Furthermore, the smaller UAVs using these propulsion elements suffer from inefficiencies related to batteries, power density, and large propellers, which may be efficient in hovering but inefficient in level flight and create difficulties and danger when operating due to the fast moving tip of the blades. Most current quadcopters and other electrically powered aerial vehicles are only capable of very short periods of flight and cannot efficiently lift or carry large payloads, as the weight of the electric motor system and battery may already be well exceeding 70% of the weight of the vehicle at all times of the flight. A similar vehicle using jet fuel or any other hydrocarbon fuel typically used in transportation will carry more usable fuel by at least one order of magnitude. This can be explained by the much higher energy density of the hydrocarbon fuel compared to battery systems (by at least one order of magnitude), as well as the lower weight to total vehicle weight ratio of a hydrocarbon fuel based system.

Accordingly, there is a need for enhanced efficiency, improved capabilities, and other technological advancements in aircraft, particularly to UAVs and certain manned aerial vehicles.

BRIEF DESCRIPTION OF THE DRAWING FIGURES

FIGS. 1A-1C illustrate some of the differences in structure, forces, and controls between a conventional electric quadcopter and one embodiment of the present invention.

FIG. 2A is a top view of a conventional wing and airplane structure; FIG. 2B is a front view of a conventional wing and airplane structure.

Figure 20:
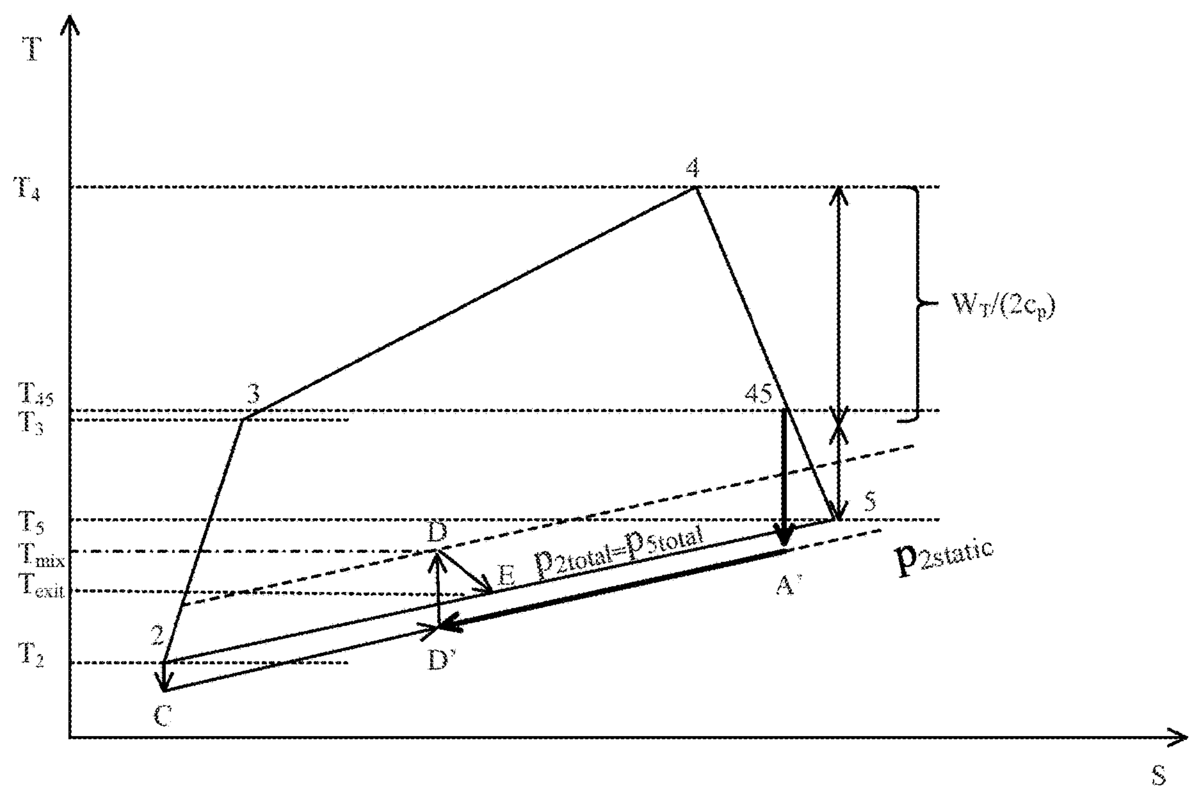

FIG. 20 explains the thermodynamics of an embodiment of the present invention.

Figure 21:
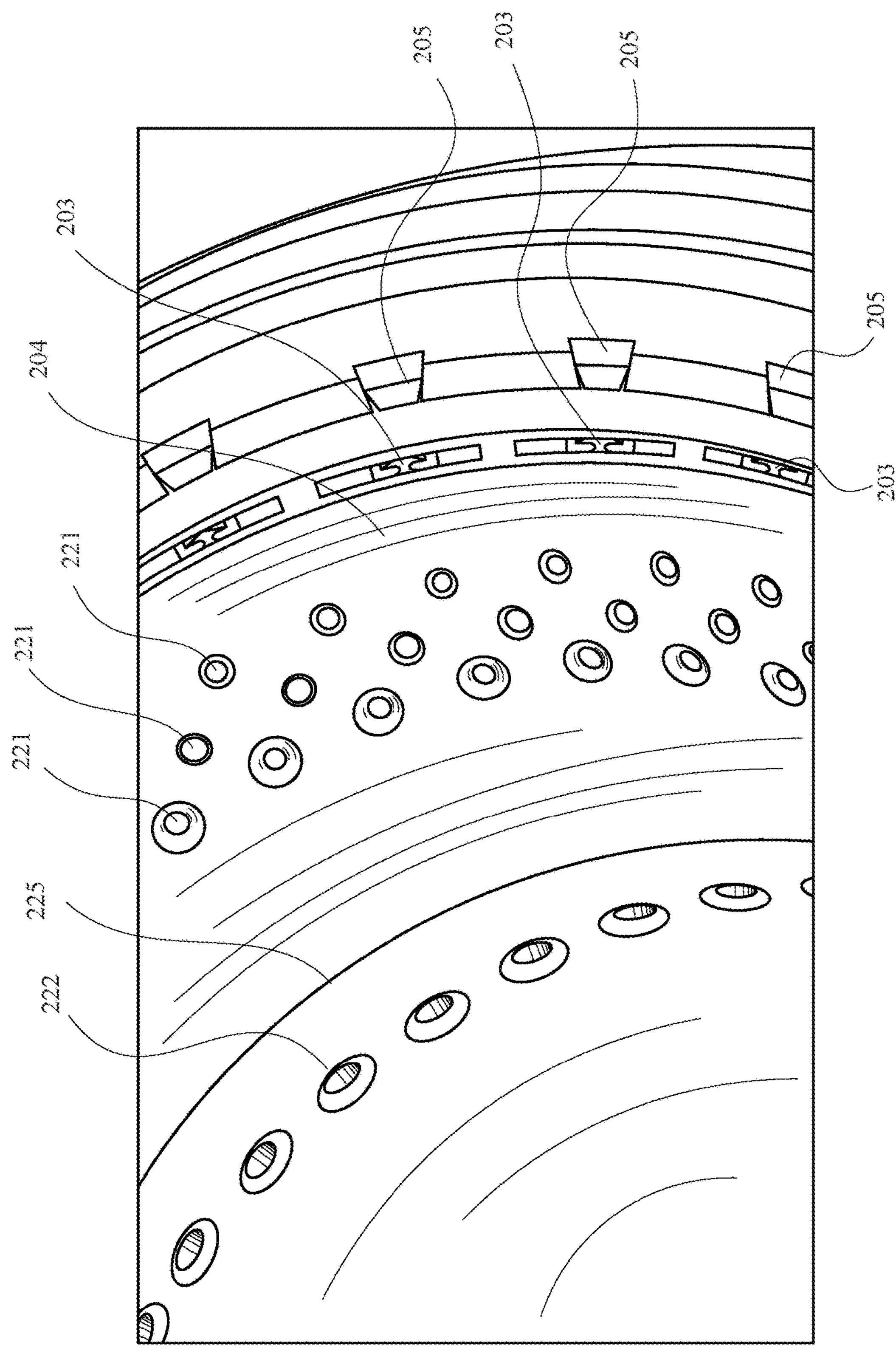

FIG. 21 is yet another embodiment of the present invention and features for improving flow separation delay.

FIG. 22A through 22F illustrate different 3D features and embodiments of the present invention.

Figure 23:
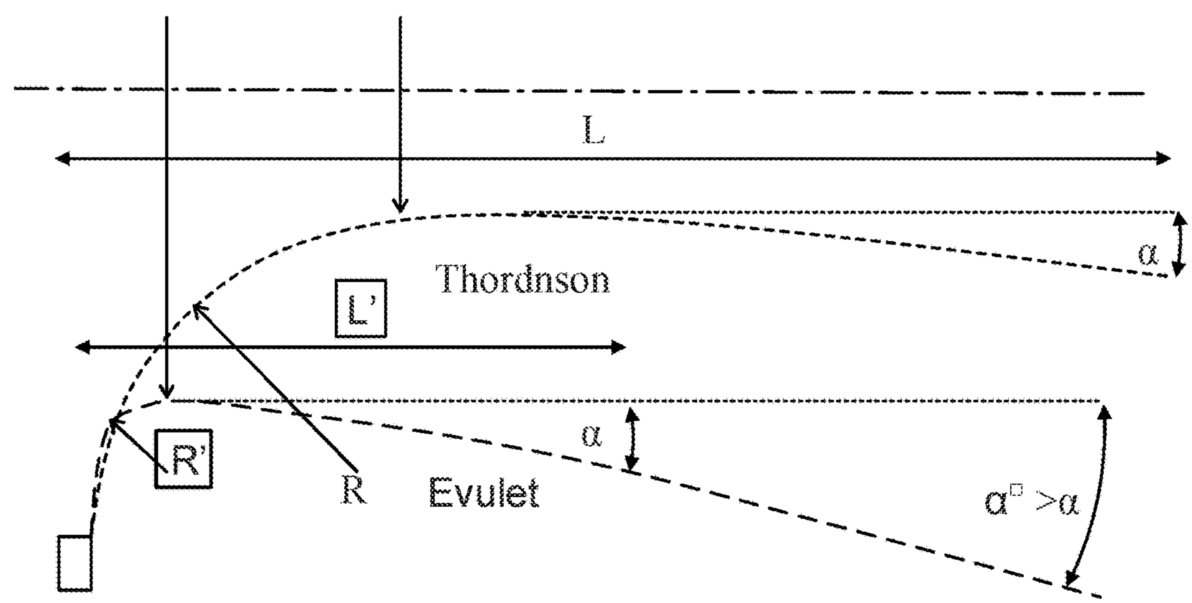

FIG. 23 illustrates certain features according to an embodiment of the present invention.

Figure 24:
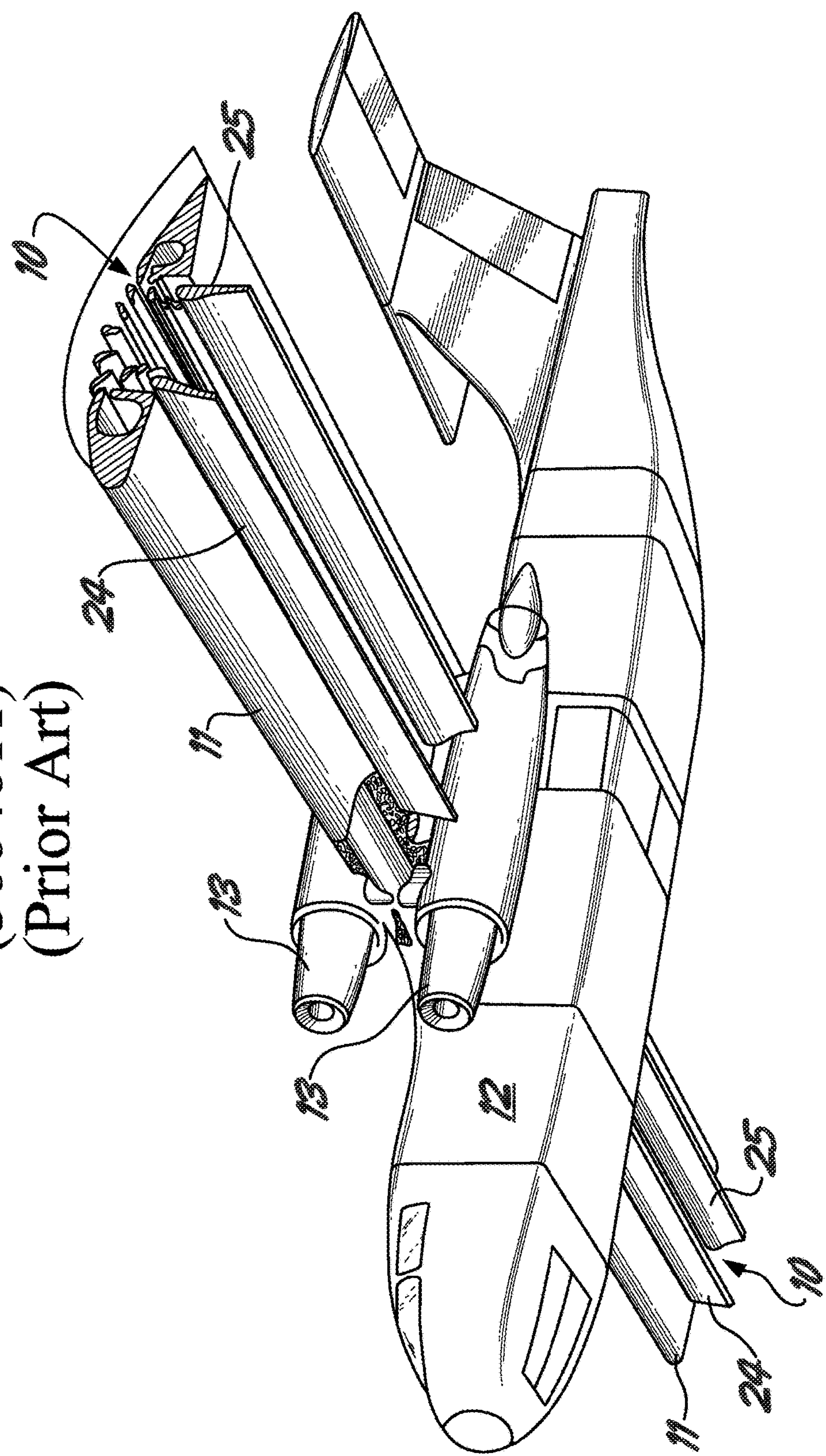

FIG. 24 demonstrates a Coanda-type ejector as applied to an aircraft for VTOL only.

Figure 25:
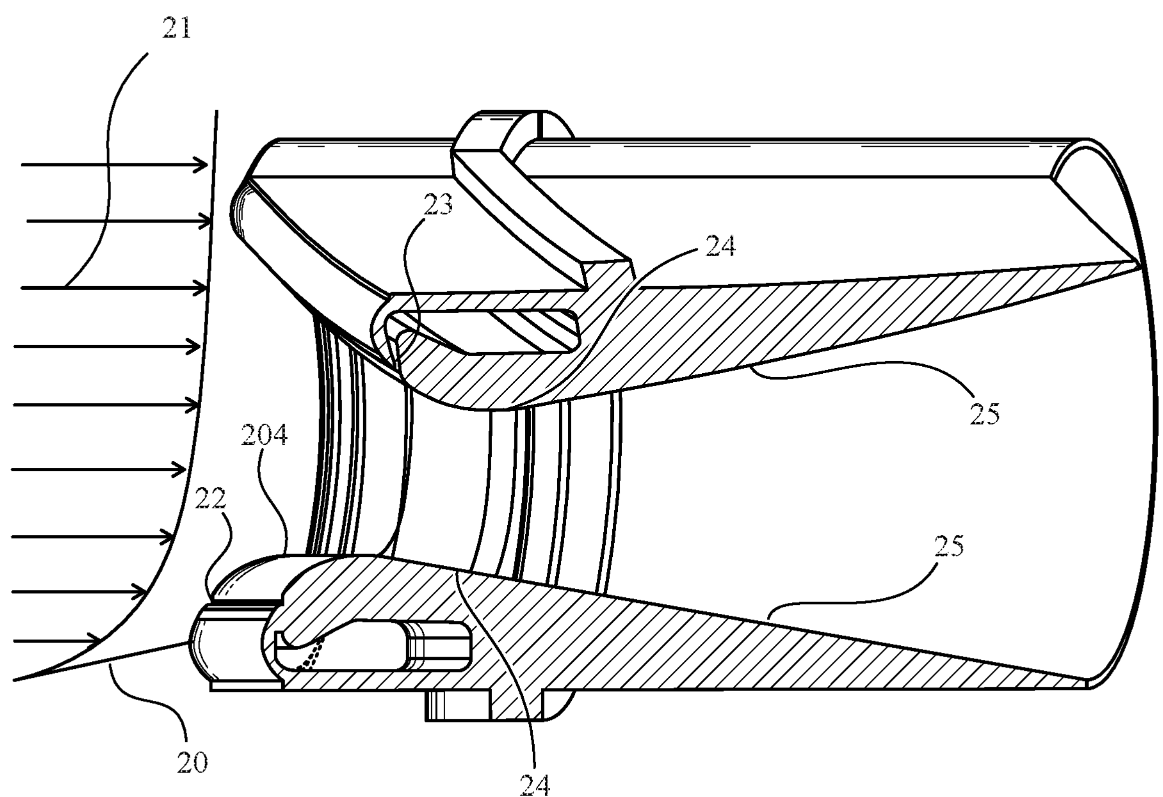

FIG. 25 shows an alternative arrangement of the ejector as another embodiment of the present invention.

Figure 26A:
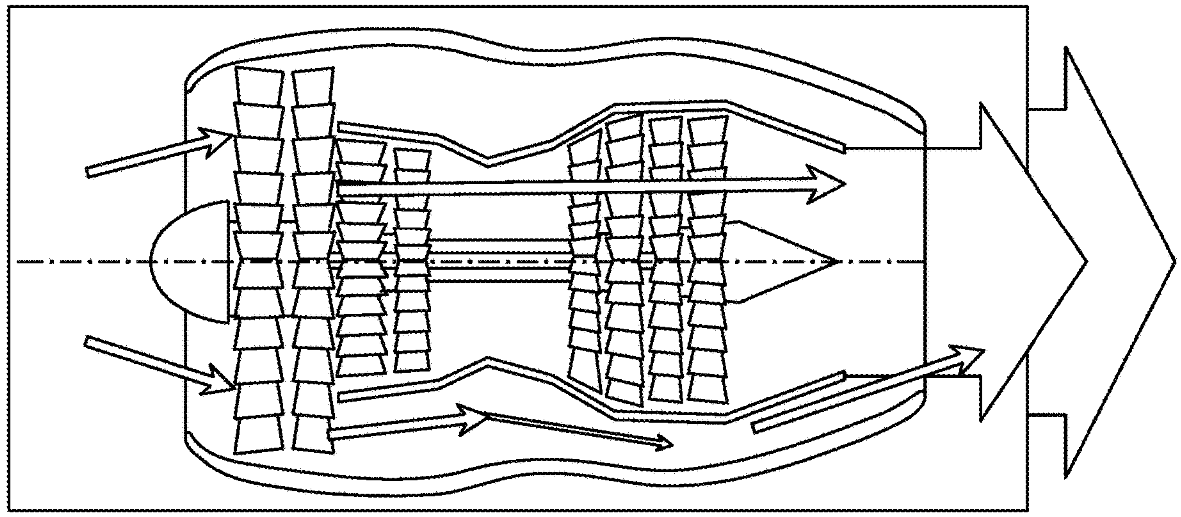

FIG. 26A shows a high-bypass turbofan.

Figure 26B:
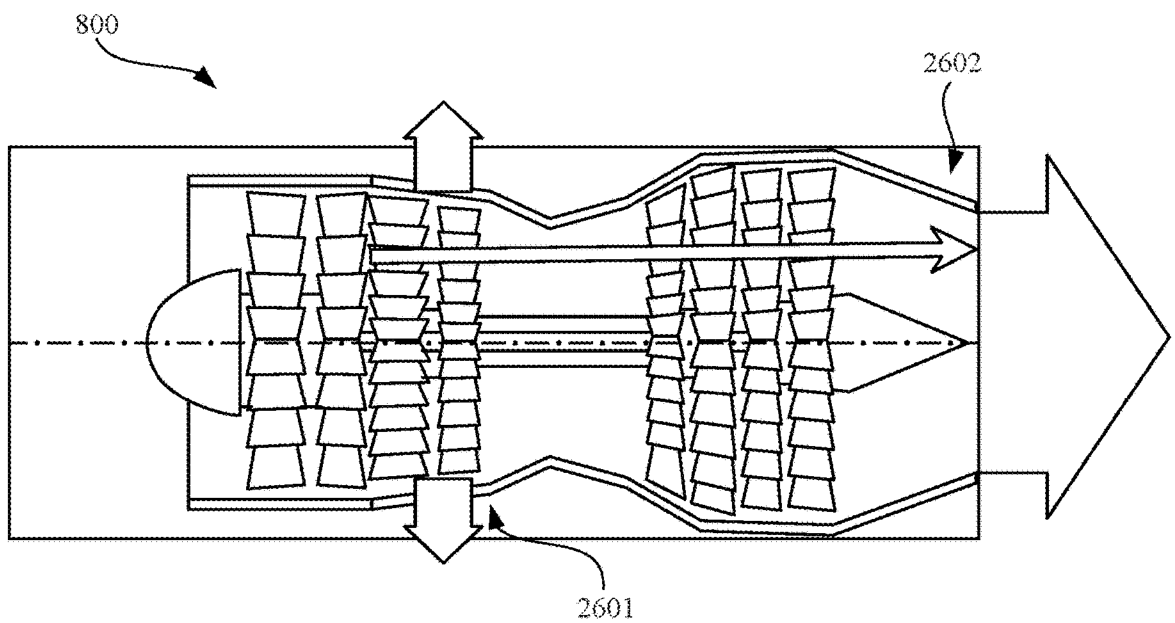

FIG. 26B shows a modified turbofan to serve as gas generator as one embodiment of the present invention.

Figure 27A:
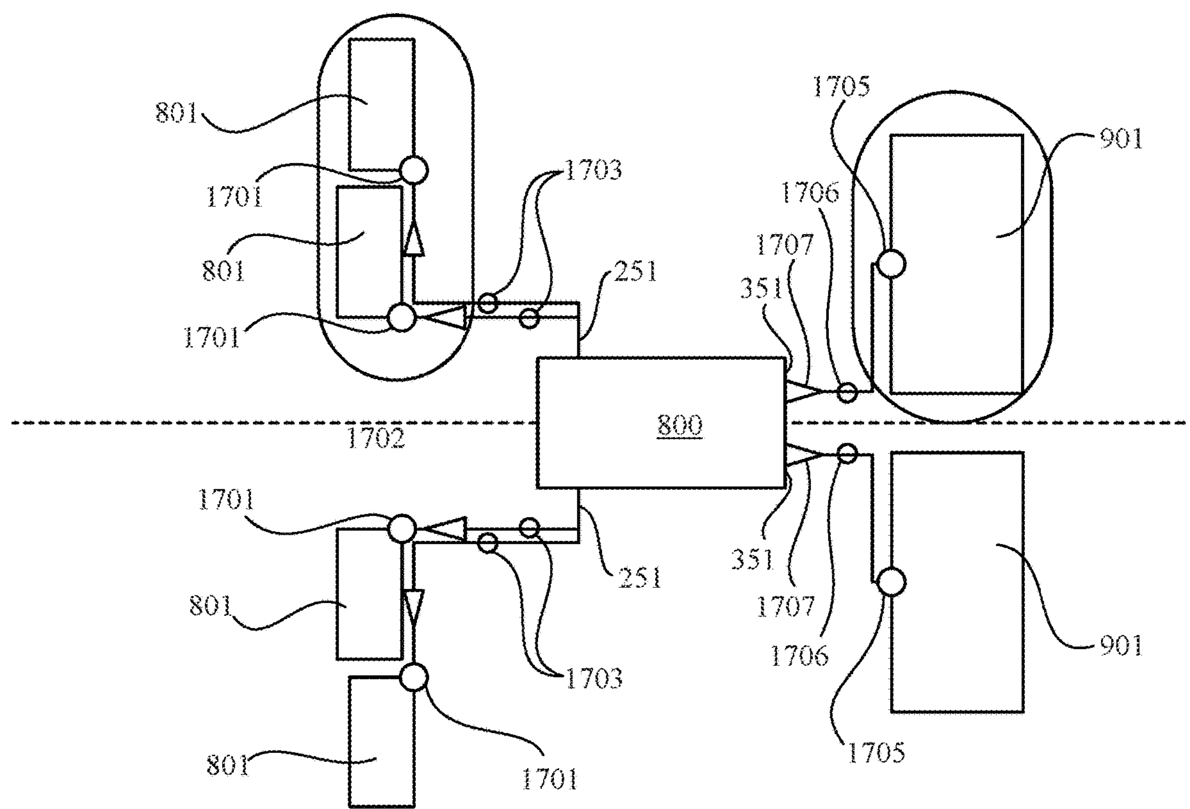

FIG. 27A is one embodiment of the present invention featuring the bleed and conduits network.

Figure 27B:
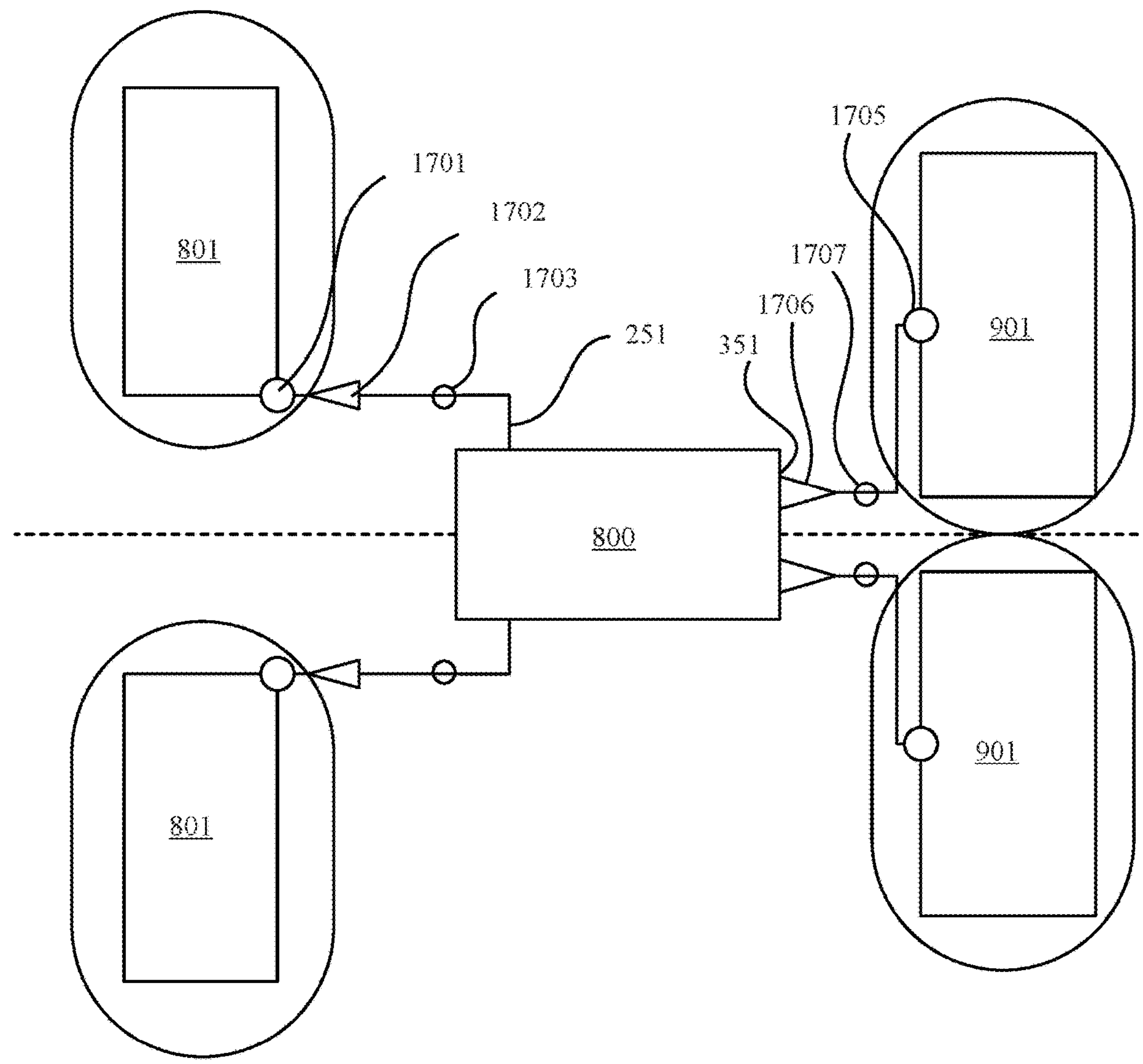

FIG. 27B is another embodiment of a bleed and conduits network.

Figure 27C:
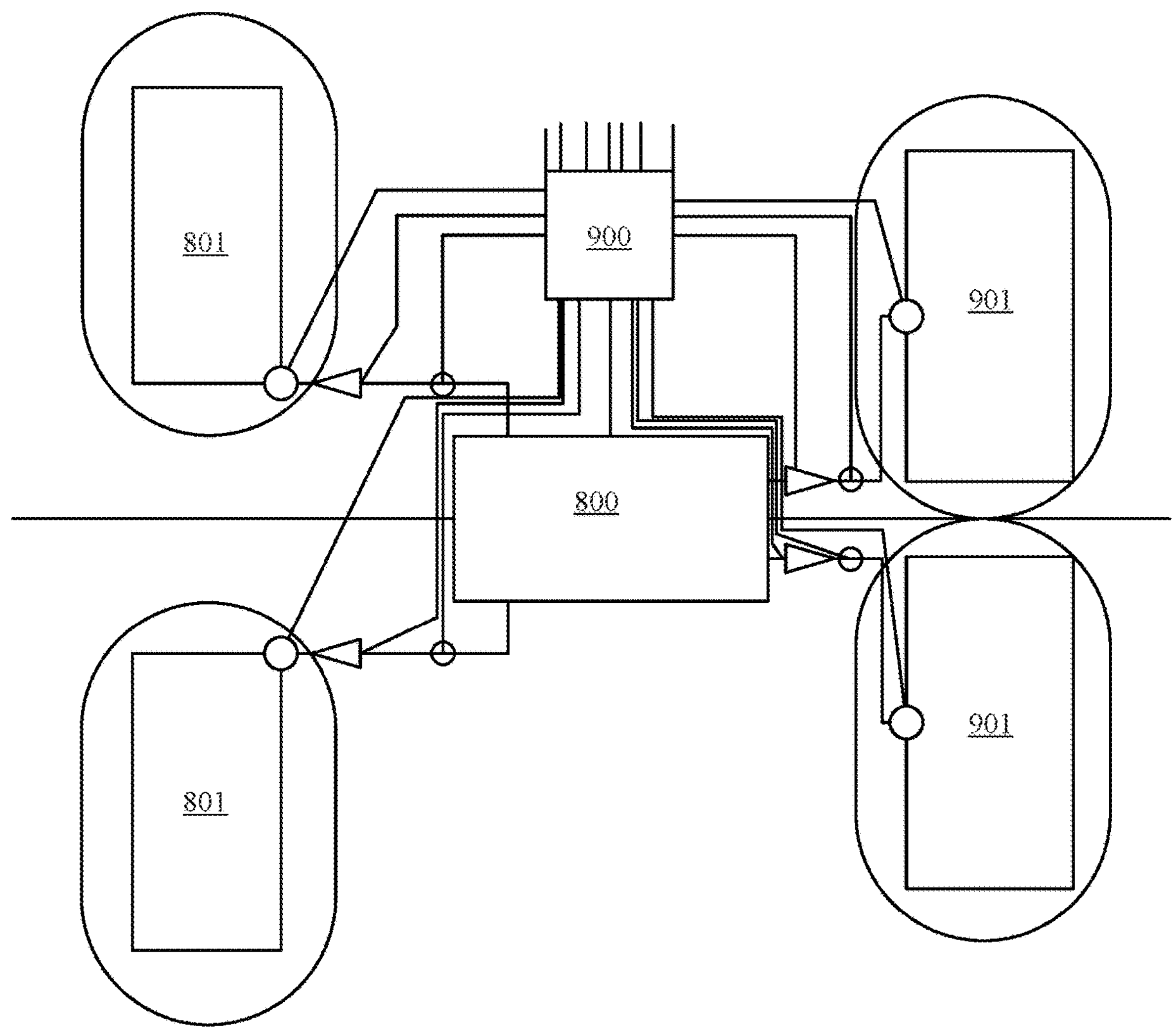

FIG. 27C is yet another embodiment of a bleed and conduits network showing the controller and sensors.

Figure 27D:
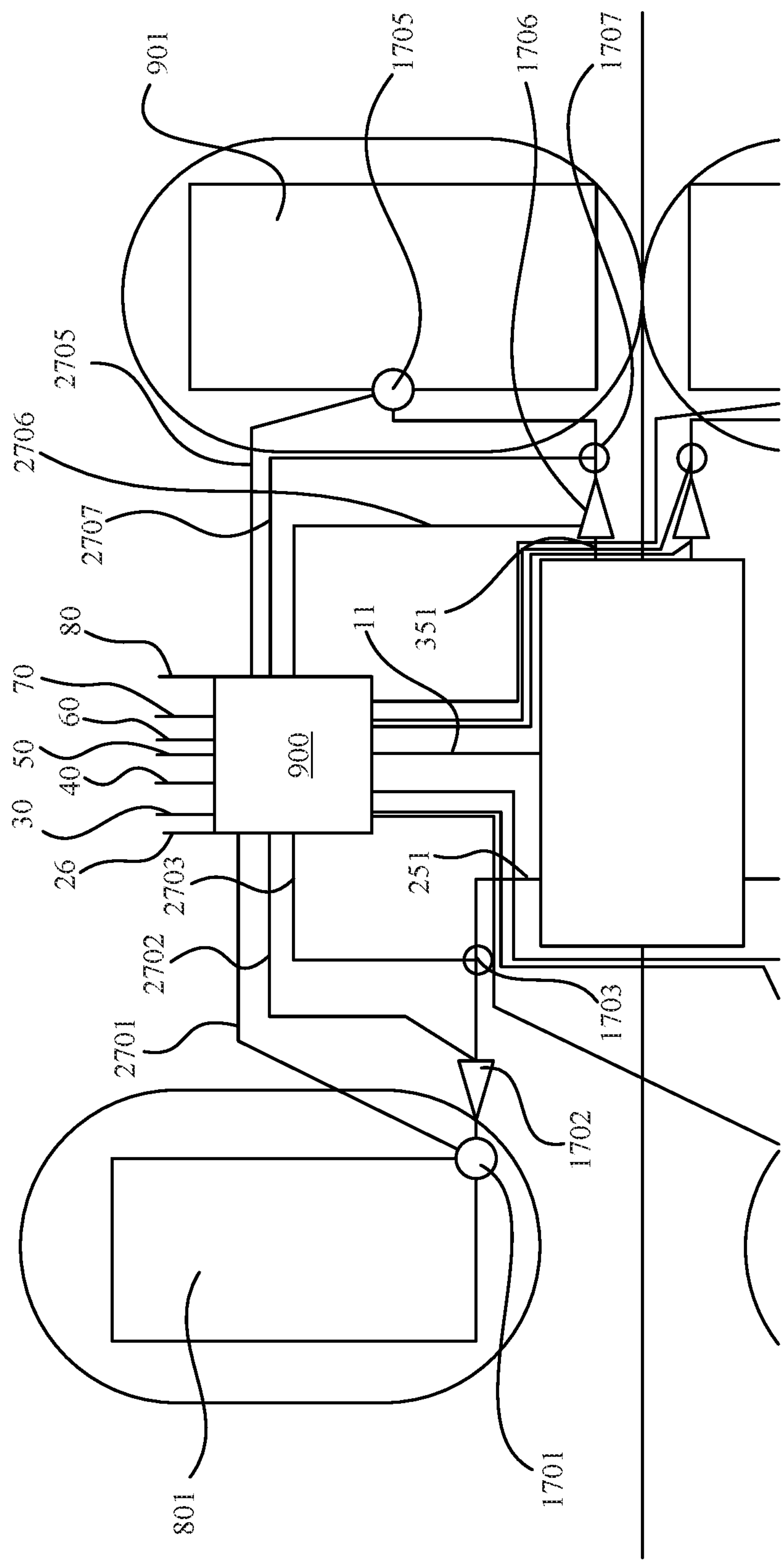

FIG. 27D is still another embodiment of a bleed and conduits network showing the controller and identified sensors.

FIGS. 28A-28E are possible shapes of propulsors of the present invention.

Figure 29:
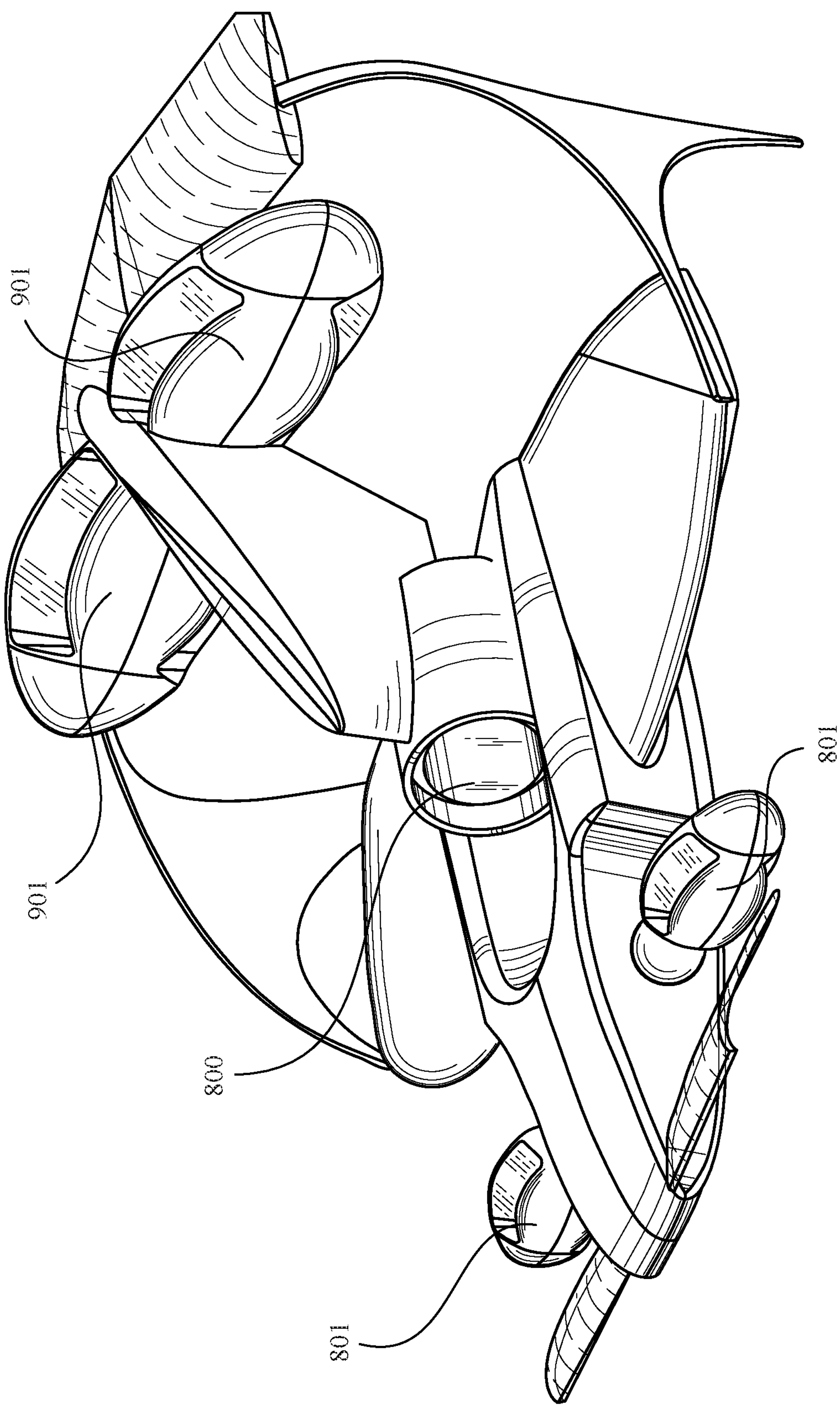

FIG. 29 is a possible arrangement of propulsion system at take-off or hovering in one embodiment of the present invention.

Figure 30A:
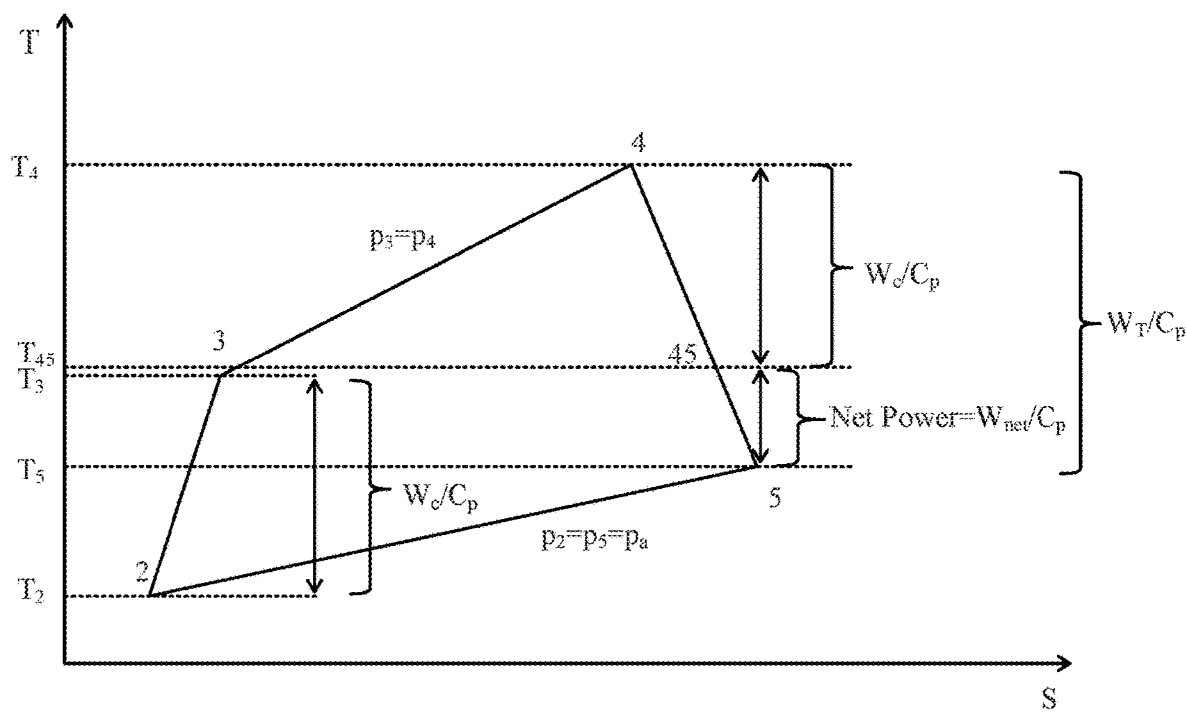
Figure 30B:
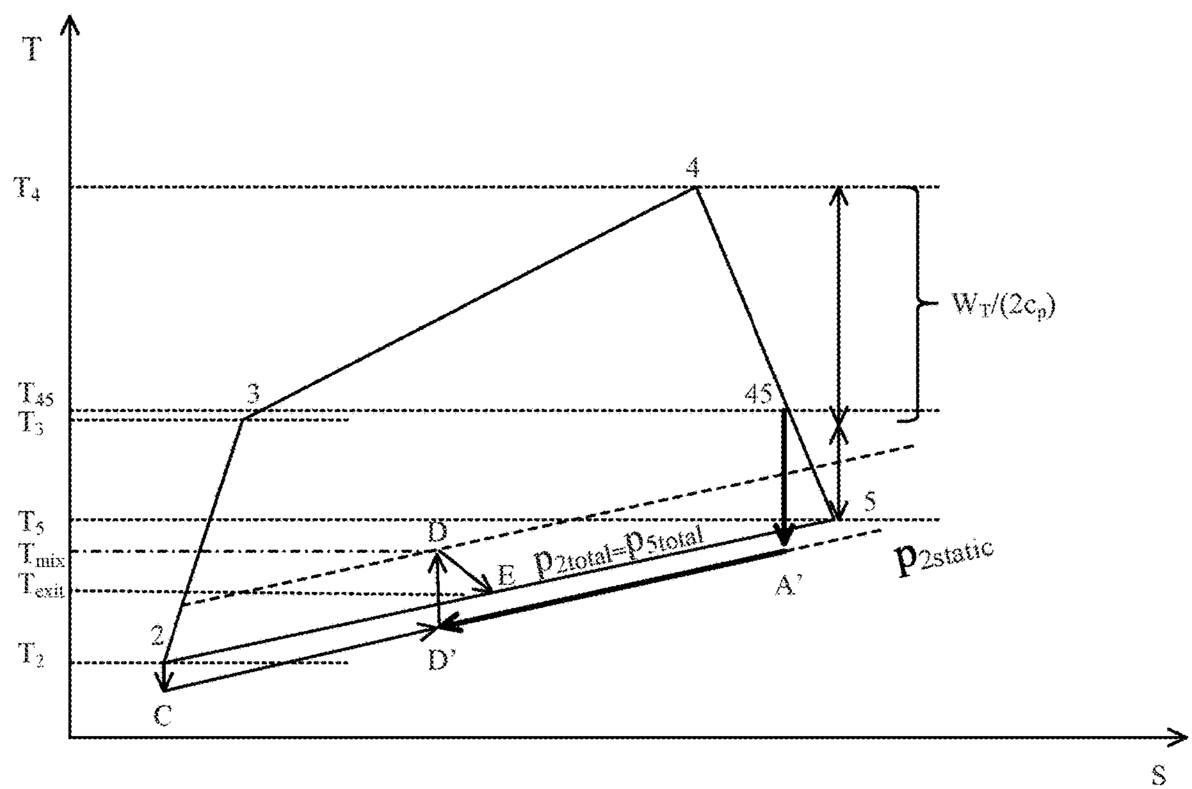

FIG. 30A-30B illustrate the thermodynamic cycles of a jet engine.

Figure 31A:
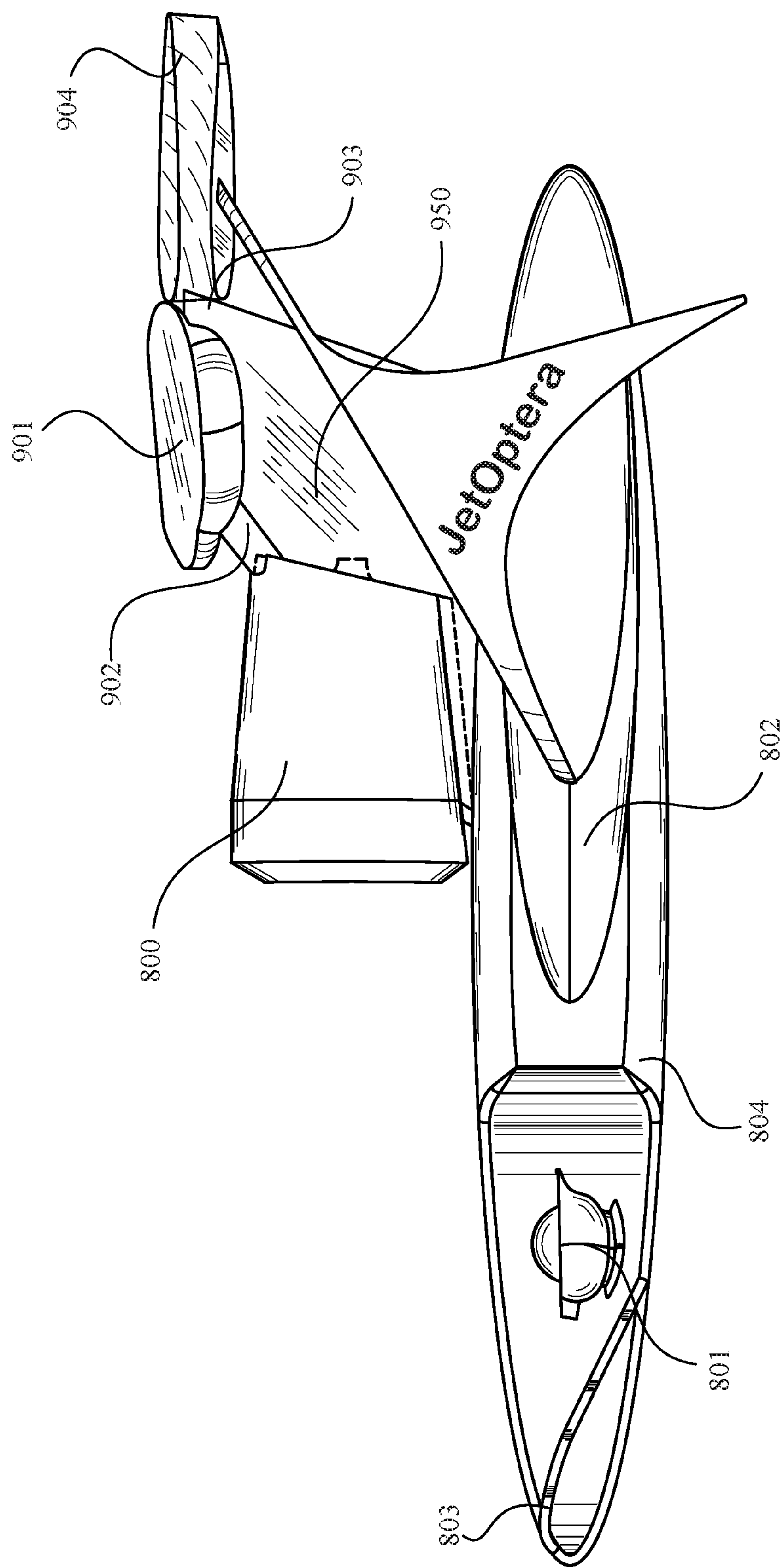
Figure 31B:
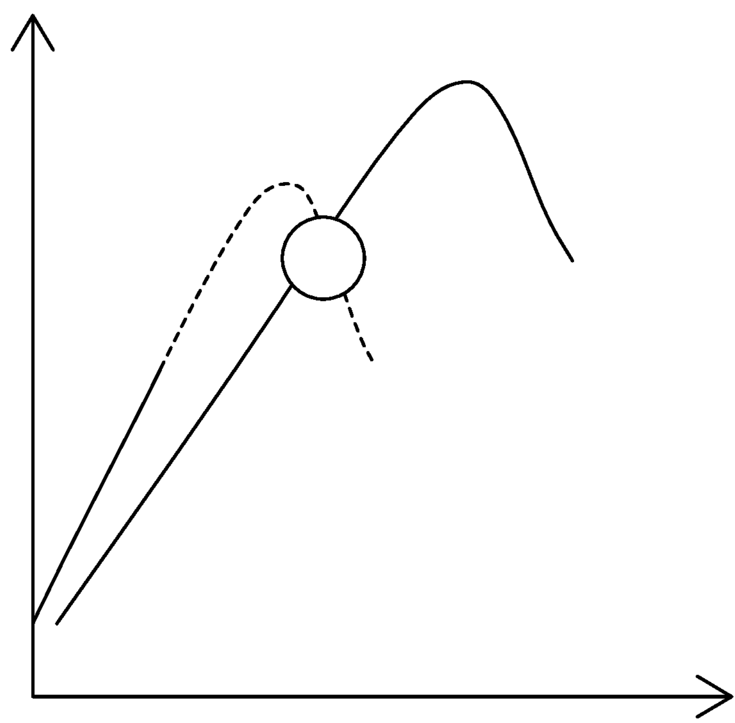

FIG. 31A-31B is one embodiment of the present invention.

DETAILED DESCRIPTION

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

Figure 1B:
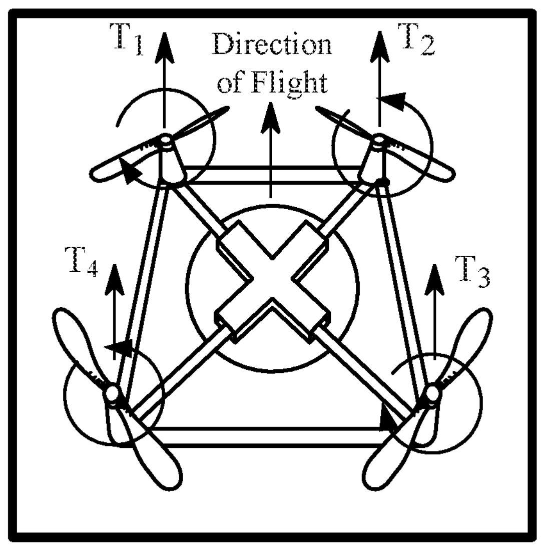
Figure 1C:
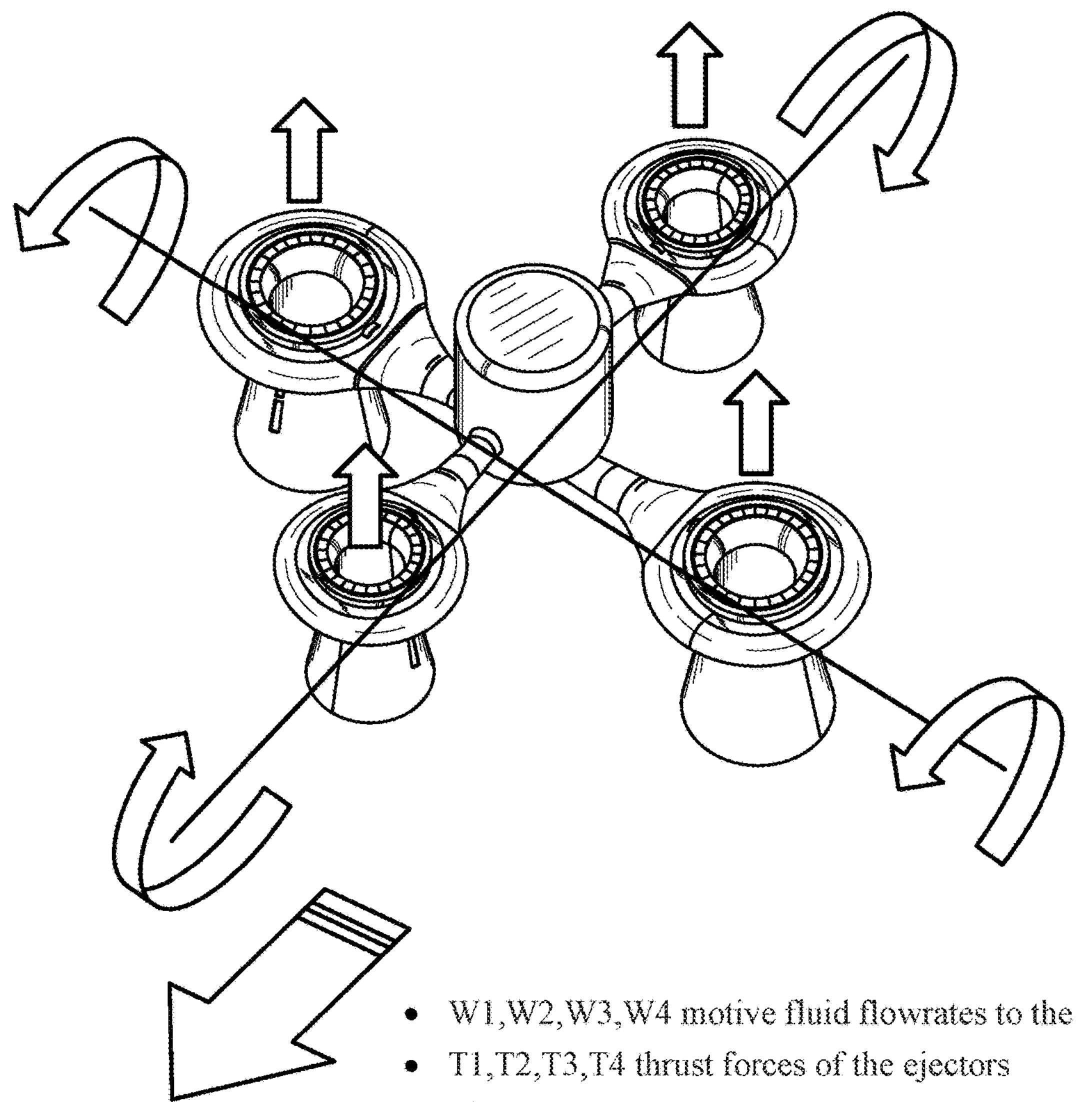

The present inventions disclosed in this application, either independently and working together, allow a UAV to perform the maneuvers of an electric UAV without the use of large propellers or fans while also maximizing the vehicle's autonomy, range, and payload to total weight ratio. The electric UAVs such as a quadcopter can hover, take-off vertically and land as such, execute loops etc. by simply controlling the rotation speed of the propellers attached to it. The present invention eliminates the need of propellers or large fans and replaces the control logic of the rotational speed of the propellers with mainly fluidic control of swiveling thrust augmenting ejectors supplied with a motive fluid from a gas generator on board of the vehicle. Non-electric UAVs employing jet engines typically do not operate at low speeds or efficiently and are limited in their maneuverability when compared to electric UAVs. FIGS. 1A through 1C illustrate some of the differences in structure, forces, and rotation speeds between a conventional electric quadcopter and a fluidic quadcopter, one of embodiments of the present invention.

The present invention introduces several elements that increase significantly the maneuverability of a non-electric UAV. For example, one embodiment of the present invention discloses a novel propulsion device (propulsor) that can be deployed on an aircraft. Another embodiment describes the novel 3D elements implemented in ejectors as part of the propulsor. Yet another embodiment discloses a tandem system combining a thrust generator (propulsor) and a thin airfoil wing (lifting element) that can both be deployed on an aircraft. Still another embodiment describes a particular tandem system that consists of an ejector nozzle and a thin airfoil placed in the nozzle's wake and uses the jet efflux from the nozzle for thrust and lift generation. Another embodiment discloses novel placement of an ejector over a wing to allow for a high angle of incidence flight. One more embodiment discloses the application of a thermodynamic cycle of the propulsion system with optionally advantageous features that increase the efficiency and reduce the overall weight of the propulsion system. Finally, another embodiment describes a thrust generating system that combines VTOL capabilities with turbo machinery and control of pitch, roll, and yaw of an aerial vehicle. Each of the aforementioned embodiments and many more embodiments of the present inventions disclosed in this application will be further explained in the following sections.

Propulsion Device and Thrust System.

FIGS. 2A and 2B describe a conventional aircraft with wing mounted engines that produce thrust, which generate acceleration and speed of the aircraft, resulting in generation of lift on the wings; the function of the engine is to create the thrust and the jet efflux from the engine is not used for further generation of lift, but it is lost to ambient. The jet efflux has a velocity higher than that of the aircraft, and as such, the lift generated by the wing is a function of the airspeed of the aircraft and not the local engine jet efflux speed, which is the object of the current application.

One embodiment of the present invention includes a propulsor that utilizes fluidics for the entrainment and acceleration of ambient air and delivers a high speed jet efflux of a mixture of the high pressure gas (supplied to the propulsor from a gas generator) and entrained ambient air in an engineered manner directly towards an airfoil placed exactly behind the propulsor, in the wake of the propulsor jet, and in a symmetrical or non-symmetrical manner.

Figure 3:
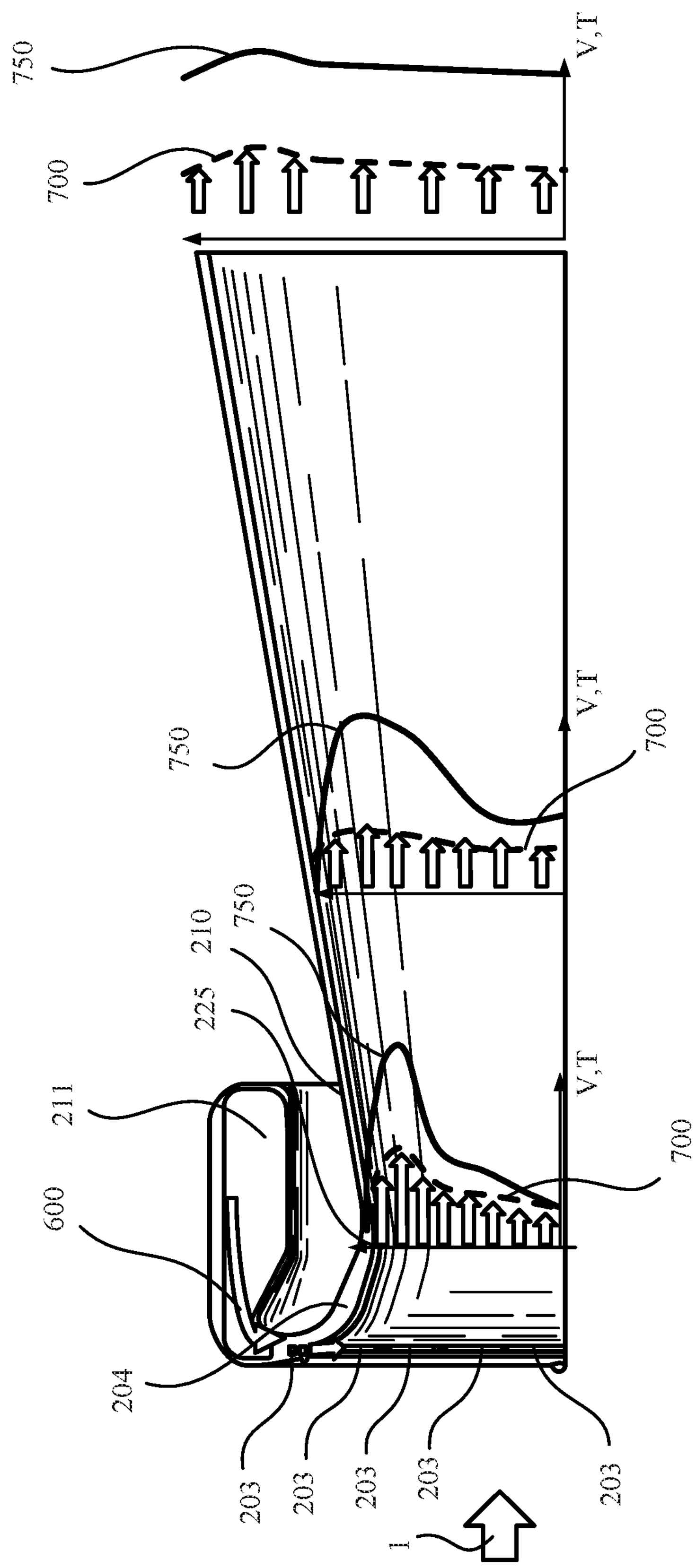
FIG. 3 is a cross-section of one embodiment of the present invention depicting only the upper half of an ejector and shows profiles of velocity and temperature within the internal flow.

FIG. 3 illustrates a cross-section of only the upper half of ejector 200. Plenum 211 is supplied with hotter than ambient air. Pressurized motive gas stream 600 communicates via conduits with primary nozzles 203 to the inner side of the ejector. The primary nozzles accelerate the motive fluid 600 to the speed required by the ejector performance, per design of the primary nozzles 203. The primary (motive) fluid 600 emerges at high speed over the Coanda surface 204 as a wall jet, entraining ambient air 1 which may be at rest or approaching the ejector at non-zero speed from the left of the figure. The mix of the stream 600 and the ambient 1 are moving purely axially at the throat section 225 of the ejector. Through diffusion in the diffuser 210, the mixing and smoothing out process continues so the profiles of temperature (750) and velocity in the axial direction (700) have no longer high and low values as they do at the throat section 225, but become more uniform at the exit of the ejector. As the mixture of 1 and 600 approaches the exit plane, the temperature and velocity profiles are almost uniform; in particular, the temperature of the mixture is low enough to be directed towards an airfoil such as a wing or control surface.

Figure 4:
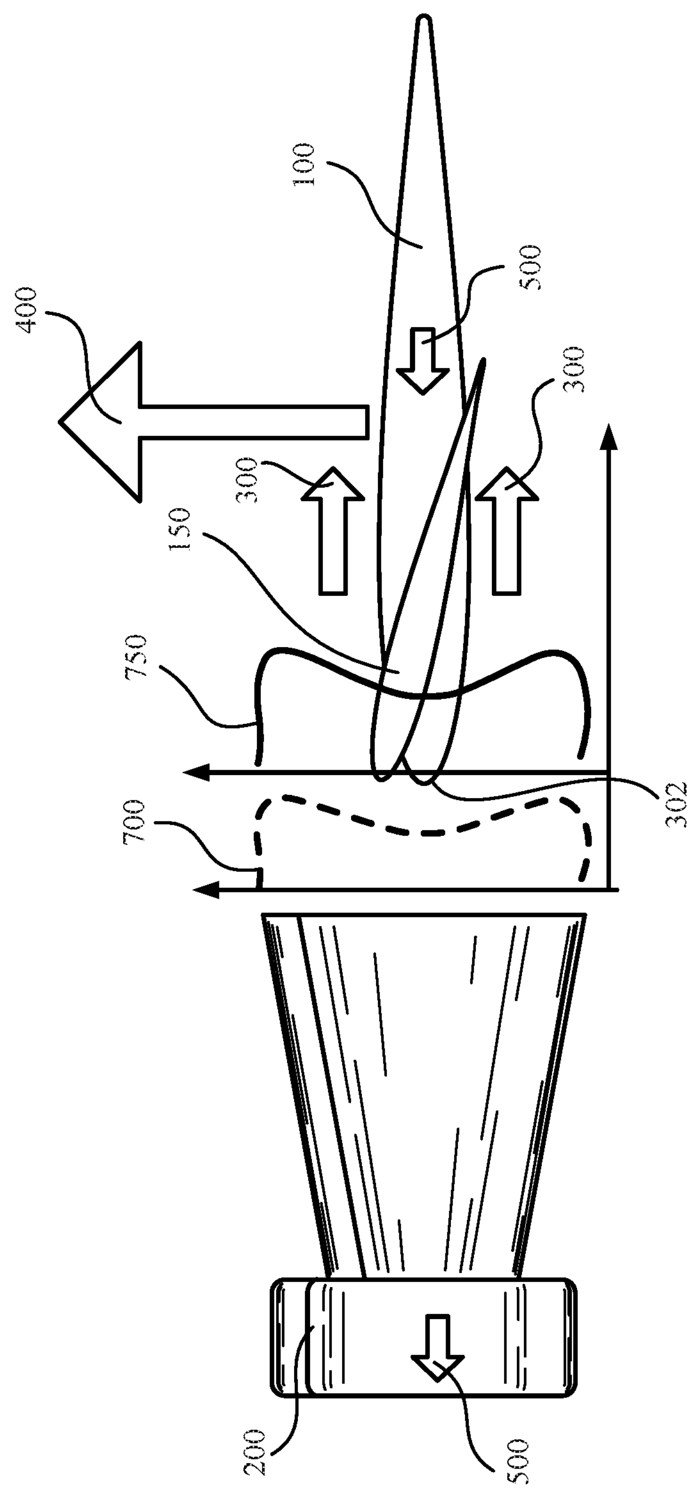
FIG. 4 is an embodiment of the present invention depicting a propulsor/ejector placed in front of an airfoil.

In FIG. 4, another embodiment of the present invention is illustrated, with the propulsor/ejector 200 placed in front of an airfoil 100 and generating a lift force 400. The local flow over airfoil 100 is at higher speed than the speed of the aircraft, due to higher velocity 300 of propulsor 200 exit jet efflux in comparison with aircraft air-speed 500. The propulsor mixes vigorously a hotter motive stream provided by the gas generator with the incoming cold ambient stream of air at high entrainment rate. The mixture is homogeneous enough to reduce the hot motive stream 600 of the ejector temperature to a mixture temperature profile 700 that will not impact the airfoils 100 or 150 mechanically or structurally. The velocity profile of the efflux jet leaving the propulsor 200 is such that it will allow more lift 400 to be generated by airfoil 100 due to higher local speeds. Additional control surfaces can be implemented on the airfoil 100, such as elevator surface 150 shown here. By changing the angle of such surfaces 150, the attitude of the aircraft can rapidly be changed with little effort given the higher local velocity of the jet efflux, 300.

Figure 5:
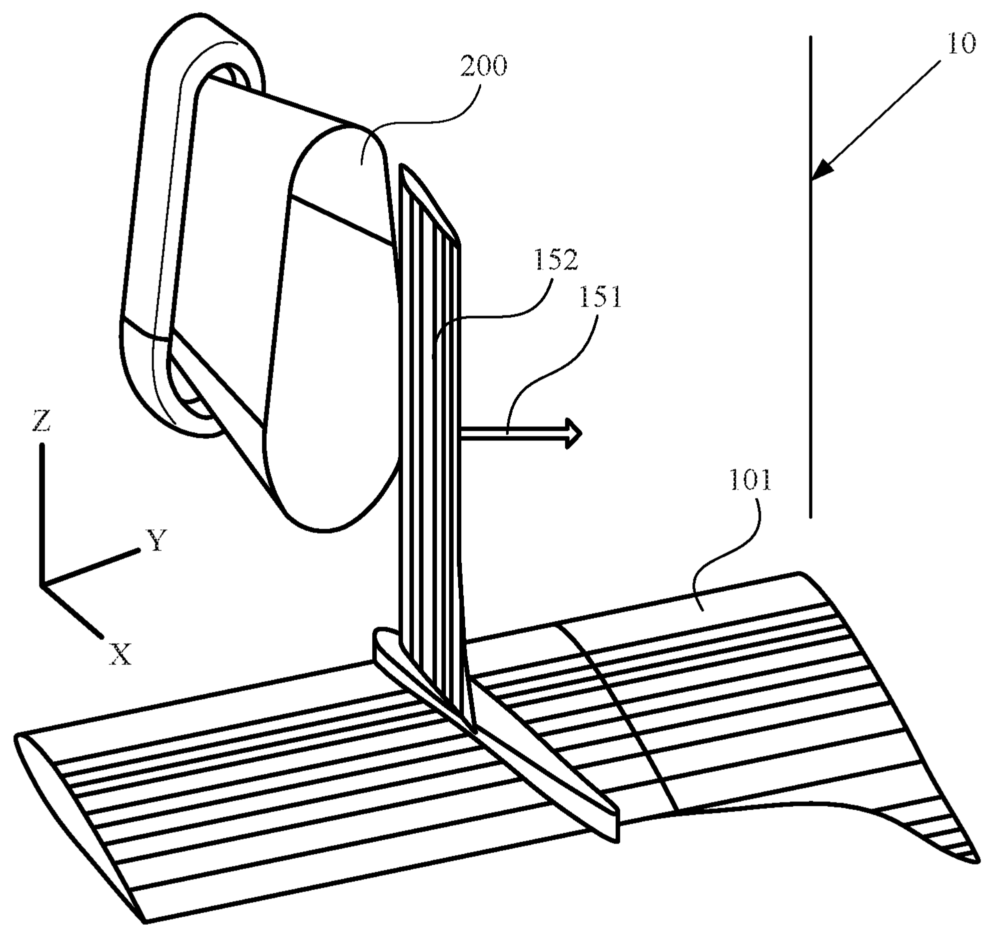
FIG. 5 is another embodiment of the present invention where the propulsor/ejector is placed in front of a control surface as part of another wing airfoil.

FIG. 5 illustrates that the propulsor/ejector 200 may also be placed in front of a control surface 152 as part of another wing airfoil 101. The propulsor may be a non-axisymmetric shape, and the control surface may be placed exactly in the wake of said propulsor 200. The propulsor mixes vigorously a hotter motive stream provided by the gas generator, with the incoming cold ambient stream of air at high entrainment rate. Similarly, the mixture is homogeneous enough to reduce the hot motive stream 600 of the ejector temperature to a mixture temperature profile that will not impact the control surface mechanically or structurally. In this embodiment, yaw can be controlled by changing the orientation of control surface 152. The propulsor 200 main function is to generate thrust but also lift or attitude control. In this embodiment, yaw control is in direction 151 creating a rotation around the aircraft axis 10.

Figure 6A:
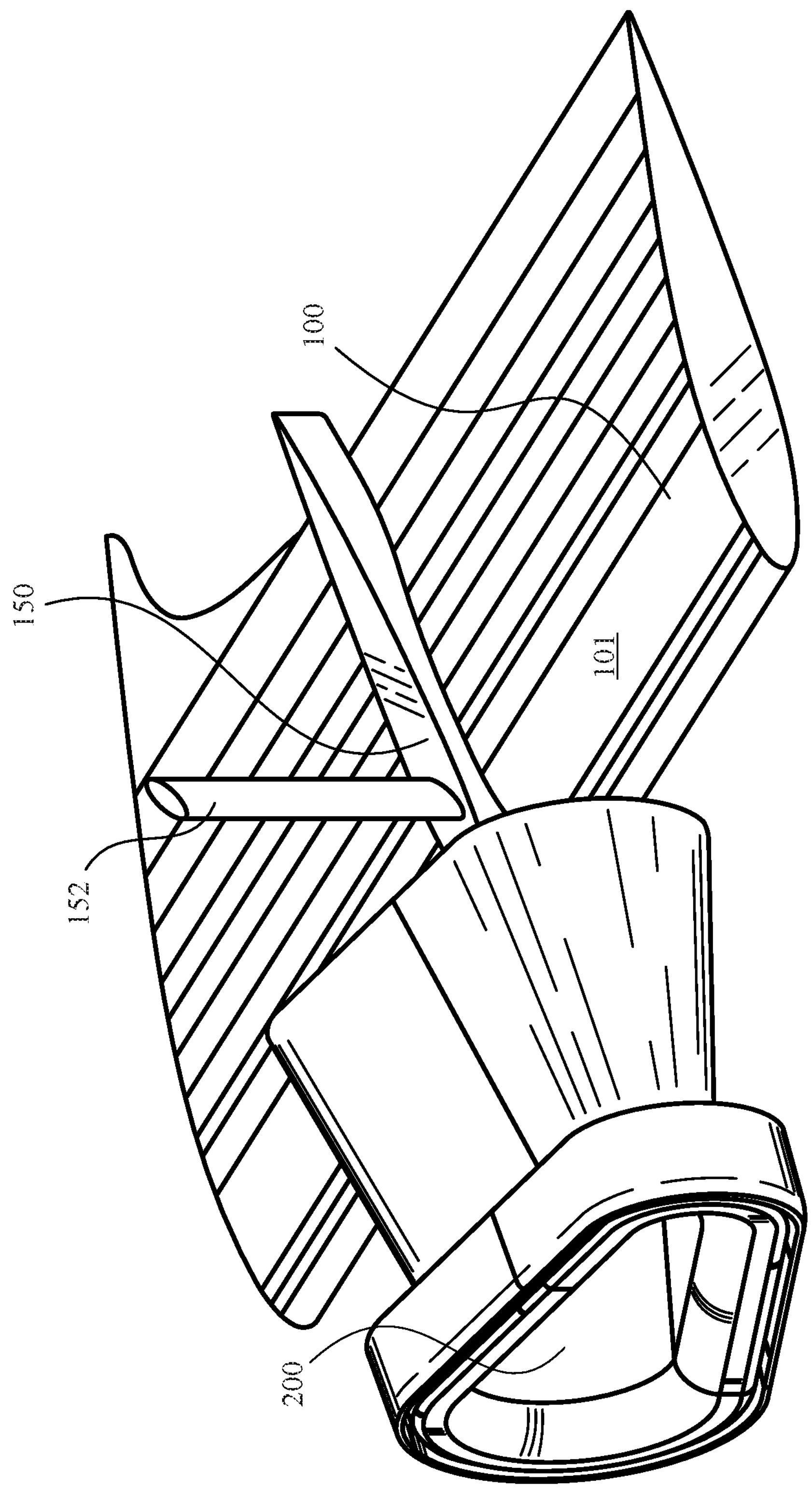
FIGS. 6A-6C illustrates the present invention shown in FIG. 5 from different points of view.
Figure 6B:
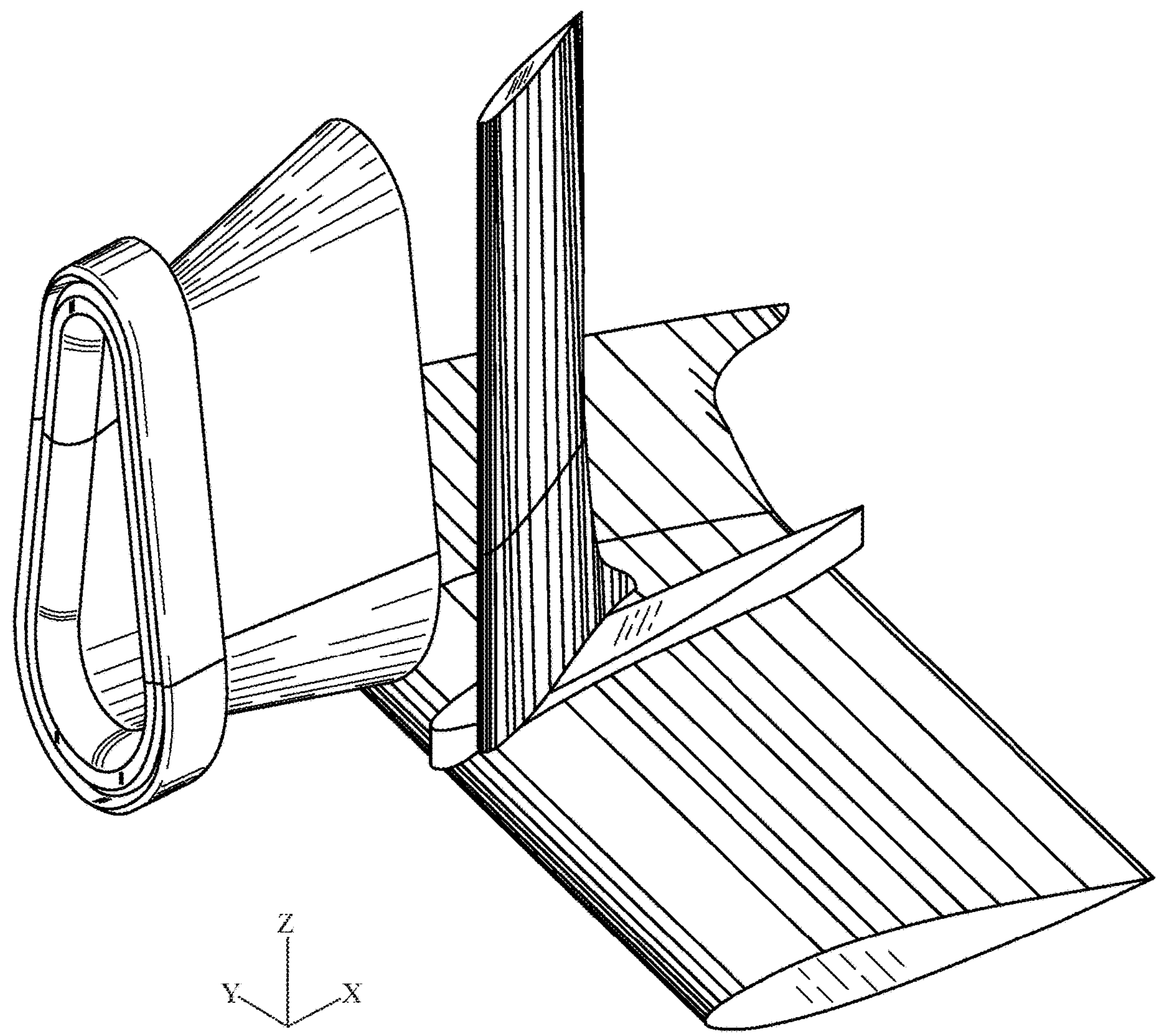
Figure 6C:
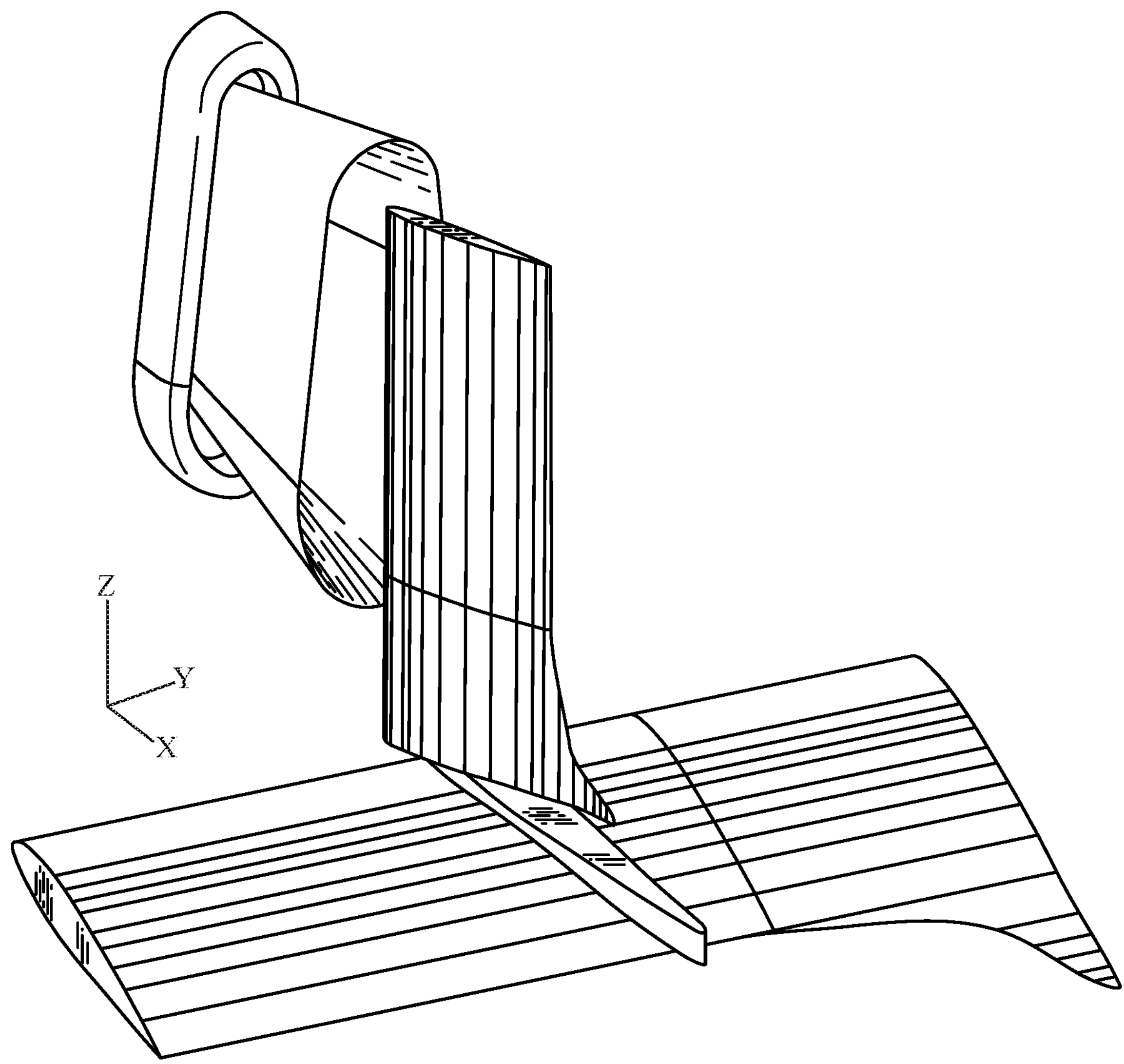

FIGS. 6A through 6C show the illustration in FIG. 5 from different points of view.

For example, an emerging jet having a rectangular pattern due to the rectangular exhaust plane of the propulsor can also be vectored much easier and in more directions than a propeller and electric motor. In another example, an emerging jet having a rectangular pattern due to the rectangular exhaust plane of the propulsor is directed towards the leading edge of a short wing placed at certain distance behind the propulsor to maximize the lift benefit. As described in the present invention, the propulsor can therefore generate the thrust necessary for the aircraft to travel forward, in the direction mostly opposite to the direction of the jet efflux. In addition, the jet efflux moving at higher speed than the aircraft's speed and resulting from said propulsor or ejector will be used to augment the lift force that results from its flow over the airfoil placed behind said propulsor or ejector. The velocity of the jet will always need to exceed the velocity of the aircraft and the difference between the two velocities will need to be minimal in order to maximize the propulsive efficiency. It follows that the higher the mass of flow providing the thrust at lower speeds, yet higher than the aircraft speed, the higher the propulsive efficiency. For example, using a propulsive efficiency equation known by those familiar with the art:

$$PE=2V0/(V+V0)$$

where V is the propulsor exit jet velocity and V0 is the airspeed of the aircraft, if the propulsion jet velocity is 150% of the aircraft airspeed, the airspeed of the aircraft will be 50% of that of the emerging jet velocity of the propulsor, and the propulsive efficiency will be 80%. After leaving the exhaust section of the propulsor of a plane, the exhaust stream of most conventional jet airplanes is lost to the environment and no benefit is drawn from the residual jet, although the jet from e.g. a jet engine still carries energy in the wake. The exhaust flow is typically a round jet at higher speeds (and therefore energy), mixing with a parallel flow at lower speed and eventually mixing with the aircraft trailing vortex pair. Once it leaves the plane engine as exhaust, the jet efflux no longer benefits the aircraft and the higher the velocity of the exhaust jet, the lower the propulsive efficiency and the waste of energy to the ambient.

One embodiment of the present invention utilizes the mixed stream that emerges from the present invention propulsor, which otherwise would be lost to ambient in conventional aircraft, to generate lift or create direction-changing capabilities by directing it straight to a thin airfoil wing or other surface placed directly behind the said propulsor, for lift generation or aircraft attitude changes. Since the supply of pressurized gas can be further modulated or used in a segmented way via a network contained by the aircraft fuselage and wings, the entrainment and velocity of the efflux jet can be dialed via primary or secondary methods. The primary method refers to the modulation of pressure, flow, temperature, and/or segmentation (multiple supplies to multiple propulsors distributed across the aircraft). The concept of segmentation involves the use of multiple propulsor elements conveniently placed throughout an aircraft, i.e. segmenting the function of a single, large propulsor into multiple smaller ones that are being supplied with the pressurized gas via a network of conduits. A secondary method may involve changing geometry or position of the propulsor with respect to the neutral position of that propulsor. For example, in level flight, supplying the appropriate gas pressure and flow to the propulsor may result in a jet efflux at 125% of the airspeed of the aircraft. In the case of a 125% jet efflux axial velocity that is greater than the aircraft airspeed, the propulsive efficiency becomes 88%. If the emerging velocity becomes 110% at higher speeds with same thrust level generated via entrainment of ambient air, then the propulsive efficiency improves to 95%.

Thrust and Lift Generator

Another embodiment of the present invention relates generally to a combination of thrust and lift obtained via a tandem system composed of a thrust generation element which directs a high speed, non-circular efflux jet with mostly axial direction velocity component over a thin airfoil located downstream of the efflux jet. The local high axial velocity of this efflux jet generates lift at considerably higher levels than the lift of the aircraft speed regular wing as ~(Jet stream Velocity)$^2$. The efflux jet is a mixture of hot, high energy gases, provided to the thrust generator via conduits from a high pressure gas generator outlet, and entrained surrounding air. The entrained air is brought to high kinetic energy level flow via a momentum transfer by the high pressure gases supplied to the thrust generator inside the thrust generating element. The resulting mixture of air and gas emerges out of the thrust generator and can be directed to point mainly in the axial, down-stream direction, towards a thin airfoil leading edge and/or the pressure side of the airfoil.

In most conventional aircraft, it is not currently possible to direct the jet efflux at an airfoil or wingfoil to utilize its lost energy. In the case of turbojets, the high temperature of the jet efflux actually precludes its use for lift generation via an airfoil. Typical jet exhaust temperatures are 1000 degrees Centigrade and sometimes higher when post-combustion is utilized for thrust augmentation, as is true for most military aircraft. When turbofans are used, in spite of the usage of high by-pass on modern aircraft, a significant non-axial direction residual element still exists, due to the fan rotation, in spite of vanes that direct the fan and core exhaust fluids mostly axially. The presence of the core hot gases at very high temperatures and the residual rotational movement of the emerging mixture, in addition to the cylindrical nature of the jets in the downwash, make the use of airfoils directly placed behind the turbofan engine impractical. In addition, the mixing length of hot and cold streams from the jet engines such as turbofans is occurring in miles, not inches. On the other hand, the current use of larger turboprops generate large downwash cylindrical airflows the size of the propeller diameters, with a higher degree of rotational component velocities behind the propeller and moving large amounts of air at lower speeds. The rotational component makes it difficult to utilize the downstream kinetic energy for other purposes other than propulsion, and hence, part of the kinetic energy is lost and not efficiently utilized. Some of the air moved by the large propellers is also directed to the core of the engine. In summary, the jet efflux from current propulsion systems has residual energy and potential not currently exploited.

In this embodiment of the present invention, the stream can be used as a lift generation stream by directing it straight to a thin airfoil for lift generation. For example, where a jet efflux axial velocity that is 125% greater than the aircraft airspeed, the portion of the wing receiving the jet efflux stream can generate more than 50% higher lift for the same wingspan compared to the case where the wingspan is washed by the airspeed of the aircraft air. Using this example, if the jet efflux velocity is increased to 150%, the lift becomes more than 45% higher than the original wing at aircraft airspeed, including a density drop effect if a pressurized exhaust gas from a turbine was used, for instance.

Alternatively, a wing such as a light wingfoil could be deployed directly behind the propulsor's ejector exit plane, immediately after the vehicle has completed the take-off maneuvers and is transitioning to the level flight, helping generate more lift for less power from the engine.

Alternatively, using this embodiment of the present invention, the wing need not be as long in wingspan, and for the same cord, the wingspan can be reduced by more than 40% to generate the same lift. In this lift equation known by those familiar with the art:

$$L=\frac{1}{2}\rho V^2 S C_L$$

where S is the surface area of the wing, p is the density, V is the velocity of the aircraft (wing), and $C_L$, is the lift coefficient. A UAV with a wingspan of e.g., 10 ft. can reduce the wingspan to merely 6 ft. provided the jet is oriented directly to the wing at all times during level flight, with a wing that is thin and has a chord, camber and $C_L$, similar to the original wing. The detrimental impact of temperature on the density is much smaller, if the mixing ratio (or entrainment ratio) is large, and hence the jet is only slightly higher in temperature.

Figure 7A:
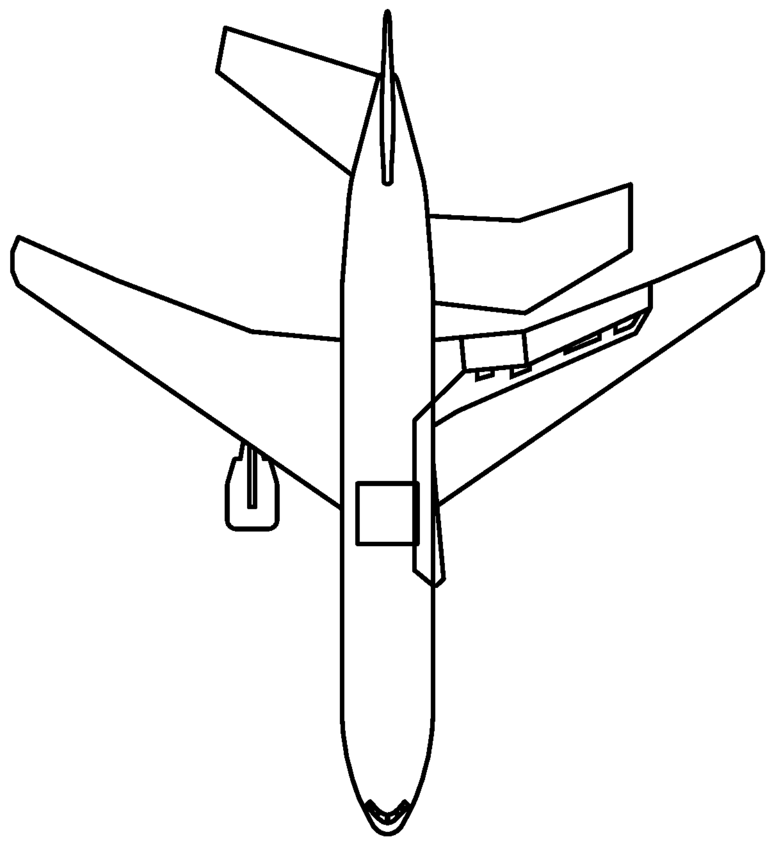
FIG. 7A is another embodiment of the present invention that utilizes a jet efflux and airfoil in its wake to push the aircraft forward and generates lift, replacing the engine on the wing.

FIG. 7A describes one alternative approach to having the jet engine placed on the wing and independently producing thrust. In FIG. 7A, the jet engine is no longer producing a jet efflux pushing the aircraft forward, but instead, is used as a gas generator and is producing a stream of motive air for powering a series of ejectors that are embedded in the wing for forward propulsion. In this embodiment, the gas generator (not shown) is embedded into the fuselage of the aircraft, and the green portion represents the inlet, the gas generator and the conduits leading to the red ejectors, which are flat and, similarly to flaps or ailerons, can be actuated to control the attitude of the aircraft in addition to providing the required thrust. FIG. 7A further depicts another (secondary) wing that is placed in tandem with the first (main) wing containing the thrust augmentation ejectors, just behind the said ejectors. The secondary wing hence receives a much higher velocity than the airspeed of the aircraft, and as such it creates a high lift force as the latter is proportional to the airspeed squared. In this embodiment of the present invention, the secondary wing will see a moderate higher temperature due to mixing of the motive fluid produced by the gas generator (also referred to as the primary fluid) and the secondary fluid, which is ambient air, entrained by the motive fluid at a rate between 5-25 parts of secondary fluid per each primary fluid part. As such, the temperature that the secondary wing sees is a little higher than the ambient temperature, but significantly lower than the motive fluid, allowing for the materials of the secondary wing to support and sustain the lift loads, according to the formula: $T_{mix}=(T_{motive}+ER*T_{amb})/(1+ER)$ where $T_{mix}$ is the final fluid mixture temperature of the jet efflux emerging from the ejector, ER is the entrainment rate of parts of ambient air entrained per part of motive air, $T_{motive}$ is the hotter temperature of the motive or primary fluid, and $T_{amb}$ is the approaching ambient air temperature.

Figure 7B:
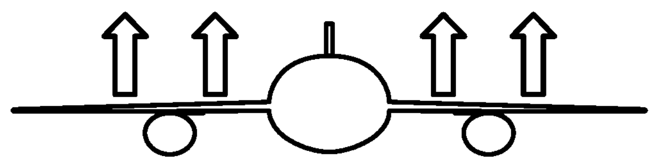
FIG. 7B is the front view of the present invention shown in FIG. 7A.

FIG. 7B depicts the front view of the aircraft shown in FIG. 7A with arrows illustrating the additional lift force generated by the shorter, tandem wings and lack of engines on the wing.

Figure 7C:
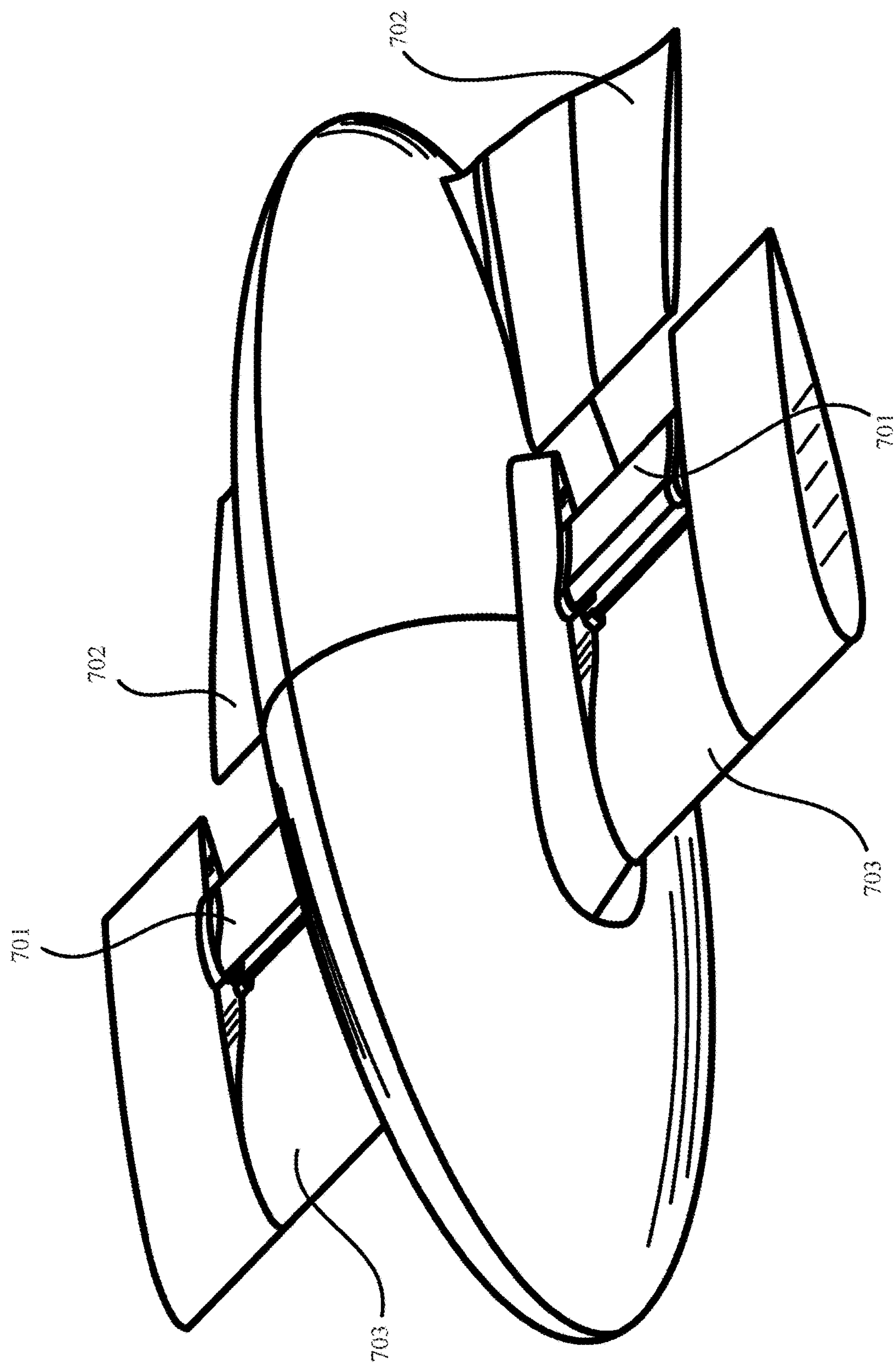
FIG. 7C is another embodiment of the present invention that features tandem wings.

FIG. 7C depicts another embodiment of the present invention featuring the tandem wings. In this embodiment, the thrust augmenting ejectors 701 that are part of the propulsor system are placed on the main wings (forward wings) 703 and connected via conduits and receive the motive fluid from a gas generator placed inside the fuselage. The ejector generates the thrust and transmits the force mechanically to the aircraft. The efflux jet generates a constant stream of high velocity which is used by the secondary wing (grey wing) 702 for producing additional lift. The combination of the two shorter wings produce more lift than that of a much larger wingspan wing lacking the ejector thrust augmenters that rely on a jet engine attached to said larger wing to produce thrust.

Figure 8A:
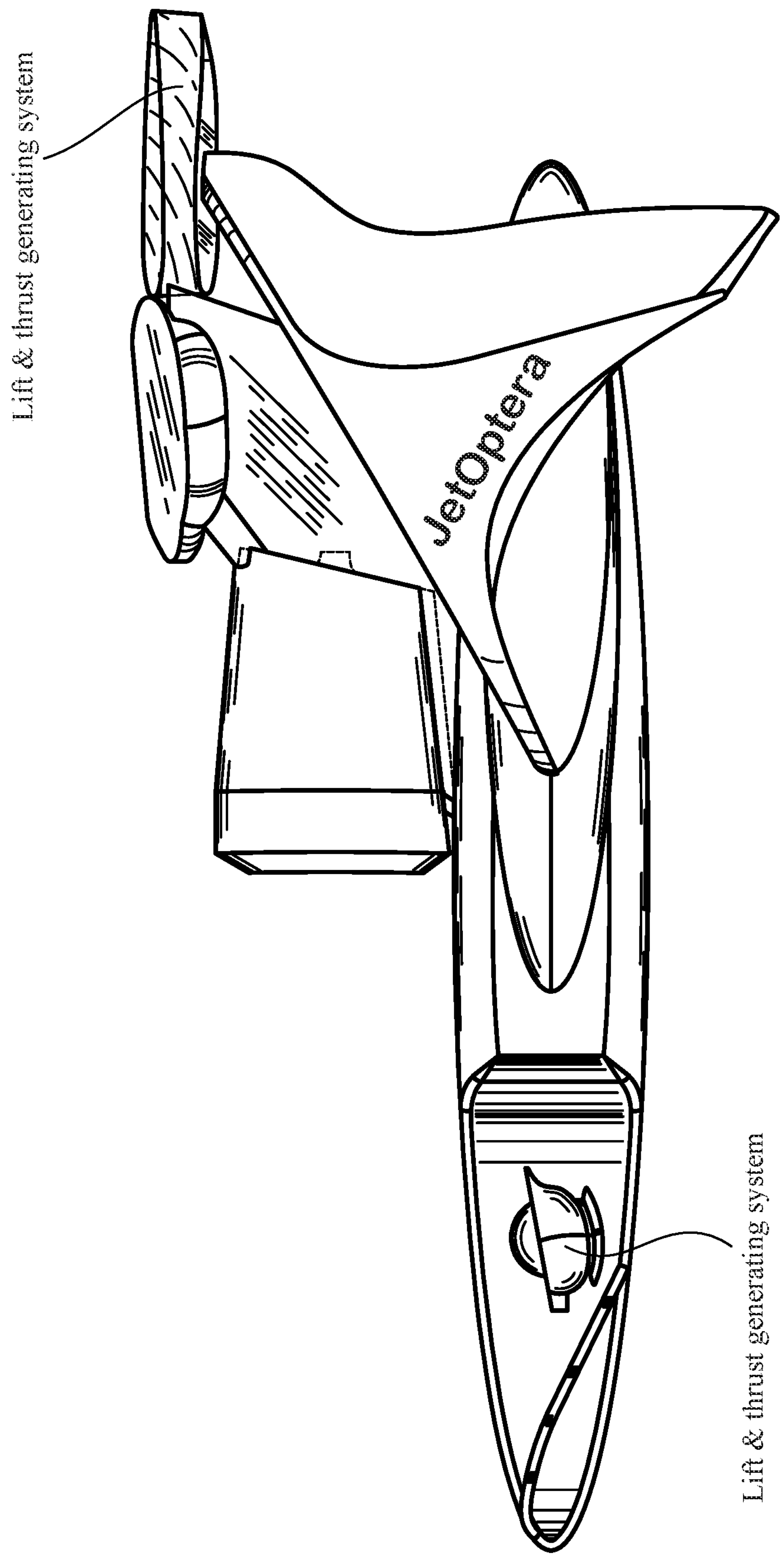
FIG. 8A is a side view of another embodiment of the present invention, featuring the tandem thrust/lift generation system where the front thrust augmenting ejectors are producing thrust with a canard wing and the rear thrust augmenting ejectors are producing thrust and lift in the aft region.
Figure 8B:
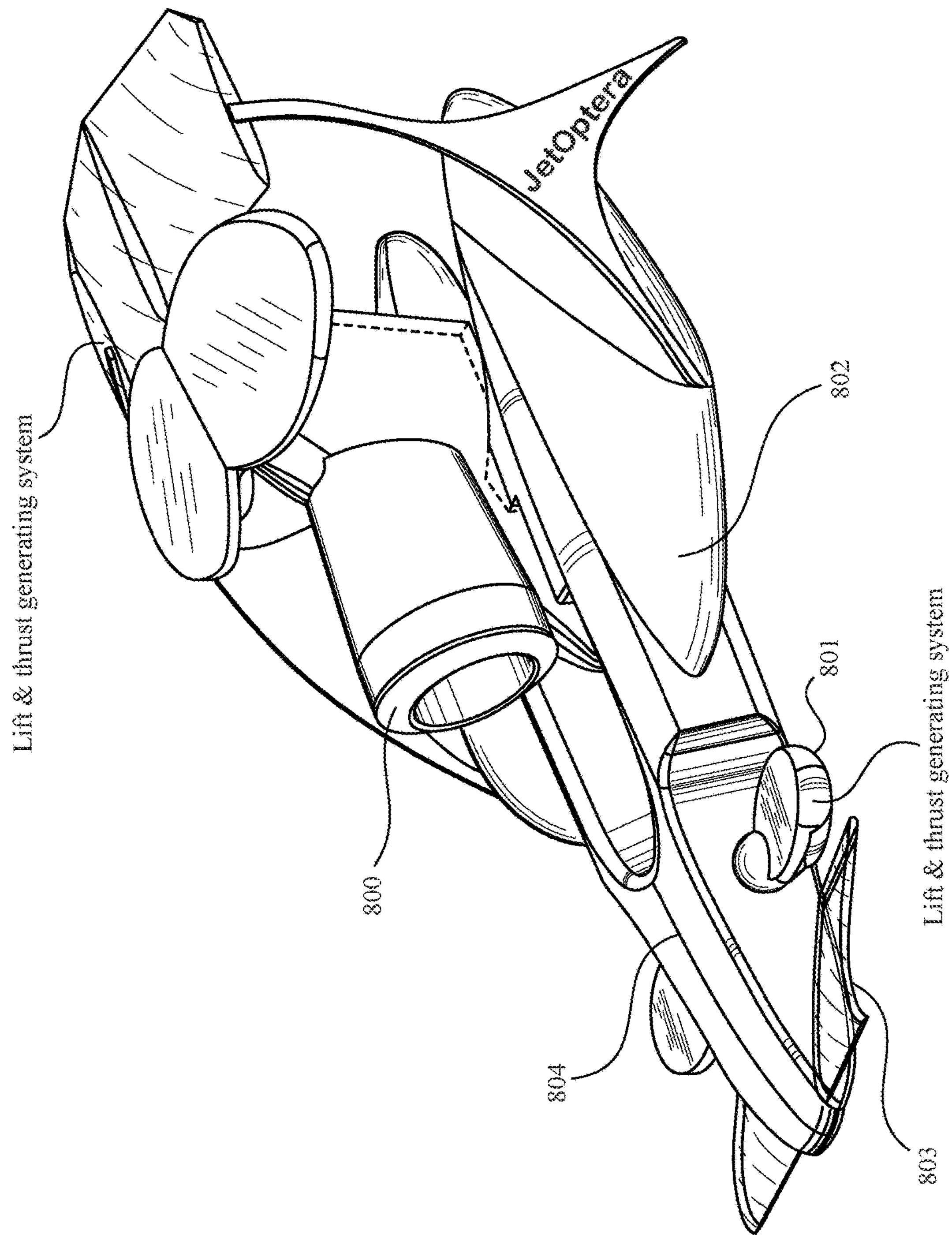
FIG. 8B is the perspective view of the present invention shown in FIG. 8A.

FIGS. 8A and 8B illustrate yet another embodiment of the present invention. As shown in FIGS. 8A and 8B, the tandem thrust/lift generation system is attached to an aerial vehicle 804, where the front thrust augmenting ejectors 801, which include leading edges and inlet portions for intake of upstream air, are producing thrust just behind a canard wing, with one each of such ejectors positioned on the starboard and port side of the vehicle. The canard wing is oriented at a high angle of incidence and close to stall when flying level, wherein the presence of the thrust augmenting ejector extends the stall margin of said canard wing 803. The thrust augmenting ejector 801 transmits mechanically the force of thrust to the structure 804 and produces a downstream jet efflux consisting of well mixed primary and secondary air streams, which in turn are used to generate significantly higher lift on wing 802. The system is replicated also on the tail of the aircraft in a similar fashion. The thrust augmenting ejectors 801 receive a compressor bleed stream from gas generator 800, whereas the tail thrust augmentor ejectors receive the pressurized, hot gases exiting the gas turbine of the gas generator 800. The combination of using compressor bleed air for the 801 ejectors and using hot exhaust gas for the tail ejectors as primary fluids, respectively, result in (1) thrust augmentation in level flight due to the ejectors entrainment of ambient air and (2) additional lift generated on surfaces placed behind the said ejectors, such as wing 802 having leading edges. These elements placed behind the ejector are generally thin structures, and could be constructed out of composite materials, including but not limited to ceramic matrix composites (CMCs). This arrangement offers greater flexibility to switch during transition from take-off to hovering to level flight and landing.

Figure 9:
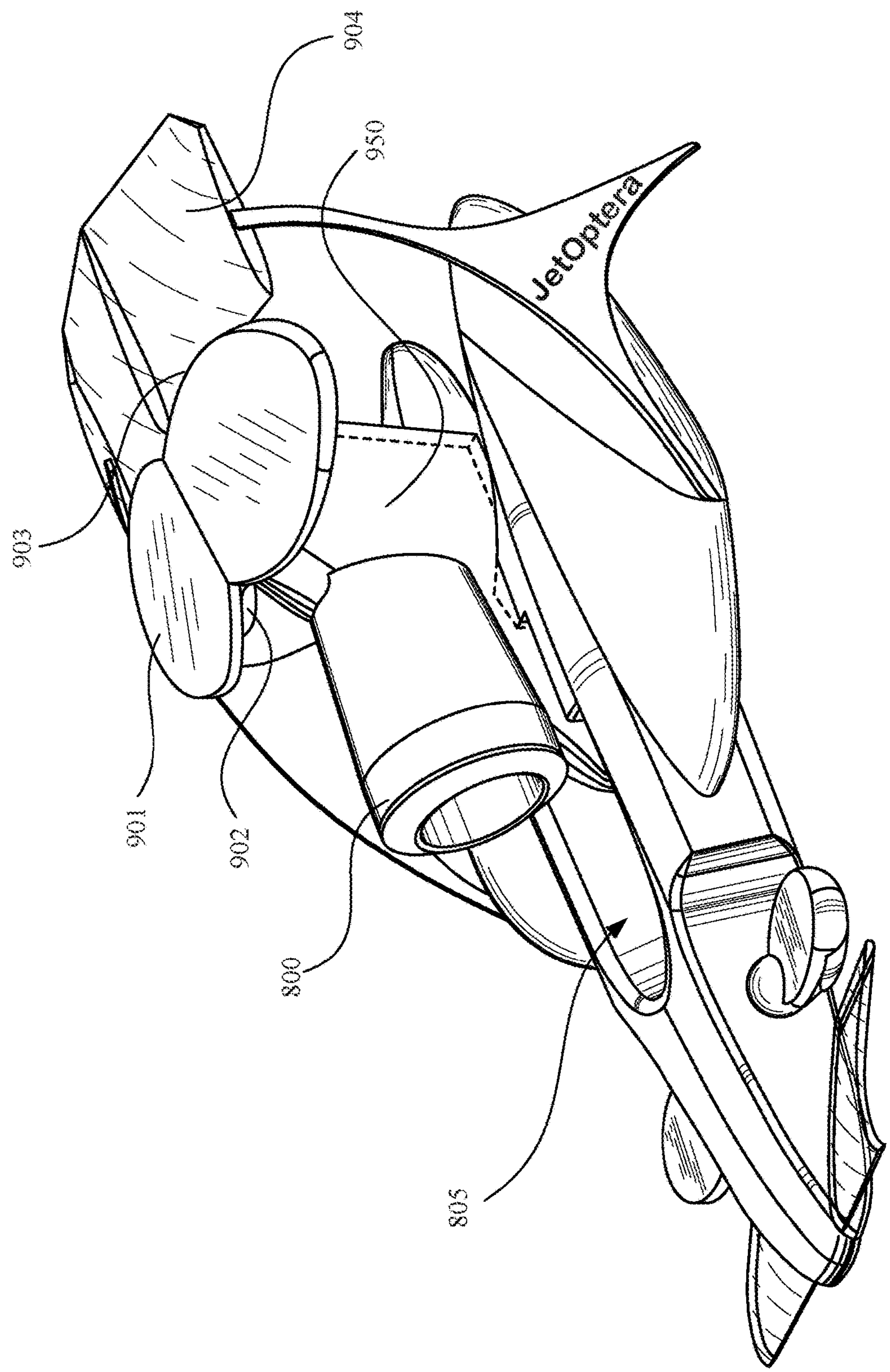
FIG. 9 is a perspective view of the present invention shown in FIGS. 8A and 8B and features the aircraft tail arrangements and the gas generator mount.

FIG. 9 provides further details to the tail (or hot) section of the illustration in FIGS. 8A and 8B. The thin structures 904 having leading edges are placed in the wake of a set of hot thrust augmenting ejectors 901, which have leading edges and receive the primary (motive) fluid as hot exhaust gas from the gas generator 800, situated near a cockpit 805 and entraining air in the inlet of element 901, namely 902. The conduit linking the exhaust of the gas generator 800 to element 901 is embedded into the vertical fin structure 950. The ejectors 901 entrain the incoming ambient air in the inlet areas 902 and eject a high velocity, entrained air and motive gas mixture at outlet 903 and mainly towards the thin tail structure 904, which in turn generates additional lift. Both elements 801 in FIGS. 8A and 8B and 901 in FIG. 9 can swivel around their main axis for VTOL and hovering control. Additionally, each ejector of the ejector set 901 can rotate about the same axis with and/or independent of the other ejector.

FIGS. 10A through 10E show the various flows as well as the lift versus angle of incidence with the point corresponding to the angle of incidence highlighted in each instance. As the angle of incidence of a given airfoil is increased, the lift increases until separation of the boundary layer on the airfoil determines stall, right after the maximum lift point (see FIG. 10D).

Figures 10A, 10B, 10C:
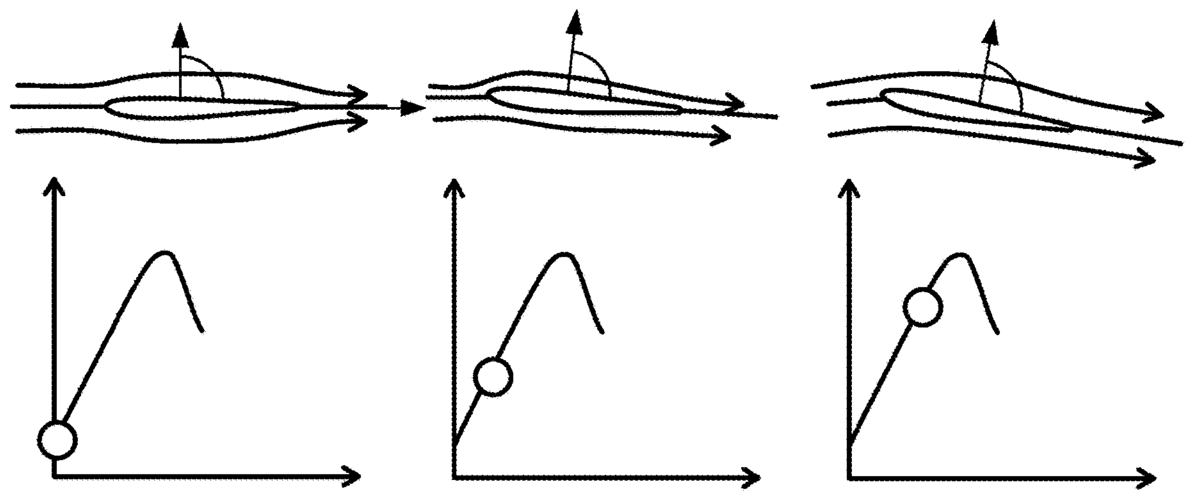
FIGS. 10A-10E show lift coefficient variations at a constant airspeed of an airfoil as function of the angle of incidence showing stalling angle of attack.
Figures 10D, 10E:
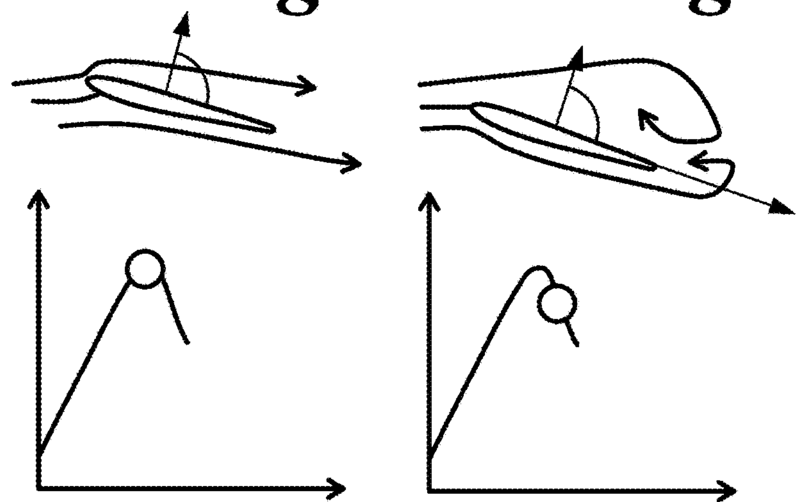

FIG. 10A demonstrates the lift and angle of incidence of the canard wing structure 203 illustrated in FIGS. 8A and 8B at a zero degree (0°) angle of incidence, where the dot represents the lift force and the streamlines represent the flows around the canard airfoil. FIGS. 10B through 10D show the result of increase of lift force of the structure 203 as the angle of incidence or angle of attack increases to the stall point, fully represented at FIG. 10D. Beyond the position of the airfoil (with respect to the angle of incidence) as shown in FIG. 10D, e.g., at position depicted in FIG. 10E, the lift decreases rapidly as the flow becomes turbulent, may separate and streamlines no longer are smooth. The lift increases almost linearly as the angle of incidence is increased, but at the angle of incidence shown in FIG. 10D it reaches the maximum value, beyond which the flow separates on the upper side of the airfoil. In FIG. 10E, there is recirculation and increased drag, loss of lift generated by opposite flows, and occurrence of the separation of boundary layers. This causes the lift force to drop significantly and result in stall.

Figure 11A:
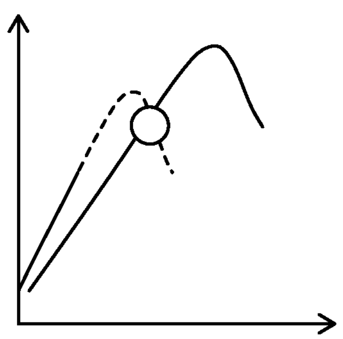
FIGS. 11A-11B show stall margin improvement with different placements of the present invention.
Figure 11B:
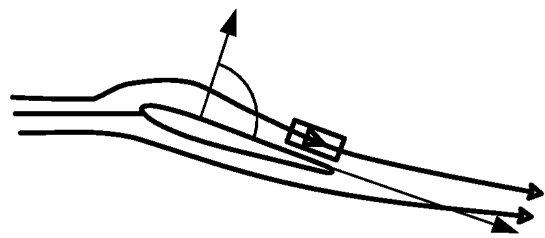

FIGS. 11A and 11B show the characteristic lift curve of FIGS. 10A through 10E, with a second curve showing an extension of the stall margin, which demonstrates the improvement in the lift versus angle of incidence beyond the stall point in case the ejector is placed relative to the wing such that it delays separation and facilitates ingestion of the boundary layer at high angles of attack. In FIG. 11B, the lift continues to increase without stall with the angle of incidence, due to the presence of the ejector. The placement of the ejector beyond the apex of the airfoil allows re-attachment or separation avoidance of the flow of the upper boundary layer which otherwise would separate in the absence of the ejector that ingests the said boundary layer, due to a high angle of incidence of said airfoil. The ejector is introducing a low pressure local area at its inlet, forcing the ingestion of the boundary layer developed over the upper side of the wing airfoil. The margin of the stall becomes much larger by placing the thrust augmenter ejector beyond the apex of the canard wing or airfoil 203 of FIGS. 7C, 8A, and 8B. These results indicate that the presence of the ejector extends the stall margin and allows for greater lift forces to be generated by increasing the angle of attack beyond the stall angle of attack value of said airfoil without the presence of the ejector. In addition, FIGS. 11A and 11B illustrates possible placements of the ejector with respect to the airfoil chord to re-streamline the flow around the airfoil.

Figure 12A:
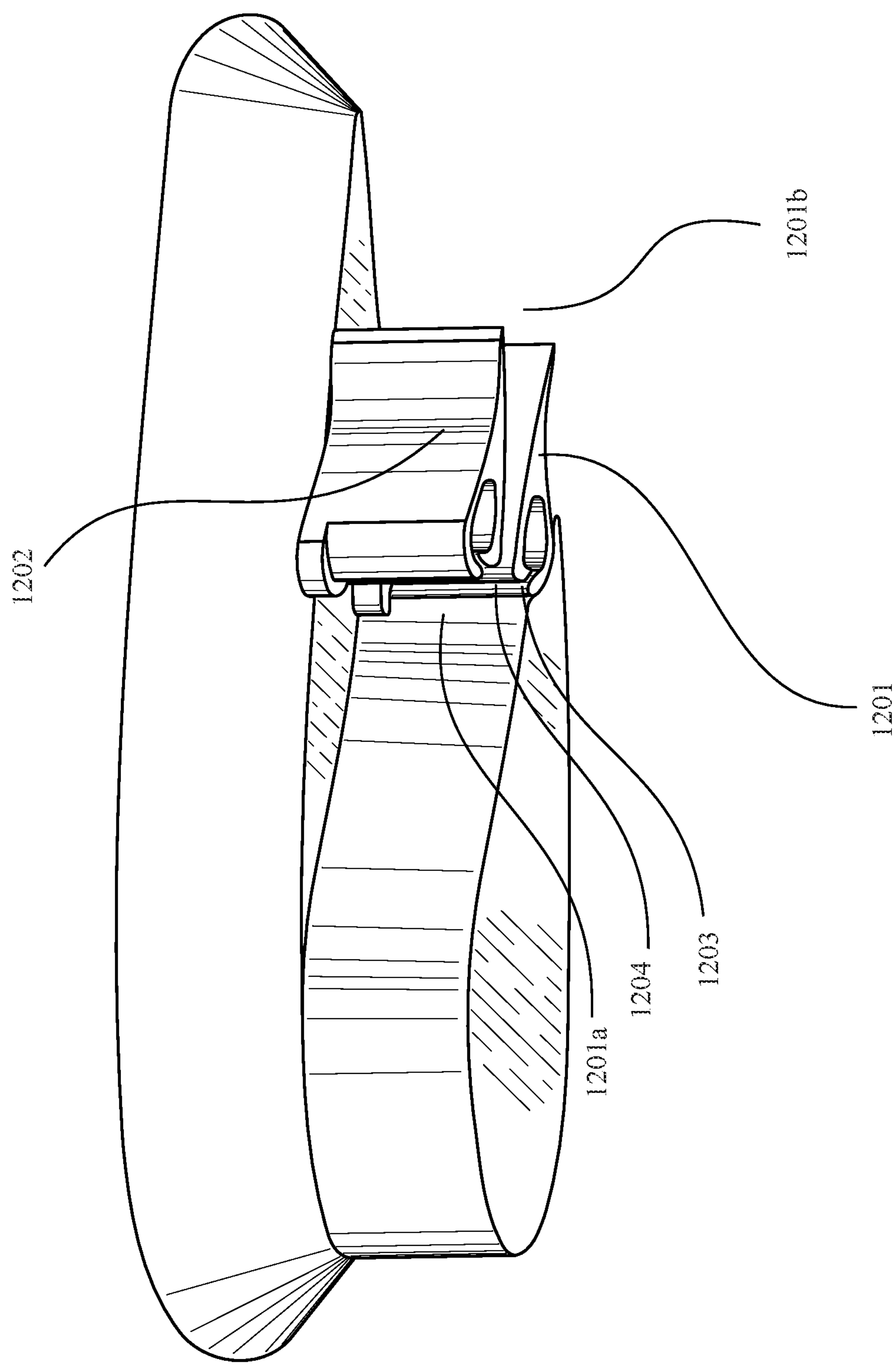
FIGS. 12A-12C is yet another embodiment of the present invention that features the ejector component of the propulsor in relative position to the wing.
Figure 12B:
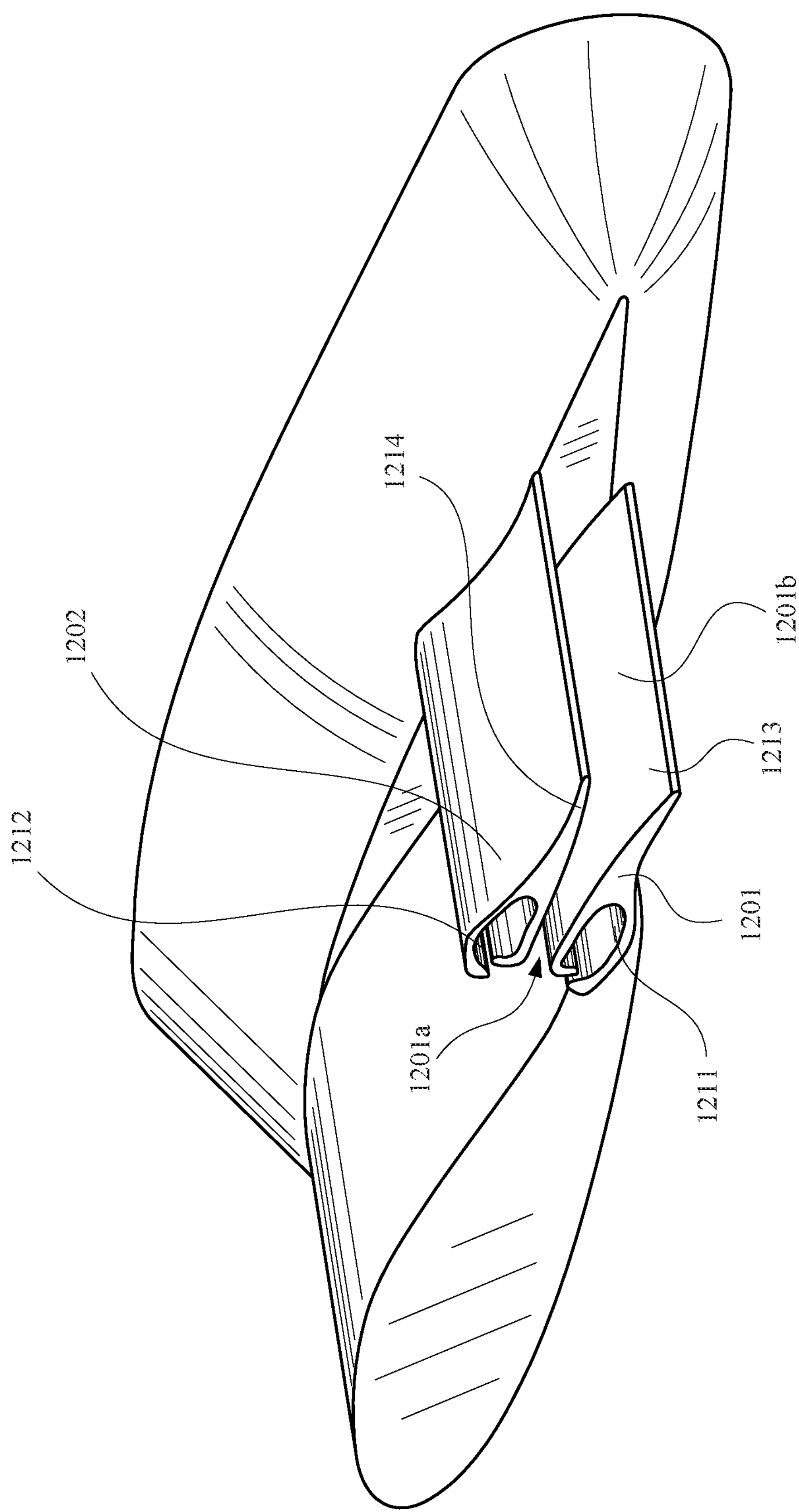
Figure 12C:
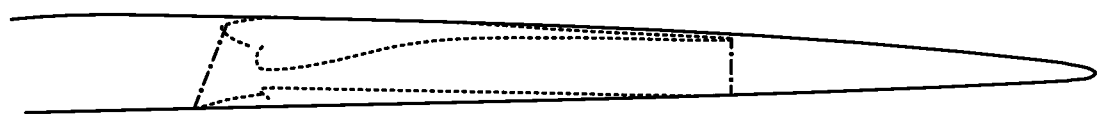

FIGS. 12A through 12C depict yet another embodiment of the present invention. The main wing and thrust augmenting ejector system produces a forward thrust and a high velocity jet efflux conditioning that can be used for additional lift generation when coupled with a secondary airfoil (not shown, but could be placed in the wake or efflux downstream of the ejectors). As illustrated in FIG. 12A, the ejectors are formed by two (2) airknife-like halves, which together generate the entrainment, momentum transfer, and acceleration of the ambient air by using the primary or motive fluid and ejecting the final mixture of primary and secondary fluids at high speeds. The two halves 1201 and 1202 can independently rotate and translate to position themselves and relative to the wing in such manner that they are optimizing the augmentation at any time, based on the aircraft attitude and mission (or point in mission), primary fluid condition (flow rate, pressure and temperature). This allows the throat formed by the two halves to have, in one instance, a certain value, yet in another instance, a larger or smaller value. For example, at take-off, the two halves may both point downwards to enable the aircraft to vertically take-off. The two halves may move independently and in position to one another to maximize thrust with a maximum primary fluid flow rate and maximum entrainment rate, generating a certain area inlet ratio to the throat that is favorable to maximizing the thrust. Yet when flying level, the two ejector halves may instead be both horizontal and streamlined with the wing, with a smaller throat area for smaller pressures, temperature and flow rate of the primary fluid, again maximizing the thrust augmentation. The throat area, the exit area, the inlet area, and their ratios may also be adjusted according to a maximization of thrust algorithm. Both 1201 and 1202 contain a plenum 1211 and 1212 respectively, connected to a conduit and receiving the said primary fluid from, e.g., a compressor bleed port of a gas generator. The two halves form together a variable inlet area 1201*a* and a variable exit area 1201*b* and a diffusing shape formed by walls 1213 and 1214 respectively, to optimally diffuse the flow to maximize said thrust. The primary flow is introduced from the plenums 1211 and 1212 respectively into the throat area via multiple specially designed nozzles 1203 and 1204 respectively, in a continuous or pulsed manner.

FIG. 12C further describes the arrangement of this ejector for level flight of an aircraft. FIG. 12C shows that the flat ejector may be inserted within the thickness of the wing airfoil when all the elements described in this disclosure are used for highest efficiency. FIG. 12C shows the contour of the said inner and outer ejector surfaces and FIG. 12B shows the 3D model of the 1201 and 1202 lower and upper halves of the flat Coanda ejector disclosed, integrated with the wing. The two halves, which can be independently actuated, form together an inlet 1201*a* and an outlet 1201*b*; they allow high speed introduction of a primary fluid through primary nozzles 1203 over Coanda surfaces 1204.

Figure 13A:
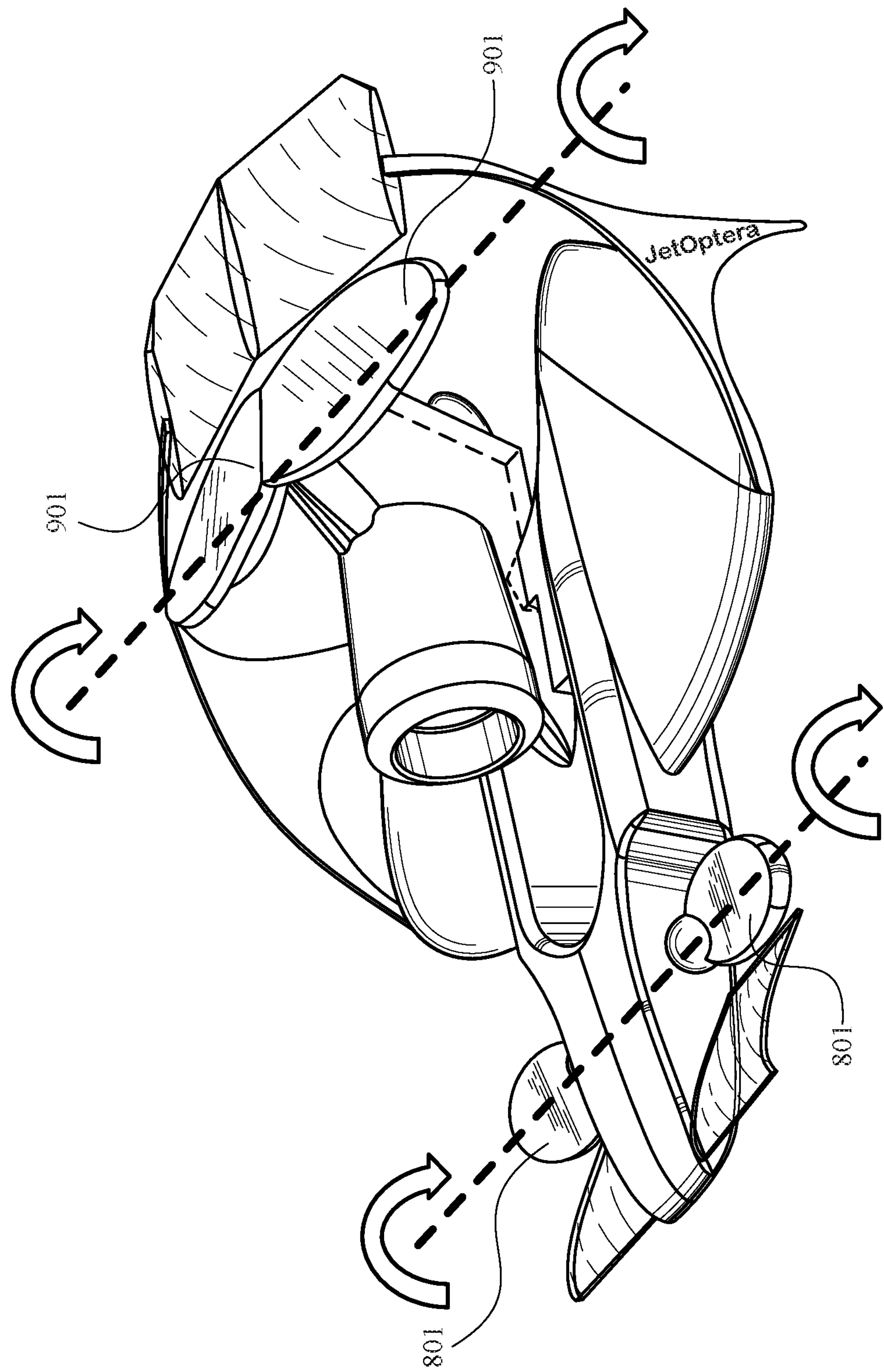
FIGS. 13A-13C illustrates how the present invention can control the aircraft's pitch, roll and yaw using the thrust augmenting ejectors in conjunction with the thin airfoils placed in the ejectors' wake.
Figure 13B:
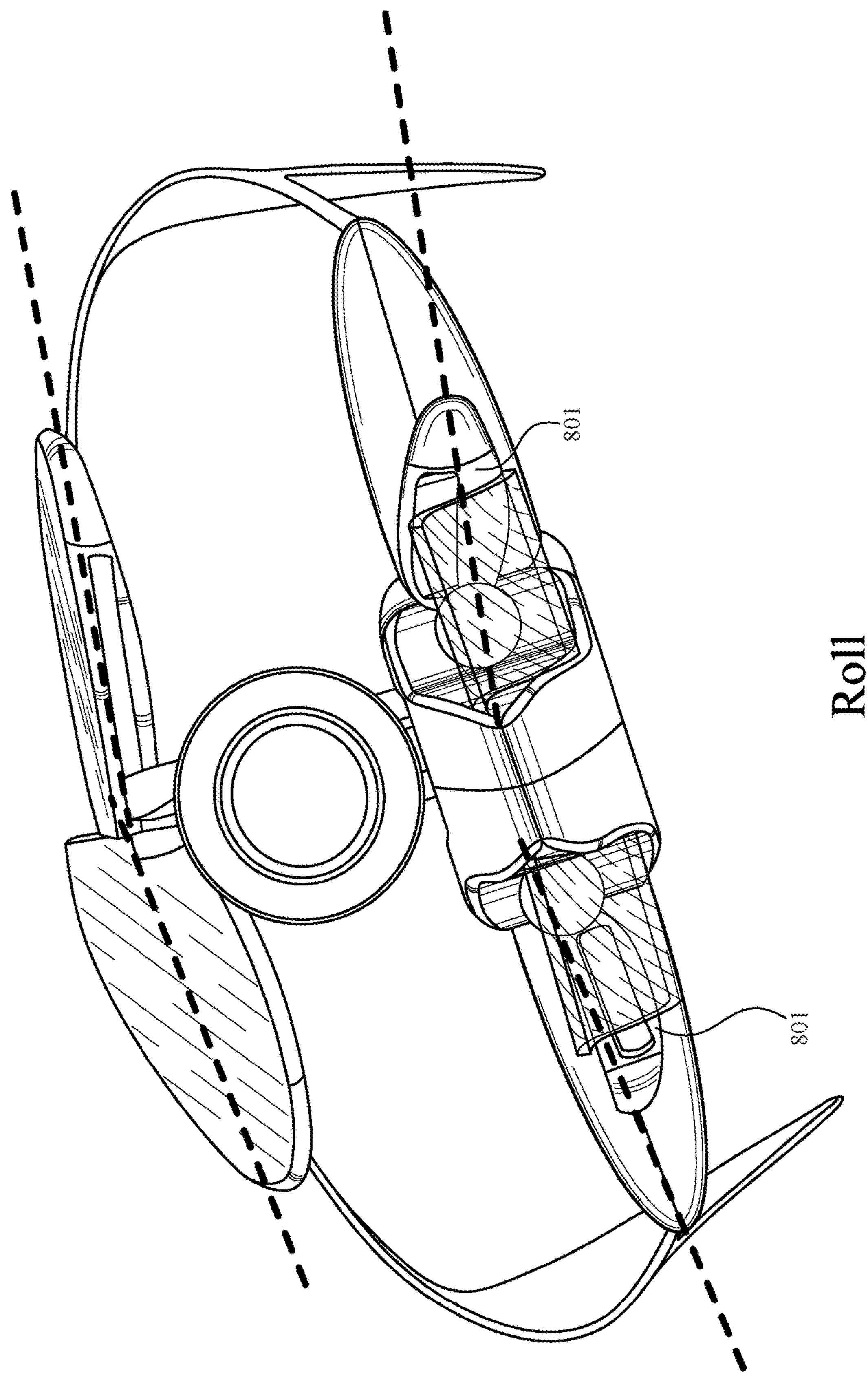
Figure 13C:
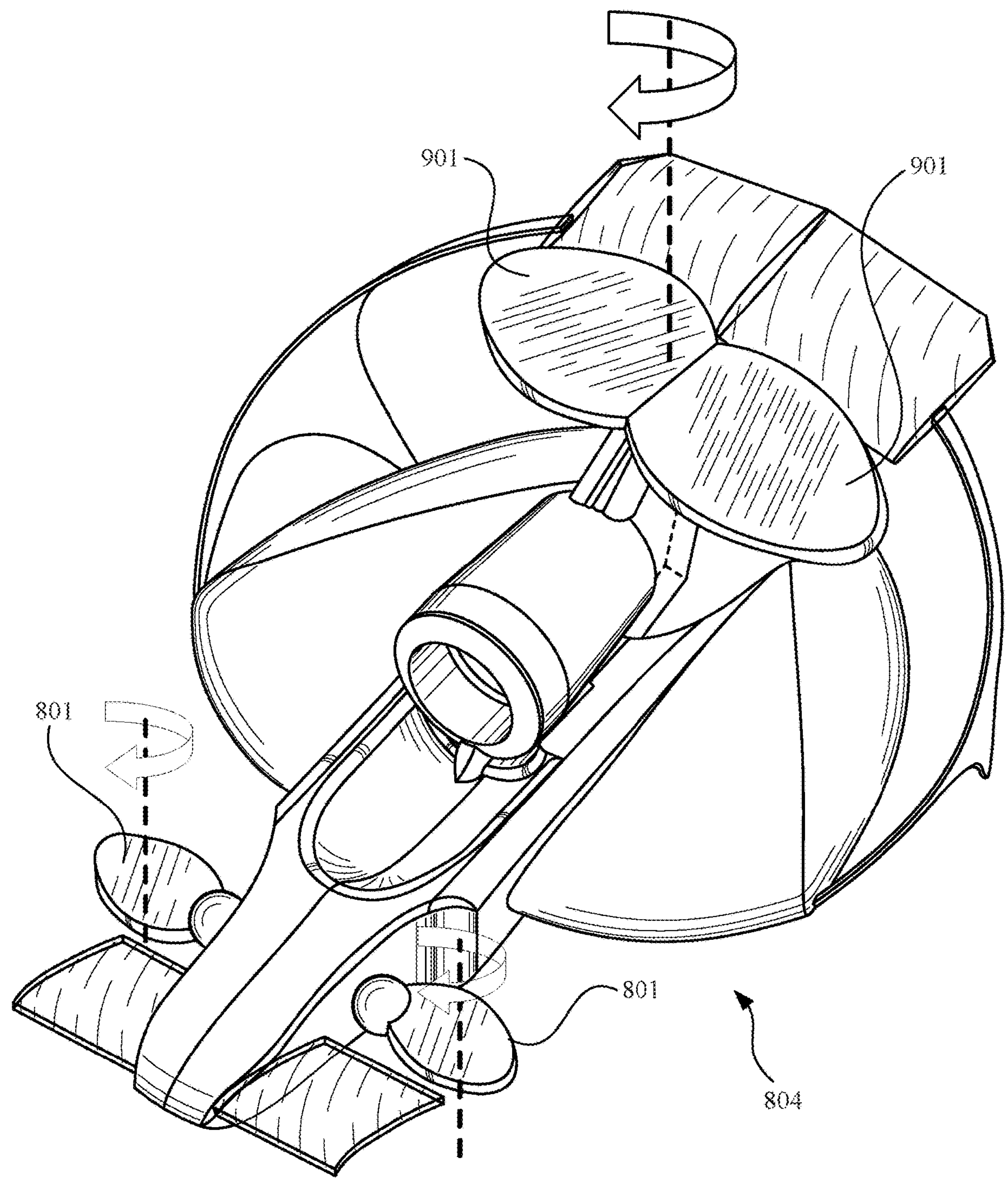

FIGS. 13A through 13C depict how the present invention can control the aircraft's pitch, roll and yaw using the thrust augmenting ejectors in conjunction with the thin airfoils placed in the ejectors' wake. With regards to the pitch, the cold and hot ejectors may be independently rotated around their main axis to cause the aircraft to pitch forward or aft. Pitch control is affected via forward/aft ejector thrust split and/or modulation of the flow of the motive fluid supplied to the ejectors. With regards to the roll, the ejectors may be independently rotated to cause the aircraft to roll. With regards to the yaw, a combination of additional rotation around a perpendicular axis with the positioning of the thin airfoils in the wake of the jet efflux may be used to cause a change in aircraft attitude. This embodiment of the present invention makes these maneuvers possible with the use of special joints that can swivel, transmit loads, and allow the passage of the primary fluid to the said ejectors.

Coanda Device

In yet another embodiment of the present invention, the propulsor and/or the thrust generator of the tandem system have the ability to entrain large amounts of air and accelerate it to the jet efflux speed. This is achieved by the employment of a Coanda device. These flow augmentation devices have been generally described by different publications that will be discussed in greater detail below. For example, in his paper "Theoretical Remarks on Thrust Augmentation", (Reissner Aniversary Volume, Contributions to Applied Mechanics, 1949, pp 461-468), von Karman describes in great detail why a Coanda device results in significant higher thrust augmentation via multiple jets. Similarly, U.S. Pat. No. 3,795,367 (Mocarski) discloses a device for air entrainment with high augmentation ratios exceeding 1.8, while U.S. Pat. No. 4,448,354 (Reznick) applies a linear Coanda device to the VTOL capability of a jet engine. In these aforementioned publications and other references not mentioned here, the application of Coanda devices has been limited and described only for VTOL and not for level flight. One major teaching was that the scalability and application for horizontal flight was not practical, particularly for the axisymmetric devices of Coanda type where their size would induce drag increase for larger aircraft. An application for a small UAV however may be more suitable with a higher degree of integration. Embodiments of the present invention are able to integrate the ejectors with the fuselage and the engine or propulsion system because the vehicle does not need to consider large seat capacity. Integration as disclosed in these embodiments is not currently practical or commercially reasonable in large commercial flights.

This embodiment of the present invention improves the Coanda device and applies it using new techniques for better entrainment and delay or avoidance of separation in its aggressive turns inside the device. While the compactness of these devices is critical for their deployment in aviation and other fields, the inlet part needs to be large in order to enhance the air entrainment. Reznick argues that a circular element is more efficient than a linear one. Mocarski shows that entrainment is critical to thrust augmentation. The diffusor part needs to be long enough to ensure no separation of the boundary layer occurs inside the device and mixing is complete at the exit of the device. Conventionally, these diffusers have been long with a very mild slope in order to minimize boundary separation risks.

The present invention shows improved entrainment in the devices by means of novel elements that rely on 3D geometrical and fluid flow effects and utilization of separation avoidance techniques in the Coanda device. The preferred embodiment of the present invention has an entrainment ratio between 3-15, preferably higher. In another embodiment of the present invention, the device will receive the motive gas from a pressurized source such as a gas generator, a piston engine (for pulsed operations) or a compressor or supercharger. Another feature of the present invention is the ability to change the shape of the diffusor walls of the flat ejector utilized for propulsion by retracting and extending the surfaces to modify the geometry such that maximum performance is obtained at all points of the aircraft mission. In addition, the need to swivel the entire ejector by 90 degrees for VTOL and hovering is no longer needed, when the fully deployed diffusor walls are used to direct the jet efflux downward.

Figure 14:
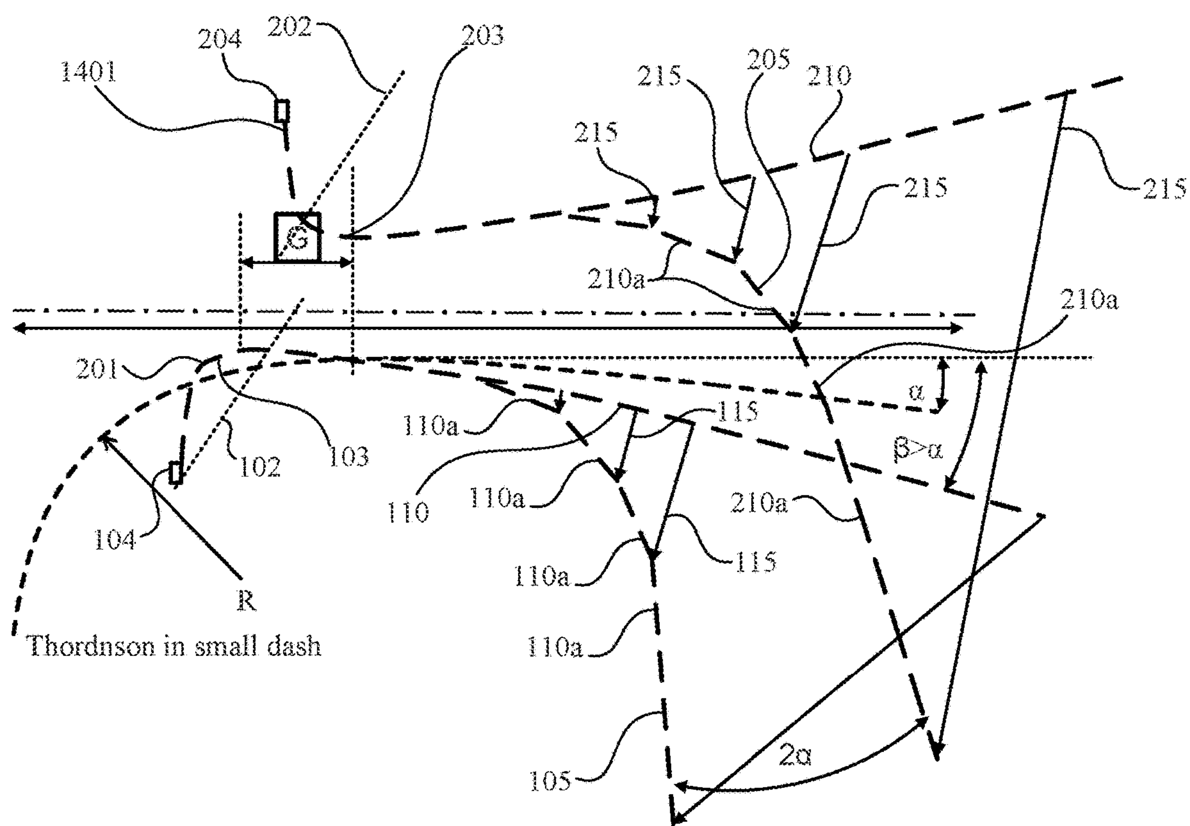
FIG. 14 is one embodiment of the present invention with flap-like elements to the diffusor walls of a Coanda ejector which is itself split in 2 halves.

Another embodiment of the present invention introduces flap-like elements to the diffusor walls of a Coanda ejector which is itself split in 2 halves, illustrated in FIG. 14, as upper 1401 and lower 201 half ejectors that are each similar to an airknife. Elements 115 and 215 are actuators or linkages, enabling the movement of said surfaces to the desired position on both 110*a* and 210*a*, respectively.

Figure 15A:
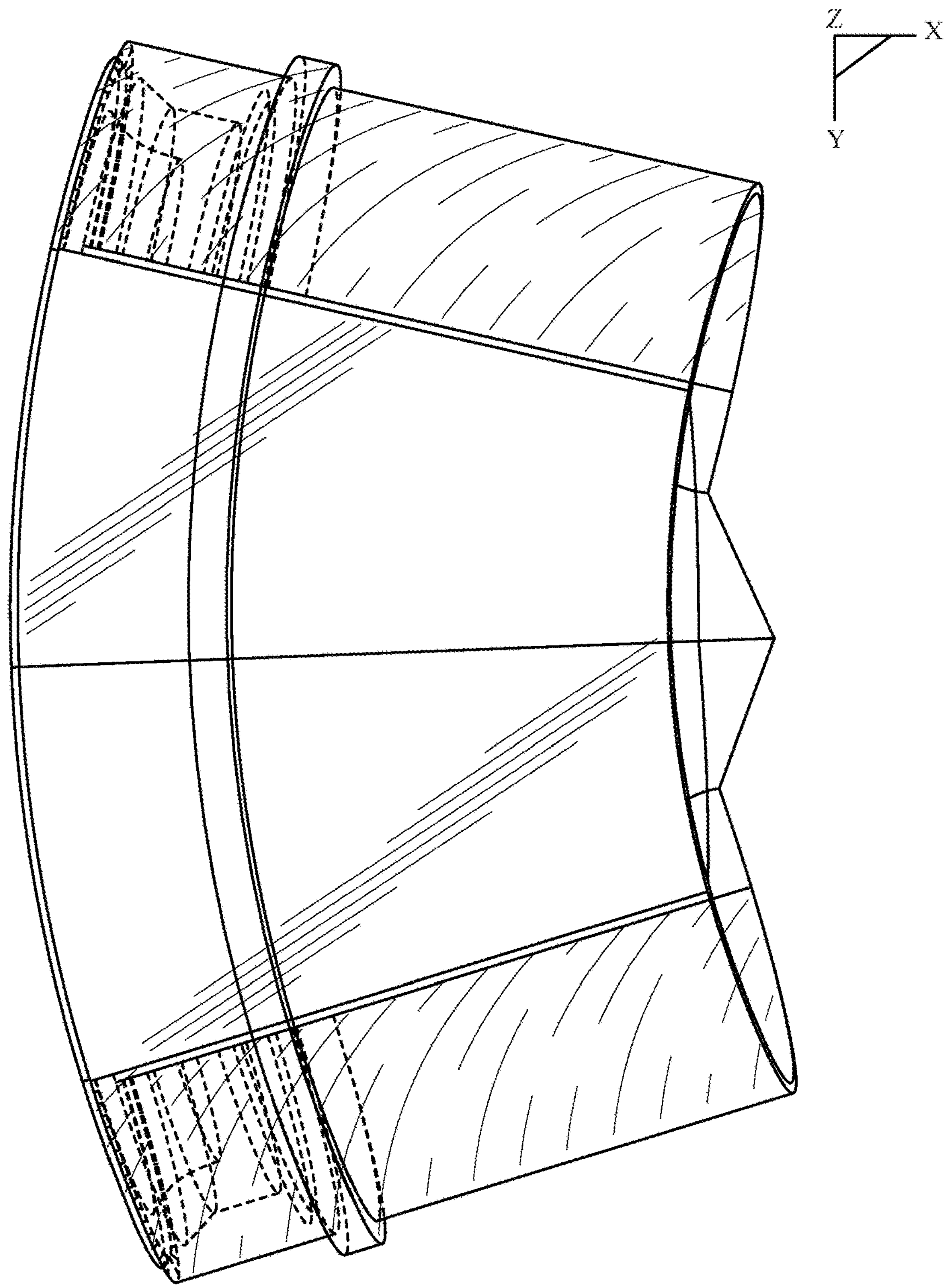
FIGS. 15A-15C illustrates the 3D features, one embodiment invention, from different points of view.
Figure 15B:
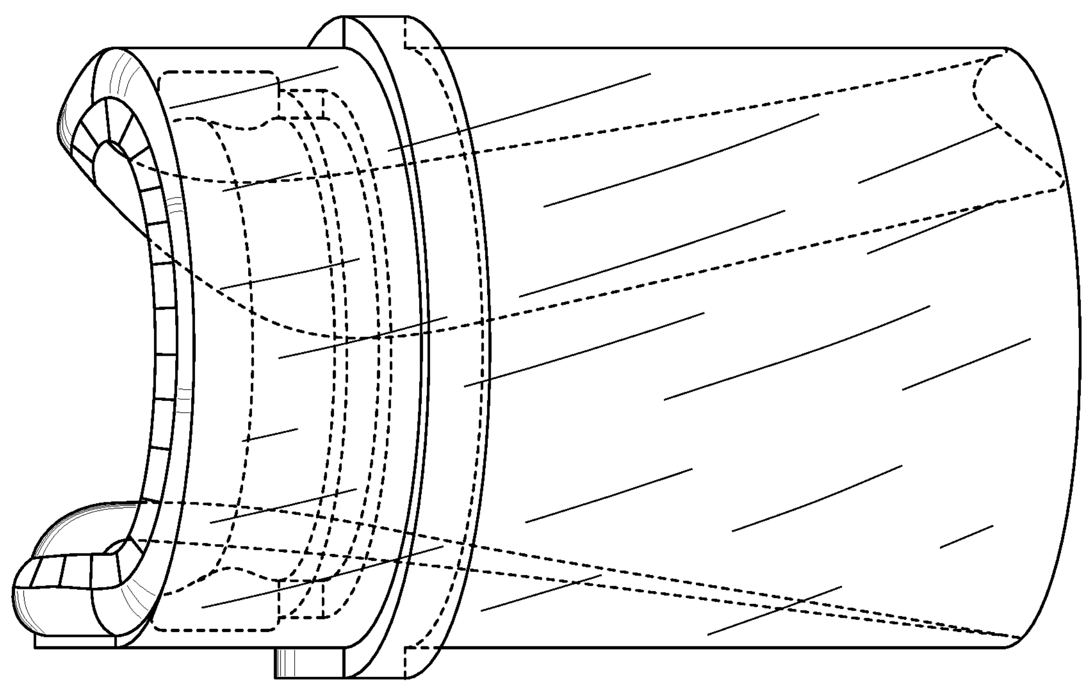
Figure 15C:
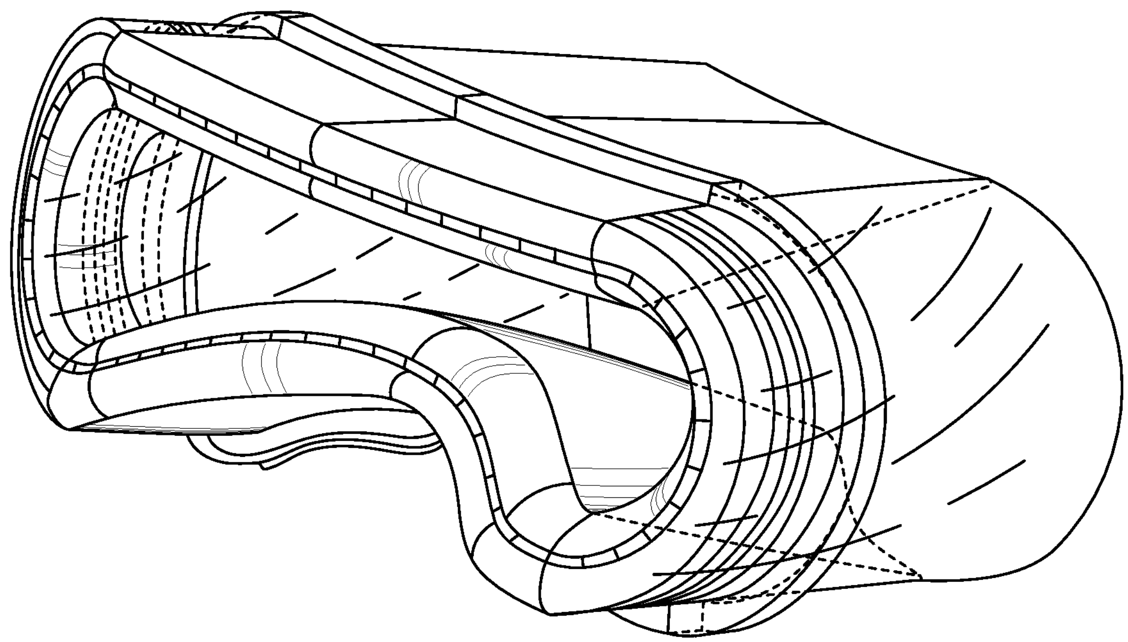

Yet another embodiment of the present invention discloses how staging 3D inlet geometries and/or primary fluid slot 3D features, either independently or working together, significantly improve the performance of the propulsor, together with introduction of flow separation avoidance patterns on the propulsor. For example, as illustrated in FIGS. 15A through 15C, the 2D inlet is replaced by a 3D inlet. FIGS. 15A through 15C further illustrate the multiple 3D elements of the ejector disclosed, improving its performance over baseline, and 2D ejectors having the inlet, throat and diffuser in the same planes, respectively.

Figure 16A:
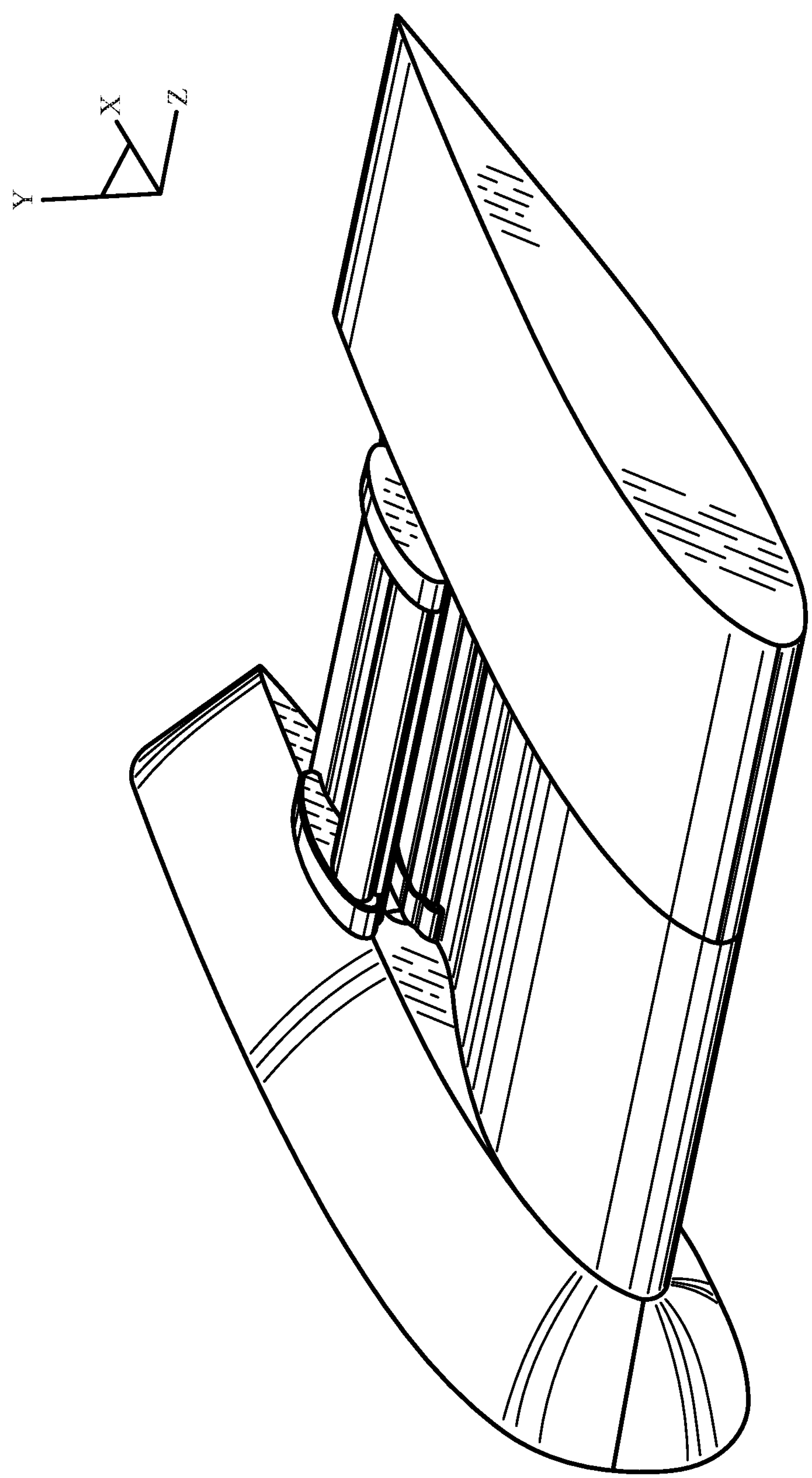
FIG. 16A shows another embodiment of the present invention to improve performance and margin of stall.

The inlet may further match the boundary layer profile shape formed behind the apex of a main wing airfoil of an aircraft (as illustrated in FIG. 16A), hence helping to ingest the boundary layer and delay the overall stall (improving across all margins), further illustrated in FIG. 25 for the position with respect to the airfoil. FIGS. 11A and 11B illustrate the benefits of placing it as such, relative to the airfoil and its boundary layer profile.

FIG. 16A shows a one embodiment of the flat ejector to a wing structure to improve its high angle of incidence performance and margin of stall. The ejector is fed a primary fluid from e.g. a gas generator, and it is position such that it streamlines the flow over said airfoil to delay stall.

Figure 16B:
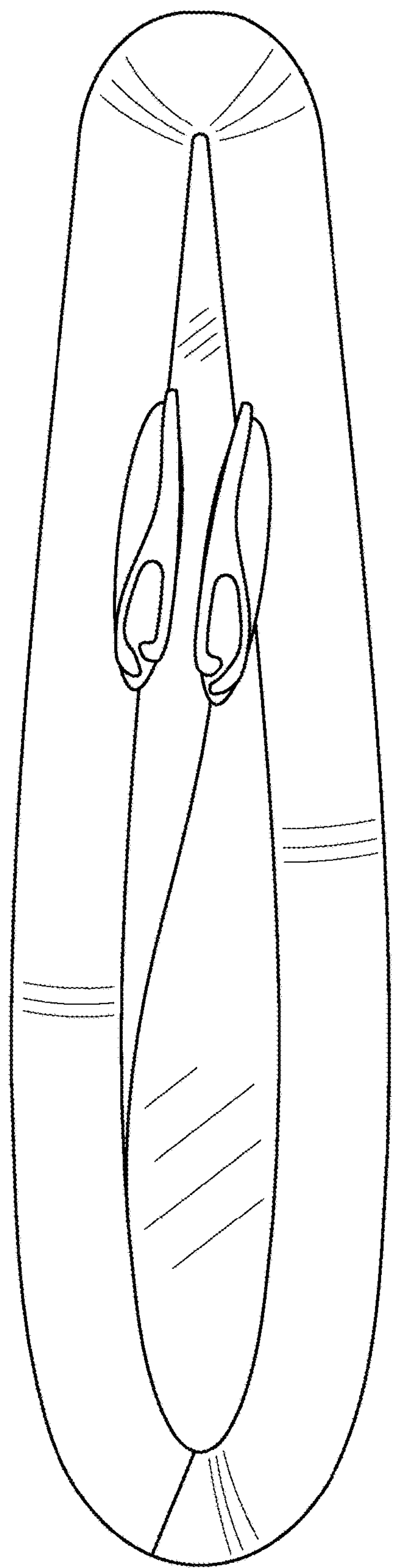
FIGS. 16B-16D illustrates the present invention shown in FIG. 16A from different points of view.
Figure 16C:
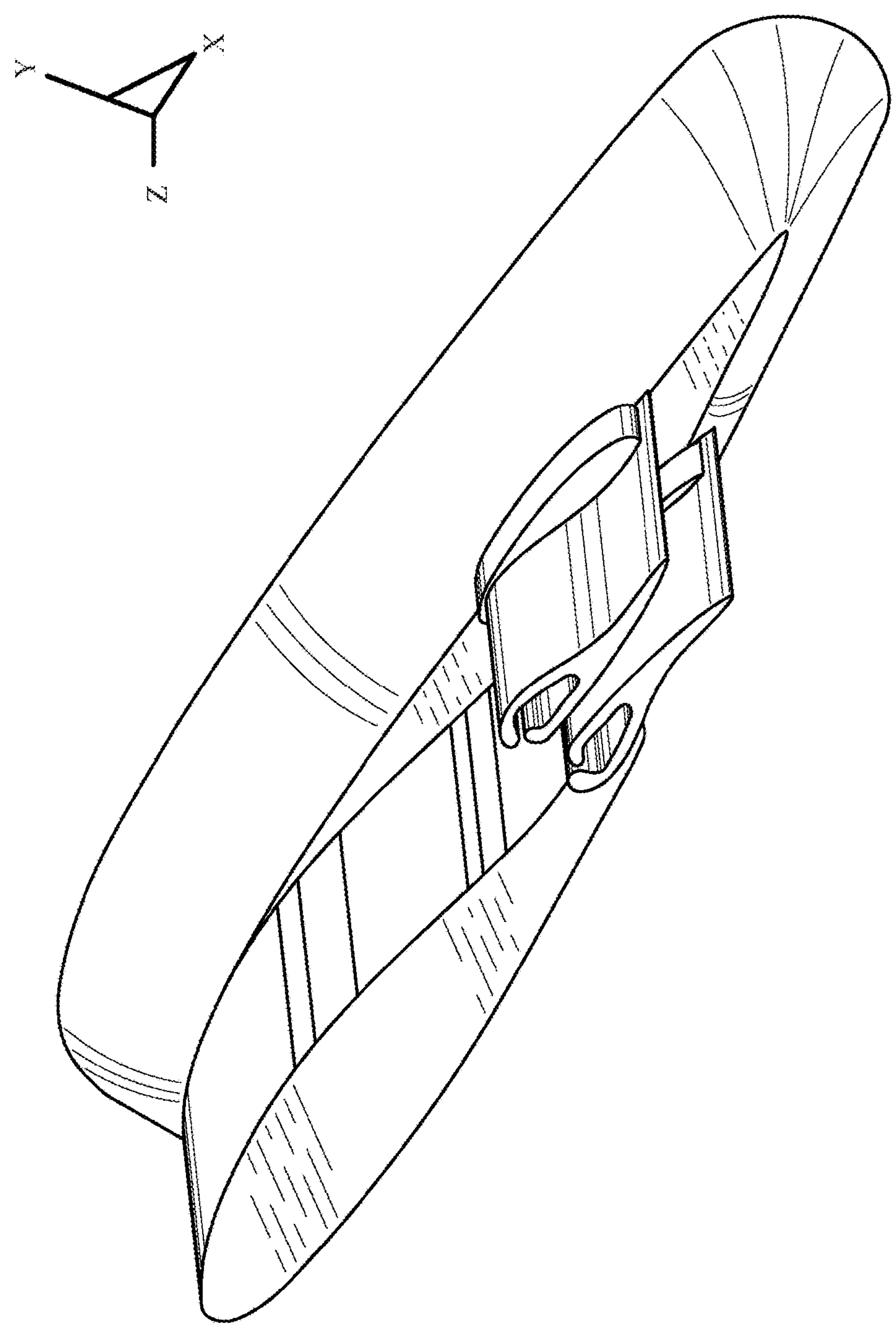
Figure 16D:
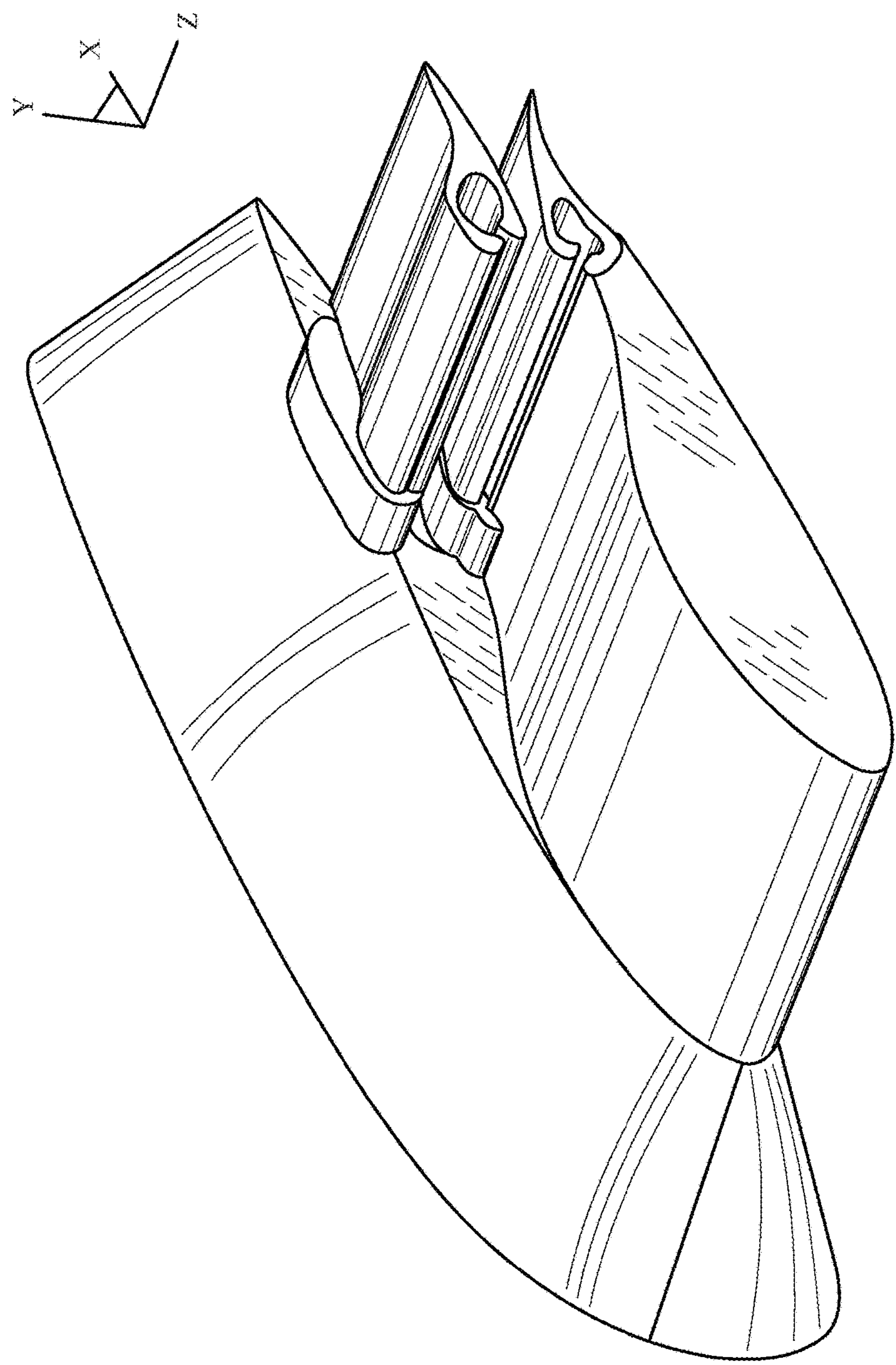

FIGS. 16B through 16D show different angles of the illustration shown in FIG. 16A, with details of the positioning of the ejector on the wing, the plenums supplying the primary fluid to the ejector, and their relative position to each other and the airfoil.

The ejector described in FIG. 14 is flat in geometry and it contains an upper and a lower portions, both introducing the motive fluid as wall jets in a multitude of slots and generally perpendicular to the jet efflux direction of the flow or streamlines, elements 1401 and 201 which can independently rotate around axes 102 and 202. The curved walls named Coanda walls 103 and 203 allow for the primary jets to follow the curvature and entrain in the process and at a ratio exceeding 3:1, secondary air, generally arriving from the flow above an airfoil such as a wing's upper surface boundary layer. The primary nozzles 104 and 204 are of various shapes with various 3D effects to maximize the entrainment ratio such as delta mini-wings 212 in FIG. 22B, or may be fluidic oscillators fed by said plenums supplied with motive fluid to generate a pulsed operation of motive fluid injection over the Coanda walls. The mixed fluid arrives at the throat area (minimum area of the ejector) to a pure axial direction. Beyond this point, the current invention introduces a segmented, movable diffuser section such as a flap only that it has a major role in the performance of said ejector by vectoring and/or maximizing its performance.

Figure 17A:
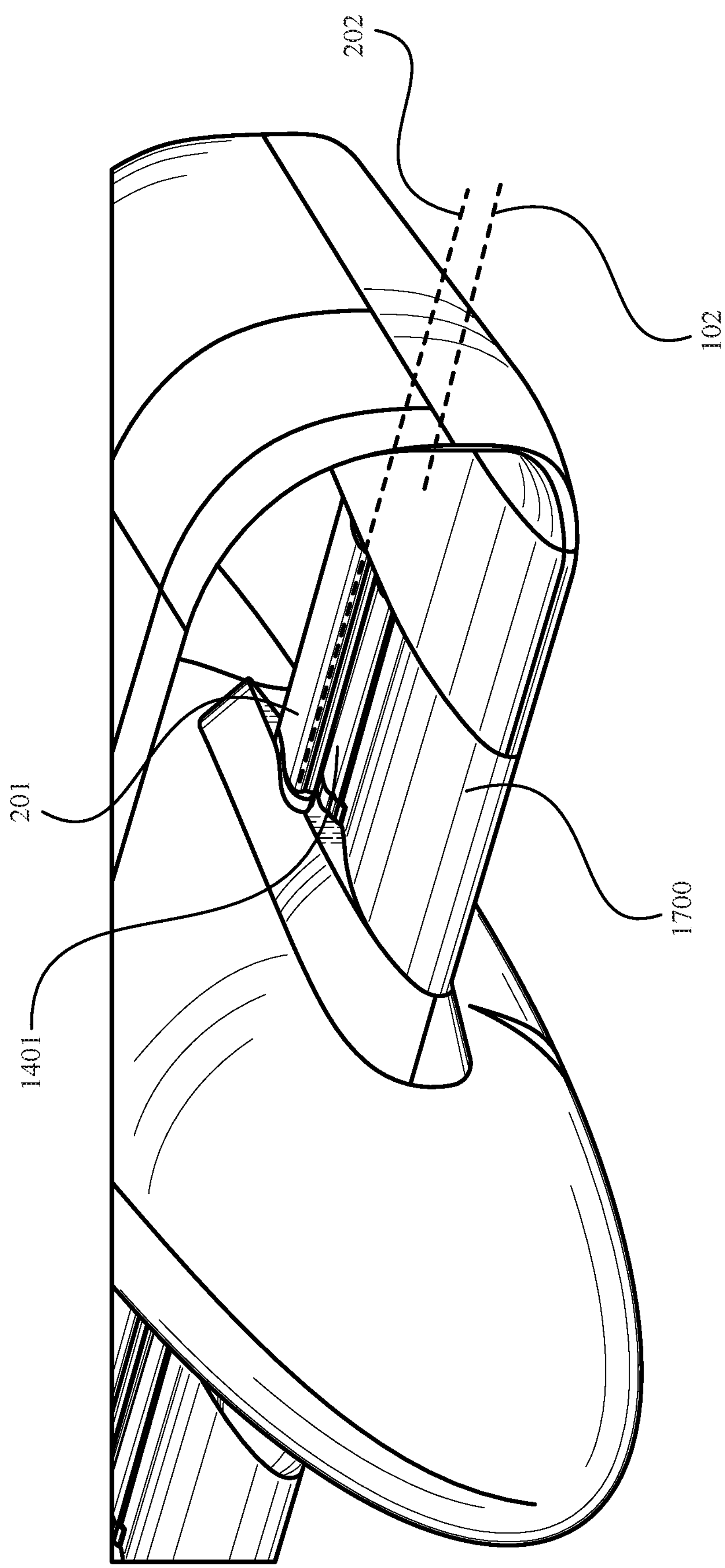
FIG. 17A-17C illustrate yet another embodiment of the present invention.
Figure 17B:
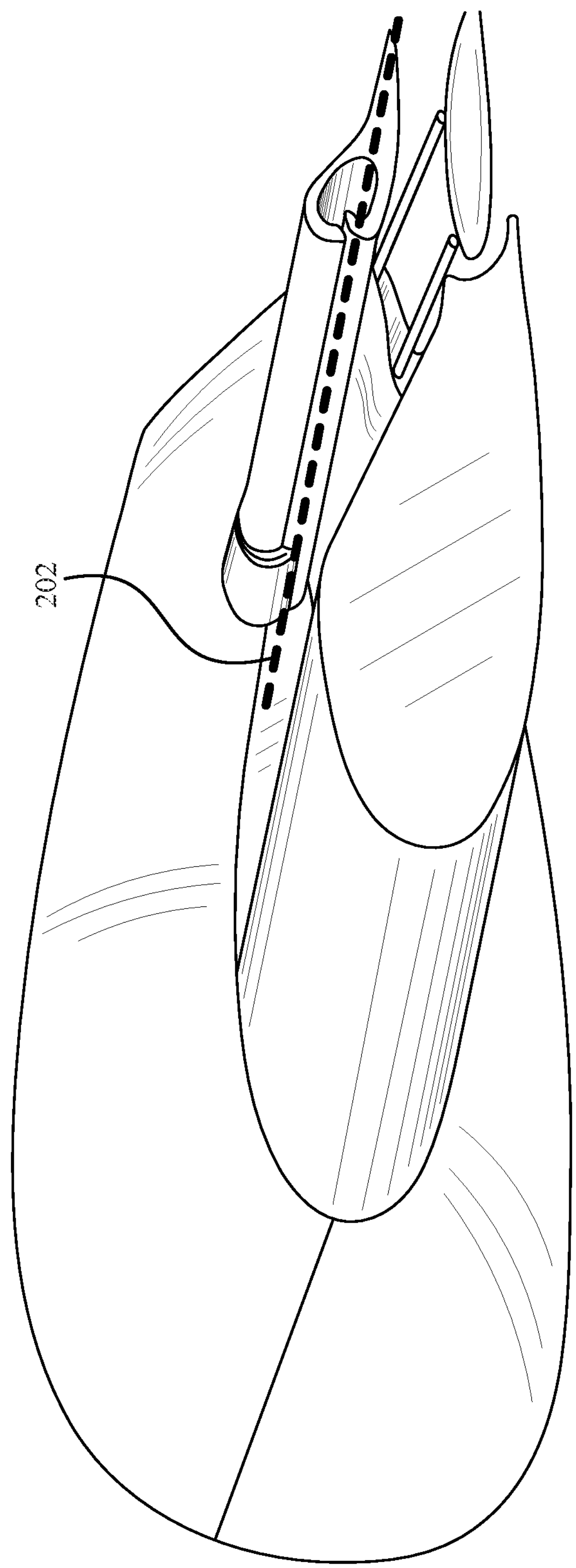
Figure 17C:
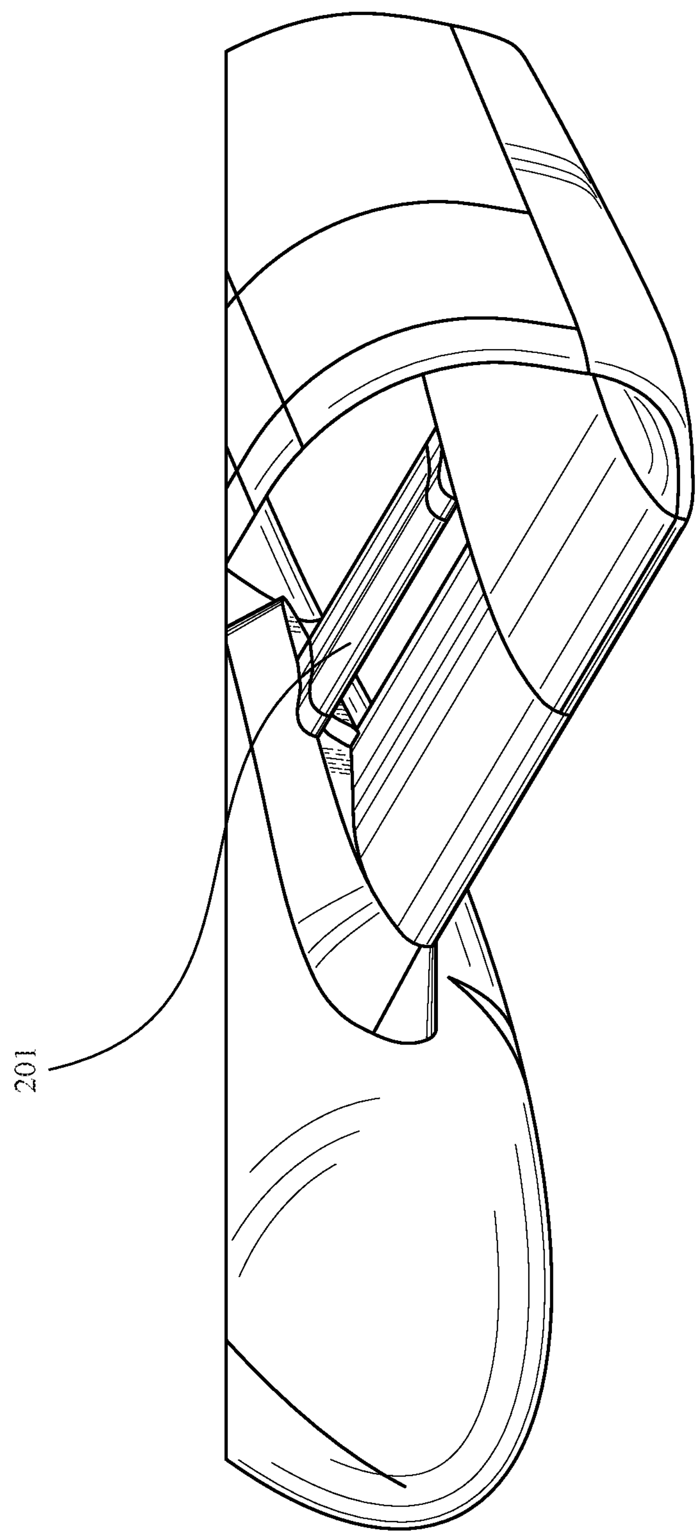

For example, at take-off, the inlet of the said ejector is fixed and still above an airfoil 1700 in FIG. 17A pointing forward. FIG. 17A depicts the deployment of such ejector formed by a lower (1401) semi-ejector and upper (201) ejector and in conjunction with the main wing of an aircraft of a drone. The two semi-ejectors can rotate around axes 102 and 202 respectively and can also translate according to the mission requirements. FIGS. 17B and 17C show the case where only the upper semi-ejector 201 is actively used with a primary fluid, whereas 1401 is replaced by a simple flap. As before, 201 can rotate around axis 202 and translate relative to the axial position. The semi-ejectors receive the primary fluid under pressure from e.g. a gas generator such as a gas turbine and allow its passage through primary nozzles, which may employ fluidic oscillators (i.e. pulsating at certain frequencies such as up to and including 2000 Hz to generate a pulsating entrainment of the secondary flow).

In FIG. 14, the ejectors upper half diffuser 210 is extended to form a curved surface 210*a* and guiding the mixed primary and secondary flows downward. At the same time, the lower diffuser 110 is also extended into 110*a*, maintaining the appropriate ratio of area growth and mixing characteristics to obtain the maximum thrust required by the aircraft. Some portions of 110*a* and 210*a* may not be deployed and the 110 and 210 are controlled independently yet according to an appropriate schedule. In addition, the upper 201 element may or may not be moved axially to follow the needs of the mission. In one embodiment, different amounts of primary fluid and/or delivered at different conditions may be supplied to the upper 201 or lower 1401 elements in a continuous or pulsed fashion. The 110*a* and 210*a* diffusor surfaces may contain dimples and other elements that delay or avoid separation of the boundary layer. Additional, secondary nozzles may also open if the fully extended 110*a* is utilized, at particular locations and potentially staggered and may be pulsed according to fluidic oscillators operation modes to supply a pulsed operation mode to the ejector.

When fluid is received from a compressor bleed, the motive air is lower in temperature. The exhaust gas from the hot end of the gas generator (exhaust from turbine), for example, for motive gas temperatures of 1500 F at pressure of 30 psi compressor air discharge and the entrainment ratio of 5:1, and ambient temperature of 100 F, the temperature of the mix becomes 335 F (180 C), for which the density of the air is 1.6E-3 slugs/ft3 or 0.84 kg/m3, a drop of ~30% from ambient. As such, the overall wingspan can be reduced by ~10%, even taking into the account the density reduction effects, when an airfoil is deployed behind the main propulsor. For entrainment rates of 10:1 (better than the 5:1 design), for similar conditions and an emerging jet of 125% of the airspeed of the aircraft, the lift benefit is higher because the mix density is now larger, at ~200 F mix temperature and lift generated over the wingspan washed by the jet is ~16%. In this example the wing can be reduced in length accordingly.

Thrust Generator

Another embodiment of the present invention relates generally to a novel 3D thrust generator which is capable of receiving pressurized gasses from a plenum, entraining ambient air at still or moving conditions (including but not limited to those conditions greater than 0.05 Mach), accelerating the air via momentum and energy transfer with the high pressure gasses, and directing the well mixed fluids to a high speed, non-circular efflux jet with mostly axial direction velocity component. The efflux jet can be a mixture of hot, high energy gases, provided to the thrust generator via conduits from a high pressure gas generator outlet, and entrained ambient temperature air. The entrained air can be brought to high kinetic energy level flow via momentum transfer with the high pressure gasses supplied to a propulsive device, inside the thrust generator. The resulting mixture of air and gas emerges out of the thrust generator and pointing mainly in the axial, downstream direction, opposite to the direction of vehicle trajectory. The well mixed stream provides a mostly unidirectional stream of colder gas at high velocity, which can be used for propulsion, hovering, lift generation and attitude control via airfoils placed in the wake of colder jet. This is not seen in any conventional jet fuel engine propelled vehicle. This thrust generator may be stand-alone off the fuselage, embedded with the fuselage in the front or the back of the vehicle, and/or embedded in the wings for stall margin improvement.

Reznick invented a circular device with the primary nozzles being detached from the Coanda surface and hence, not generating wall jets. While Reznick teaches that additional secondary fluid is being admitted due to the offset to the Coanda surface, its application, however, is strictly circular in shape and thus, cannot be scaled up in a more practical application for aircraft of larger flows and, for instance, still be integrated with a wing, as drag increasingly becomes larger. In addition, the slots also appear to be simple in geometry and not presenting any particular 3D features for mixing enhancements. The present invention introduces a streamlined propulsor that generates an efflux of rectangular shape at the exit plane, in order to use the energy for additional lift generation in the thin airfoil, an improvement and departure from Reznick's circular application, which cannot be effectively used along a longer airfoil for lift generation in level flight other than its own diameter, and cannot be deployed over a wing to ingest the boundary layer of a wing, as one of the embodiments of the present invention.

Primary Nozzle Geometry.

It is noted that in all the described patents the inventors are not employing any features that would increase the area of the primary jet to the secondary flow, and therefore limitations of the described inventions exist. In addition, no staggering of primary nozzles in the Coanda device exists, with exception of Throndson's presence of the central primary nozzles, which are not placed on the Coanda device but instead in the center of the inlet perimeter of the Coanda primary nozzles. The primary nozzles are therefore in general placed in the same axial plane and not staggered, nor are they different in size from the adjacent ones but of the same size and shape. If for a circular Coanda device this is optionally advantageous, for a non-circular one which has a constant gap between opposite sides of the Coanda primary nozzles along the length of its inlet plane largest dimension the thrust resulting form it would be equally distributed in an ideal situation but during level flight, if such a device is employed for thrust generation, the secondary incoming air would unevenly be admitted into the device and therefore the thrust generation will impose challenges to the wing structure and its design. This is mainly because in the aforementioned prior art, it was envisioned that these devices were used at the initial and final stages of the flight of an aircraft and not as a single, thrust generation propulsor for the entirety of the mission, from take-off to landing and including hovering and level flight. Indeed, Throndson's invention is applicable for vertical take-off only and landing and hovering, with the main power plant taking over the level flight function of providing thrust via a turbojet or turbofan. Hence, in his invention, the devices including the Coanda ejector are shut down and forming the airfoil of the wing in level flight, i.e. not operative or active during level flight, after transition from take-off. On the other hand, Reznick teaches a circular device with primary nozzles for thrust augmentation but without embedding it with a wing for level flight and exploiting both the intake and exit of the device for other than generating thrust, which is the present invention.

Figure 18A:
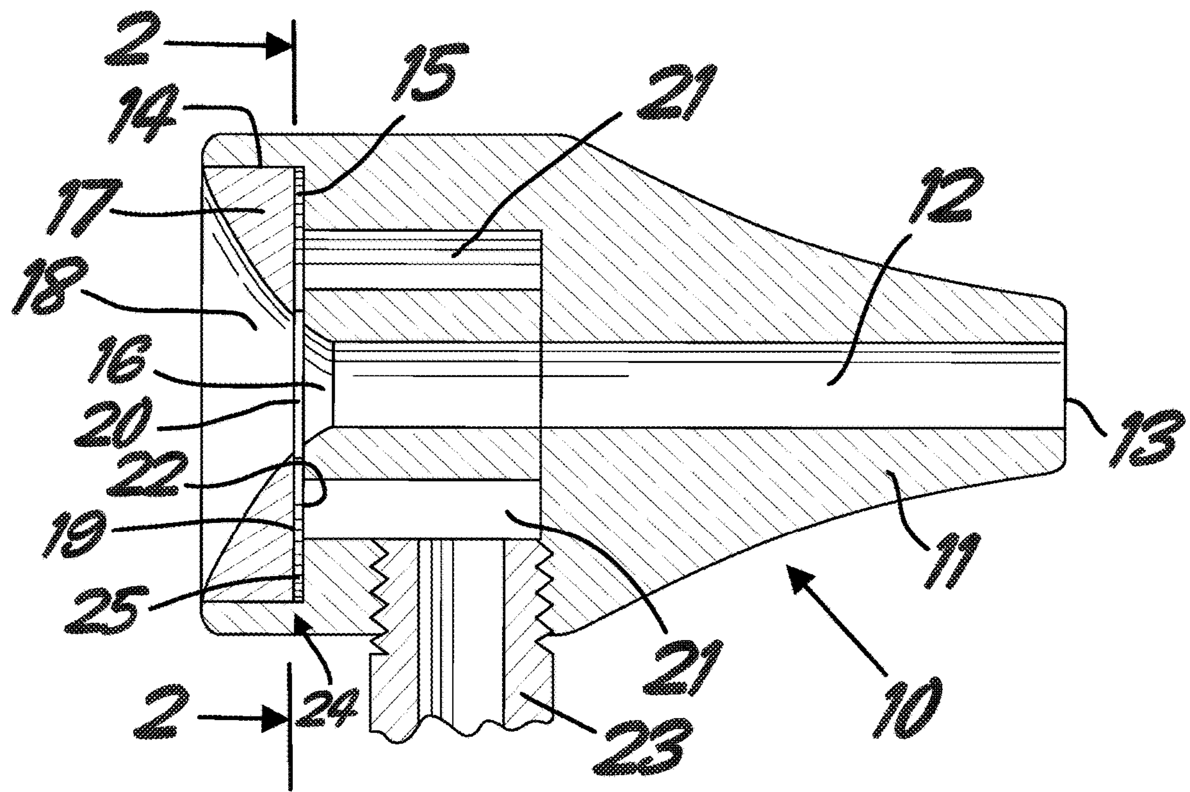
FIGS. 18A-18D show typical conventional arrangements for Coanda-type ejectors.
Figure 18B:
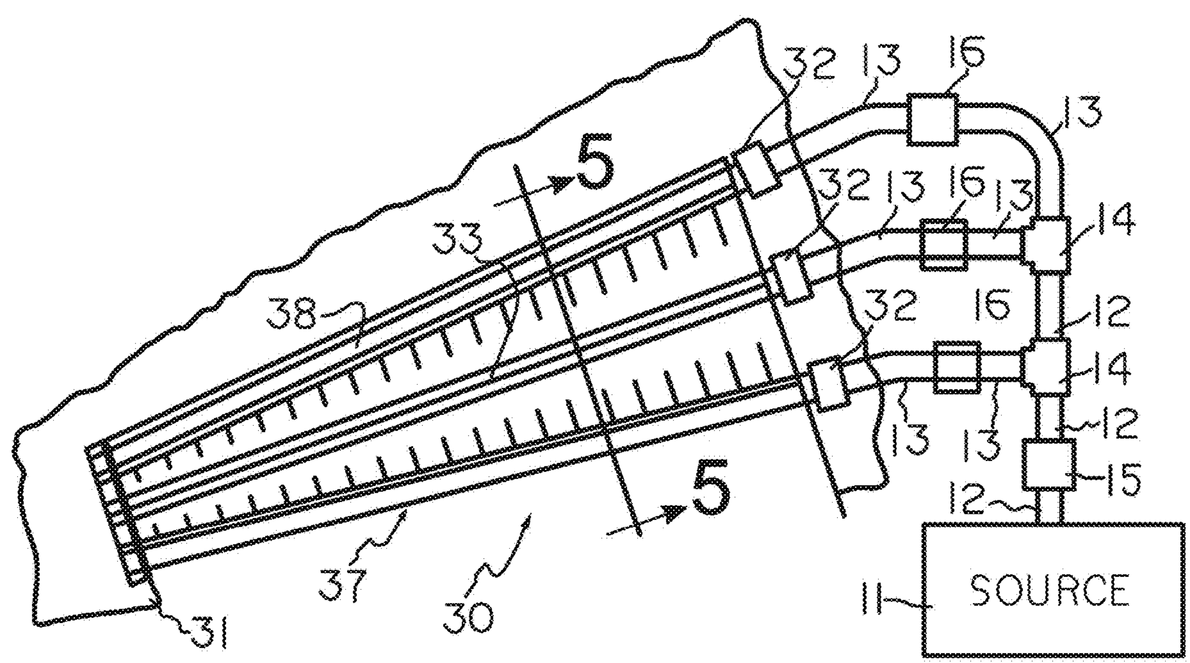
Figure 18C:
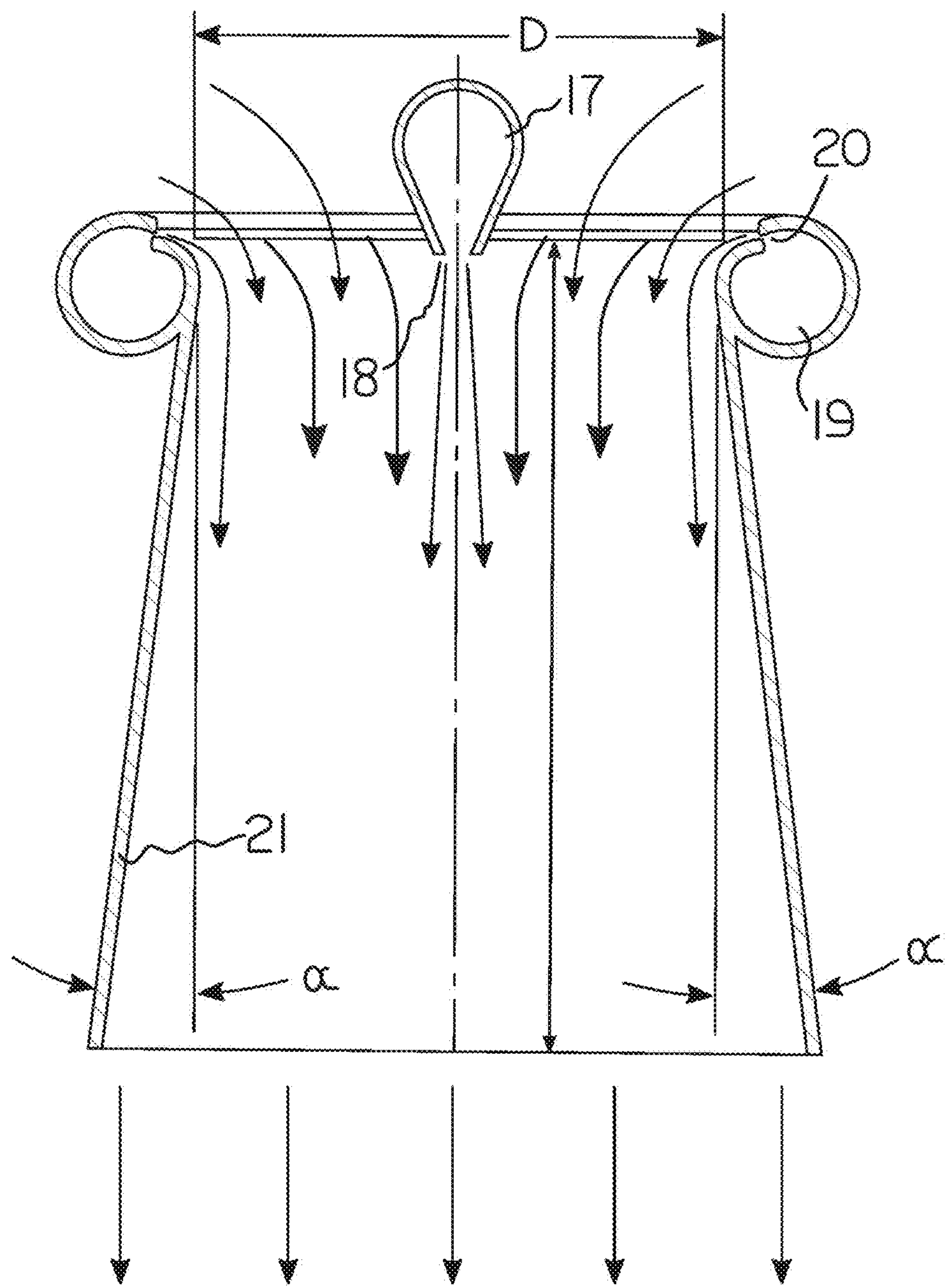

FIGS. 18A through 18E show conventional arrangements for Coanda-type ejectors. FIG. 18A depicts a traditional Coanda ejector of circular shape from prior art. FIGS. 18B and 18C show a flat Coanda type ejector embedded in a wing from prior art. The source of the primary fluid is a gas turbine and the ejector is optionally advantageously meant to be used for vertical take-off and shut off in level flight. FIGS. 18B and 18C encompass the elements disclosed as variables of Throndson, including diameters, angles and lengths.

Figure 18D:
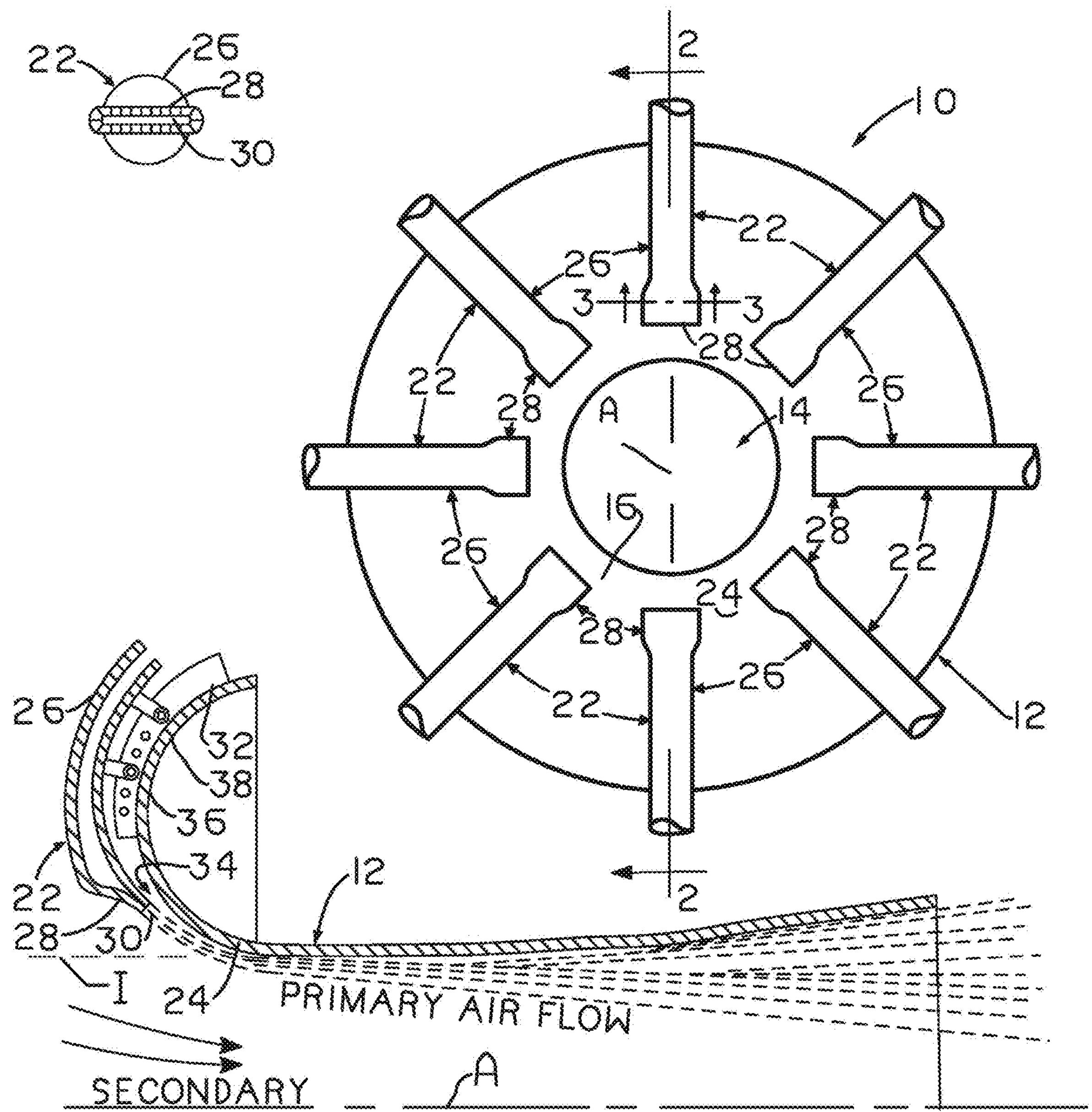

FIG. 18D is FIG. 3 of Reznick and shows another circular embodiment where hypermixing nozzles are employed and the primary fluid nozzles are away from the walls of the ejector. Hence, the primary jets are no longer wall jets. Reznick only covers the circular geometries of the ejector, clearly meant to be used for take-off assistance due to scalability limitations.

Figure 18E:
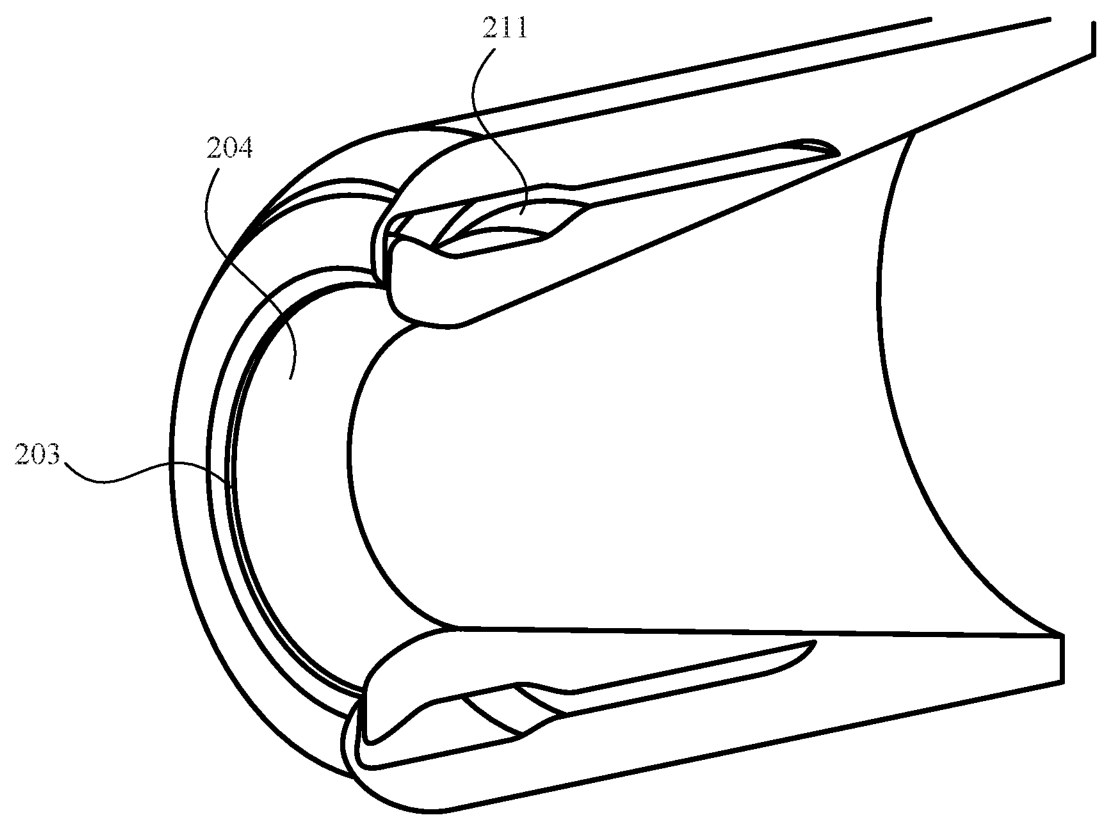
FIG. 18E is one embodiment of the present invention depicting circular Coanda ejector with simple primary nozzle elements.

FIG. 18E depicts one embodiment of the present invention with circular Coanda nozzle elements, with a plenum 211 supplied with primary fluid, which is accelerated through primary nozzles 203 and injected as wall jets over surface 204.

Throndson uses a non-circular form of the ejector but also rectangular slots. A rectangular slot is useful in such an application but produces a limited surface for a shear jet entrainment of the secondary, approaching air. Indeed, a rectangular slot described by the inventors above produces a jet entrainment characteristic to a rectangular slot perimeter of the given dimensions, 2L+2h=2(L+h) where L is the length and h is the height of each slot. A much larger quantity of secondary flow is entrained if a larger perimeter of the primary nozzle is used, including the impact of 3D features. Staggering axially the vertices of a zigzag or wavy (sinusoidal) walls of a primary nozzle as shown in FIGS. 18A through 18E greatly enhances the entrainment of secondary air as taught in the present disclosure. A pulsed operation via embedding fluidic oscillators with the primary nozzles further enhances the efficiency and entrainment characteristic of the ejector.

Figure 19A:
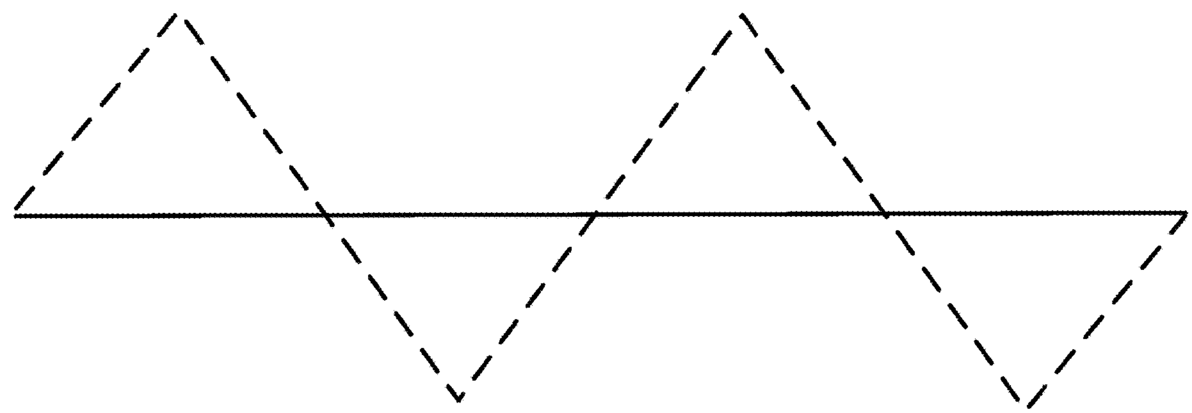
FIG. 19A-19D depict different embodiments of the present invention featuring primary nozzles with better performance.
Figure 19B:
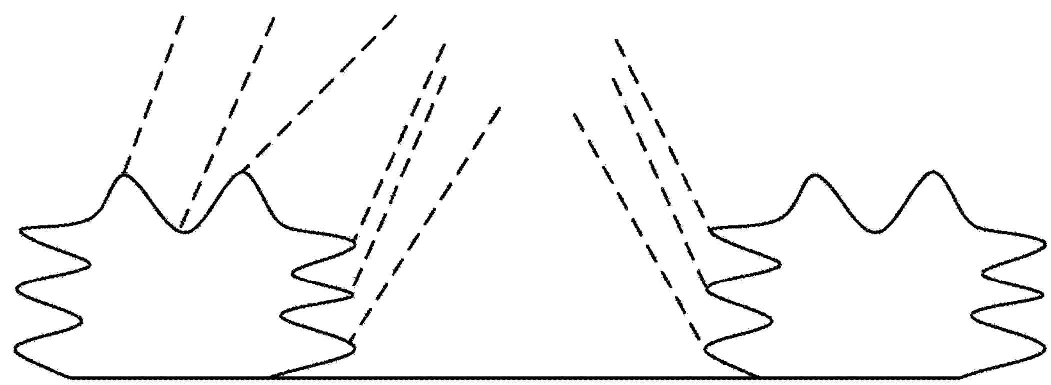
Figure 19C:
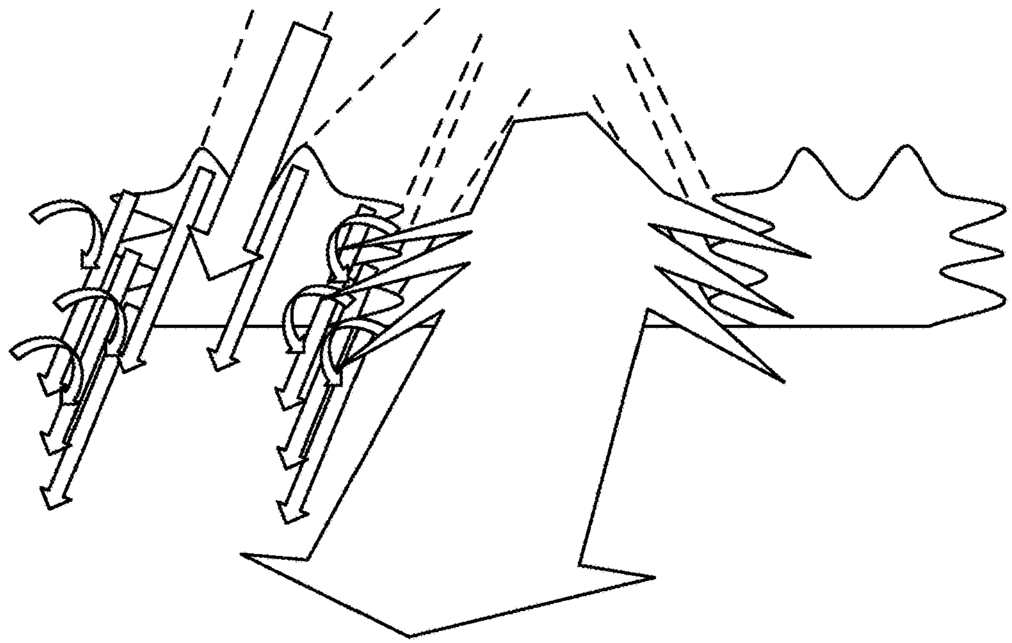

FIGS. 19A through 19D depict some of the proposed changes in primary nozzles for better performance. FIG. 19A shows a zig-zag configuration of primary nozzles along the circumference of the inlet area of the ejector, whereas the primary jet perimeter exposed to the secondary flow is doubled compared to a simple slot perimeter, hence increasing the entrainment via turbulent shear layers developed in-between said zig-zag walls of the primary nozzles. FIG. 19B shows a rectangular slot with increased, roughened perimeter to generate additional turbulence, and hence increase entrainment 1.5-4 times compared to the original, smooth walls of a rectangular slot. FIG. 19B describes schematically the increase of the area of the primary jet surface to the secondary or entrained air, with the 3D structure of the spikes explained in axial direction. While normally in a rectangular slot arrangement the secondary air is entrained mainly in between two adjacent slots and on the outer radius slot side, the entrainment is greatly enhanced now via surface and 3D effects. FIG. 19C explains the primary jets and secondary jets respectively, with the turbulence generated by the 3D features greatly improving the mixture and momentum imparting of the primary flow to the secondary flow in a shorter distance. FIG. 19C shows the interaction and flows resulting from said adjacent rough wall slots, with red arrows depicting the primary fluid and the blue arrows the entrained, secondary fluid. Shear layers are formed along the walls and the increased perimeter results in significantly higher entrainment of secondary flows for the same input, primary flow conditions. Pulsed operation of the primary nozzles further enhance the entrainment ratio.

Figure 19D:
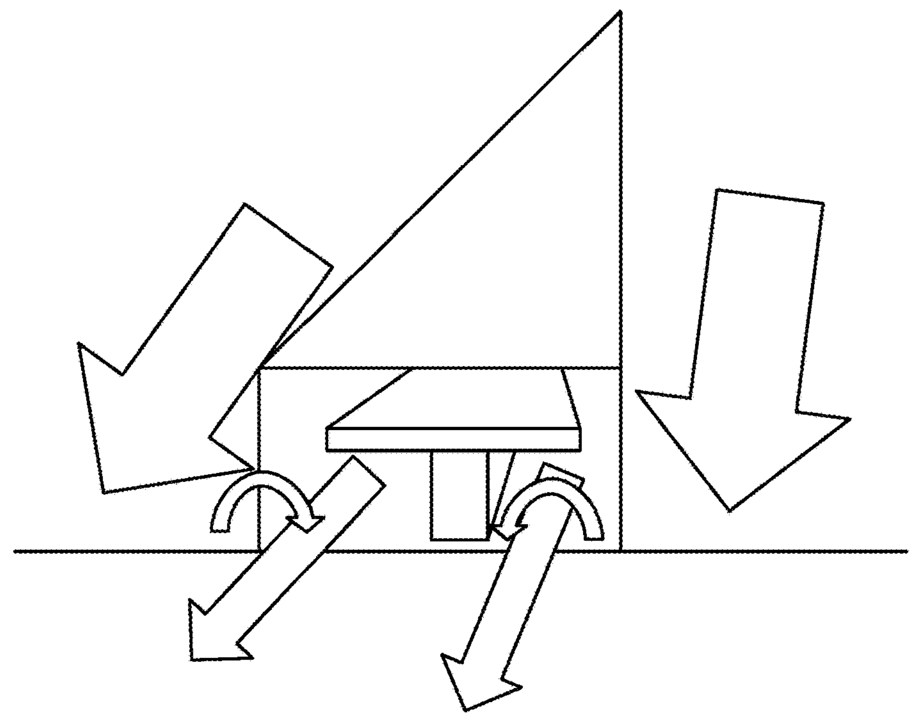
Figure 19E:
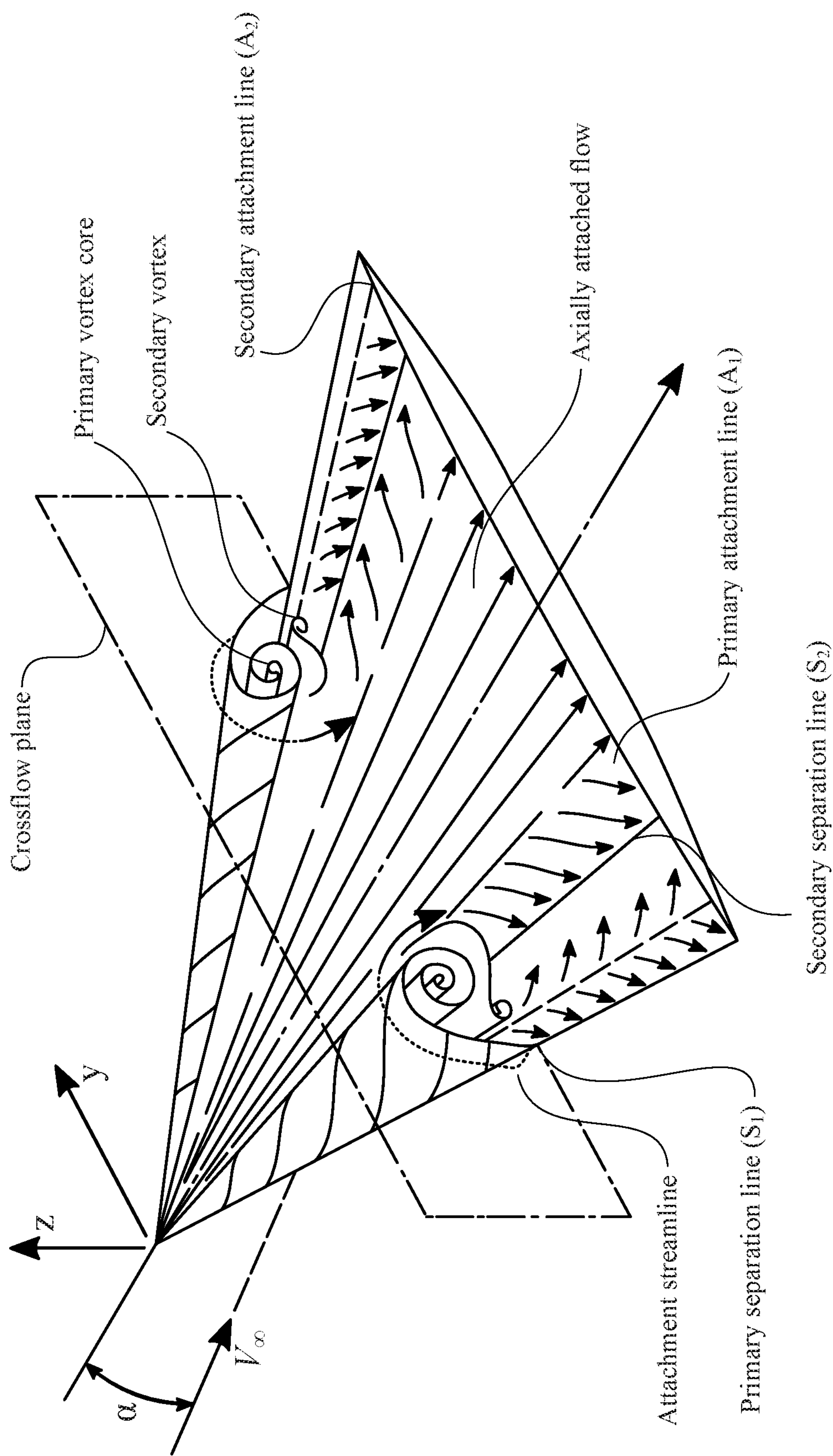
FIG. 19E illustrates the flow over the delta wing obstruction placed inside the primary nozzle in its center.

Another feature one embodiment of the present invention is the introduction of advantageous features inside the primary nozzle (see FIGS. 19E and 19E). It is well known that a flow over a delta wing produces vortices that are opposed in direction towards the center of the delta wing. A miniature feature is placed in some or all of the primary nozzles to generate such vortices that emerge from the primary nozzle. In this case the vortices advantageously entrain significantly higher amounts of secondary air into the ejector, enhancing its mixture and the imparting of momentum carried by the primary fluid coming out of the primary nozzles in a continuous or pulsed manner.

FIG. 19E explains the flow over the delta wing obstruction placed inside the primary nozzles in its center, which changes the pattern of the flow such that it increases significantly the entrainment ratio of a normal primary nozzle slot, without requiring changes in the flow rates of pressure and temperatures. In particular, the primary vortex cores are opposed in direction towards the center of the said slot or delta wing, entraining significant secondary fluid from the area in between the slots.

FIG. 20 describes the thermodynamic cycle of the current disclosure with the evolution of the working and entrained fluids to obtain a high thermodynamic efficiency. FIG. 20 demonstrates that entrainment of air will determine the movement of point D which represents the mixing condition between the primary gas and secondary air, in a propulsion thermodynamic cycle diagram, to the left and at lower values of Temperature and entropy. This is optionally advantageous for a high propulsive efficiency device, where massive amounts of air are entrained and accelerated to relatively lower exit jet velocities, maintaining a high thrust level due to higher mass flow rates, a key ingredient to realizing high propulsive efficiency. In FIG. 19A, an increase in the perimeter by a factor of 2 is showed by replacing each length of a normal rectangular slot perimeter with a 2× longer perimeter equilateral triangle in the same plane. The perimeter can be further increased by staggering all vertices of the slot walls in various planes (see FIG. 19B). The result of such a primary nozzle is to increase the amount of the fluid entrained as secondary fluid by at least 15-50% through intimate mixing inside the formed shear layers. If the secondary air initial condition was of low speed, then the performance of the rectangular and non-rectangular perimeter shapes may be not very different, however, when the ejector is moving forward and approaching secondary air velocity is significantly larger, such as between Mach 0.0 and Mach 0.25, then the spiked profile shape of the primary nozzle may also improve significantly by placing the inner most and outermost spikes of the primary nozzle ahead and behind the axial plane of the said rectangular slot. In other words, each primary nozzle becomes now a 3D structure which will delay or anticipate the entrainment of the secondary air in an efficient manner hence improving the overall entrainment rate. In a Coanda ejector it is optionally advantageous that the secondary air entrainment and mixing with the primary air for momentum transfer happens fast and over a short distance. Adding this and other 3D elements to the primary nozzle help improve the performance of said ejector.

Another feature related to primary nozzles as employed in this embodiment is the introduction of fluidic oscillators within the primary nozzles flowpath. These fluidic oscillators provide e.g. up to 2000 Hz switches between two adjacent primary nozzles to alternate the wall jet flows and improve entrainment rates via pulsed operation of the motive fluid.

Yet another feature implemented in this invention is the staggering of the nozzles with its features, by being placed at various locations along the Coanda surface and hence via introduction of the primary flow at multiple axial locations, adjacent to the wall in a wall jet manner and in a pattern that increases the entrainment and mixing of the secondary fluid. For example, FIG. 21 shows such an embodiment where a V-shaped, vortex generating feature is staggered when compared to a normal rectangular slot and injecting at least 25% of the total the primary fluid before the balance of the primary fluid massflow is injected at a moment later. This injection prior to the rectangular slots results in a higher entrainment rate enough to increase the performance of the ejector significantly. Moreover, in FIG. 21, the primary nozzles 205 inject the primary fluid before the 203 primary nozzle. Primary nozzle 205 has a feature that introduces a more favorable entrainment of the secondary flow via shear layers and these nozzles 205 are staggered both axially and circumferentially when compared to the primary nozzles 203. Primary nozzles 203 have a delta wing feature that is provided with a supporting leg connected to the middle point of the primary slot structure at the inner most side of it and having the delta wing structure pointing against the primary fluid flow to generate 2 vortices opposed in direction and strongly entraining from both sides of primary nozzle 203 the already entrained mixture of primary and secondary fluid flows resulting from nozzles 305. The vortices and V structure of the primary nozzles result in an improvement of entrainment of 10-100% compared to the rectangular, non-staggered slots and an overall improvement of the momentum transfer from primary to secondary flow.

Furthermore, FIG. 21 depicts a simpler construction using delta winglets paced inside smooth wall slots to form specific delta wing flows and shear layers that advantageously increase the entrainment ratio by more than 2 times compared to the smooth wall rectangular primary slots. All these elements can be combined for the best entrainment ratio. The present invention improves the surface for flow separation delay via elements 221. By placing dimples on the Coanda surface 204, where said Coanda surface 204 has a relatively aggressive turn for the shortest distance change of primary flow direction, radially originating from primary nozzles 203, to axial direction opposite to thrust direction, towards the throat 225. The dimples prevent separation of the flow and enhance the performance of the ejector significantly, in conjunction with the delta turbulators shown in FIGS. 19D and 19E.

FIG. 23 illustrates certain features according to an embodiment of the present invention. In particular, FIG. 23 compares a similar primary slot height used by Throndson with the ratios used by Throndson to demonstrate the improvement of this embodiment of the present invention. The radius of turn to slot height of this embodiment is below 5:1 with improved separation delay dimples placed on the Coanda surface. In FIG. 23, the radius R' is about 2-3 times smaller than the R radius from patent by Throndson, for similar slot heights. It follows that a smaller than 5:1 ratio is possible, due to use of a logarithmic profile in conjunction with the employment of dimples on the curved, Coanda surface, to turn more aggressively the flow from pure radially at the exit from the primary slot to purely axially at the throat. As a result, a much faster turn without flow separation follows, so the throat of the device may be larger than that specified by Throndson by at least 25-100%. The half angle of the diffuser can also be made significantly more aggressive than in prior art, allowing for a much shorter diffuser to be implemented and more rapid momentum transfer between the primary and secondary flows. As such FIG. 23 highlights the differences between the present invention and the prior art, especially where more aggressive elements such as turbulators, primary nozzles, dimples and movable walls improves the prior art.

Coanda Ejector

In general, the design of a Coanda ejector as applied to an aircraft has been described by many publications. For example, U.S. Pat. No. 3,664,611 (Harris) teaches a Coanda type ejector embedded in the wing for vertical take-off and landing purposes. The device is not active during cruise, see FIG. 24. Harris is silent on the use of the efflux for generating more lift in a tandem type arrangement. Moreover, Harris does not apply the device for use in level flight conditions. Rather, consistent with conventional practices, the device collapses into an airfoil wing during level flight conditions.

Mocarski, on the other hand, teaches that in a Coanda ejector, the primary, high energy fluid, also called motive fluid, is injected as a wall jet and the principle of such a device is to determine a low pressure zone where ambient air is entrained, followed by a mixing, converging zone towards a throat, followed by a diffuser to expand the mixture back to the ambient pressure at high velocity. U.S. Pat. No. 3,819,134 (Throndson) modifies and improves on this concept described in Mocarski.

Throndson describes an enhancement of the technology by adding a primary flow into the center of the Coanda type ejectors to further entrain secondary fluid and to enhance the performance of the nozzle, with the primary, central nozzle using 30-70% of the total primary fluid and the balance being used in the Coanda-type, parametric nozzles. Throndson claims that the thrust augmentation is greatly enhanced by this combination, and not commenting on the primary fluid nozzles geometry, which appears as simple slots or orifices. In addition, the slots appear to be continuous or discontinuous and without special features. Throndson is silent about the use of the efflux jet for lift generation downstream and indeed, it only employs the device for take-off and transition and landing, not for cruise conditions, much like Harris.

The present invention further improves the Coanda ejector by generating thrust at all flight conditions via swiveling of the Coanda device and by placing a thin airfoil in the jet efflux hence generating more lift. Such turbofans generally employ at least two advantages over Harris and Throndson:

First, the use of the ejector downstream of a wing such that it ingests its detrimental boundary layer at cruise conditions, improving the wing's aerodynamic performance and allowing high angles of incidence, hence increasing its overall performance. The present invention also allows the operation of the ejector in all phases of flight, from take-off through hovering, transition, cruise and landing. One embodiment also allows the use of a semi-ejector (½ of a flat ejector as described by Throndson or Harris) in conjunction with a flap of a wing to form a non-symmetrical Coanda ejector with the entrainment of the boundary layer only at the outer edge of said boundary layer and forming a diffuser with said flap of the wing, including vectoring the thruster by moving the flap and the air knife type Coanda ejector in coordination for take-off and landing.

Second, by using a thin airfoil downstream of (in the wash of the ejector) at a minimum in level flight but also for other conditions of flight for additional lift generation in a higher speed stream, it allows the airfoil and propulsor tandem to be more compact and efficient while generating considerable lift, as compared to those disclosed in the aforementioned patents. In this embodiment of the present invention, the shape and profile of the propulsor efflux jet is critical to achieving its novel efficiency and functionality. The said thin airfoil is placed at convenient distance from the exit plane of said ejector/propulsor in order to maximize the lift but also before the efflux jet's energy is dissipated to the ambient. This is convenient and practical as the energy of any jet propulsion device usually dissipates only over very long distances behind the aircraft.

It is also of importance to understand that both elements of said tandem need to work together in an efficient and optimized manner, including moving at certain angles and rates favorable to the concept. The thruster/propulsor transmits mechanically the thrust component to the fuselage of the aircraft or its main wing, whereas the thin airfoil downstream of the propulsor is in mechanical contact with the fuselage and not the propulsor, yet receiving its efflux jet in such manner that it maximizes the lift of the aircraft and allows for maneuvering via movements of certain surfaces on said thin airfoil.

Another feature of the present invention provides for the capability to use of the same nozzles for lifting the aircraft hovering and landing as well as for cruise purposes. The lift system disclosed in U.S. Pat. No. 8,910,464 (Ambrose) represents the common backbone of the VTOL jet fighters. It has limitations due to the extra weight carried around in cruise mode, namely the lift fan and its auxiliaries. Under current VTOL technology, the cold nozzles (forward nozzles) and the lifting fan are shut down during level flight which leaves the main exhaust nozzle to provide the reaction force to propel the aircraft forward at forward moving conditions such as cruise. One embodiment of the present invention combines Coanda nozzle thrust generation elements with the propulsive system of the aircraft allowing the ejector to be employed at all stages of flight with weight minimization and elimination of moving parts. Moreover, it enables the use of such an ejector to minimize drag and maximize lift in a unique manner during level flight.

Mocarski presents the same technology for Coanda device with continuous or discontinuous primary fluid slots, mainly circular or linear. In all these patents the Coanda surface is a circular or 2D smooth profile to determine a simple boundary layer attachment without particular elements which can enhance the entrainment, increase the aggressive turn of the Coanda surface or delay its separation. In ejectors of Coanda type it is critical that the turn of the surface that allow the boundary layer of the wall jet to grow and mix with the secondary air and not become separated. Once the primary flow jet from the primary nozzles becomes separated, the Coanda ejector will not operate efficiently or at all. It is therefore paramount that the surface curvature is such that allows for maximum boundary layer growth and entrainment of the secondary fluid and mixing with it, without separation at the wall.

On the other hand, if the curvature is too large, the device becomes impractically long and large in diameter, restricting also the amount of the secondary fluid entrainment and mixing and inducing a very long diffusing portion of the device. The ratio of slot to the radius of the Coanda turn is described by Throndson to be between 1:5-1:15, but a ratio smaller than 1:5 should be ideal for rapid turn. The turn of the Coanda curve is clearly stated by Throndson to be ideally between 30-110 deg. compared to the axis of the device. If the diffusing section is becoming too large, this is an important limitation in deploying the technology for an aircraft in level flight, as the length of the diffuser would impose significant additional drag and weight on the aircraft. Should the turn become >110 degrees, then the diffusor may become shorter and enhance the mixing on a much shorter distance, assuring the intimate mixing and energy and momentum transfer to the secondary flow before the exit of the mixture from the device. It is noted that the walls of the diffusor are also flat and without 3D elements for enhancement of the mixing process. One embodiment of the invention introduces moving walls past the throat section, especially in the diffusing area of the ejector, in a manner favorable to the vertical take-off and landing of an aircraft, without the need to move the entire ejector around its horizontal axis but rather by extending the segmented diffusor surfaces in a manner described below.

Coanda Surface.

The Coanda surface, as taught by Reznick, Mocarski and Throndson, should be a round curvature, with Throndson providing even more precise details that the range of ratios of slot height to radius of 1:5 up to 1:15. A logarithmic profile is preferred by those skilled in the art, since it provides the fastest boundary layer growth without separation of the wall jet. However, one embodiment of the present invention achieves a far more aggressive turn by introducing dimples on the Coanda surface to significantly improve the turn of the surface in order to keep the flow attached while mixing and moving the mixture into the throat and diffuser. An aggressive turn is preferable because it allows for the ability to quickly mix and turn the flow in the axial direction, through the throat and into the diffuser section. The turn of fast moving fluids, in fact, can keep the boundary layer attached, while the boundary layer grows and mixes with the central flow.

The dimples in the present invention may be of different sizes, may be staggered or aligned, may be located in areas where the turn is more aggressive and not in areas where the turn of the fluid is less aggressive. The dimples may also be employed on a more aggressive diffuser, where the half angle of the diffuser is not constant but variable, growing and then reducing to 0 as depicted by element 105 in FIG. 14.

FIG. 14 depicts one of the improvements achieved by the present invention, especially when compared with Thorndson. FIG. 14 compares a similar primary slot height used by Throndson with the ratios provided in Throndson to demonstrate the improvement of the current invention. In particular, FIG. 14 shows the upper and lower halves of semi-ejectors that together form a better, more flexible and performant ejector that can be suited both for vertical take-off and hovering and for level flight at cruise conditions. The lower (1401) semi-ejector wall is more aggressively utilizing the primary nozzle wall jets to turn more aggressively the flow around axis 102 and over the surface 103, a Coanda inlet surface. The maximum height point of this curve is axially position at a point about 'G' distance from the similar lowest position of the curved wall (closes to the axis shown in blue) of element 201. Hence, the two semi-ejectors (or airknife ejector walls) 1401 and 201 are staggered, i.e. their inlets are not positioned axially at the same location. Similarly, the minimum distance axial location of 1401 and of 201 is staggered by distance 'G'. their diffusers 110 and 210 can change shape by means of actuators 115 and 215 respectively, where the flat segmented surfaces forming 110 and 210 become a curved cross section 110*a* and 210*a* respectively, directing the flow inside the said ejector downwards or in various directions as dictated by the mission. FIG. 14 also depicts the changes in ratios compared to prior art.

Furthermore, the radius of turn to slot height of the current invention is below 5:1 with improved separation delay dimples placed on the Coanda surface. As a result, a much faster turn without flow separation follows, so the throat of the device may be larger than that specified by Throndson by at least 25-100%. Moreover, by applying a constant variation of the half angle of the diffuser part (i.e. non-linear growth of the wall away from the centerline) and employing dimpled surface into the said diffuser, its dimension may grow without separation of the flow more aggressively, resulting in a shortening of the overall length of the device.

In addition, if both the upper and lower half of the ejector act separately with respect to fluid supply and functionality, but are able to work together for entrainment, mixing and diffusing of the mixture to the exit plenum, then the performance is greatly improved by the additional diffusor moving walls on both upper and lower surfaces of the flat diffuser. This, in turn, also allows the more compact device to be implemented in conjunction with a wing structure for propulsion reasons in level flight or vertical take-off, hovering and landing with no need to rotate the entire structure.

Figure 22A:
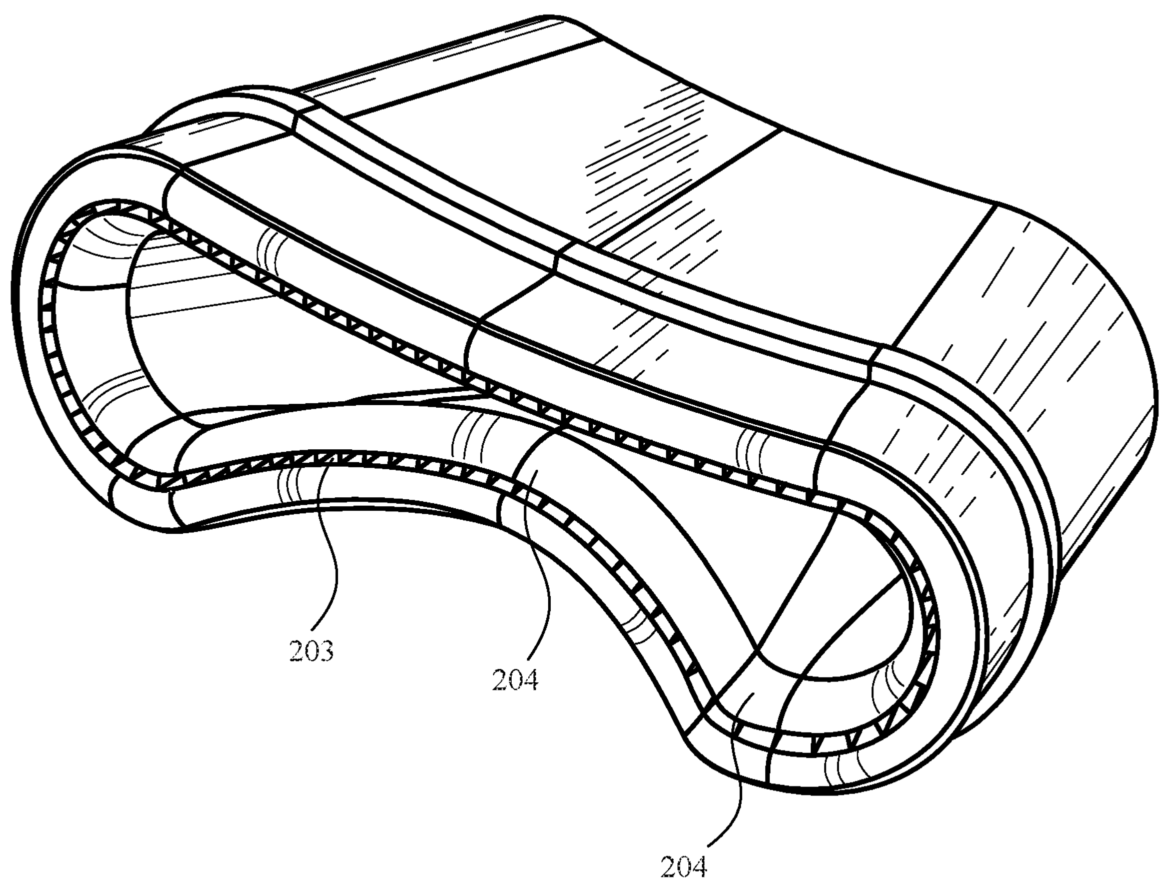

Moreover, the use of dimples allows a variation of the wall from the initial point until the exit all around the perimeter of the said ejector, hence allowing good integration with the wing structure. A different structure is used at the round ends of the ejector, where dimples or special features on the primary nozzles may not be required for the ejector to perform satisfactorily. FIG. 22A shows an ejector that has significant 3D features as described in this invention. In addition, in the most aggressive zones of the turns on the lower wall of the diffusor, the use of dimples (element 221 in FIG. 21) will also allow a greater turn to up to 90 degrees downwards or even more. This is more aggressive than the prior art (e.g., Throndson; see Fernholz, H. H. "Z. Flugwiss. 15, 1967, Heft 4, pp 136-142). FIG. 14 shows a cross section of an ejector that has significant 3D features as described in this disclosure. FIG. 14 also shows mostly-segmented walls on the diffusor, able to redirect the ejector efflux jet and to maximize its performance from the changes in the diffuser areas and mixing zones. The inlet plane of the ejector is not lying in a plane (not planar), and hence it is possible to place the ejector above a wing structure such that the ingestion of the boundary layer is improving the wing airfoil performance, as it can be seen in FIG. 14 with dimension G (gap) between the two inlets of the upper and the lower ejector halves. The Coanda surface (104 in FIG. 14; 204 in FIG. 22A) is hence not admitting the primary fluid wall jets at the same axial position, but sooner at the proximity of the airfoil surface and later away from the wing airfoil surface, in the axial time-history direction.

Figure 22B:
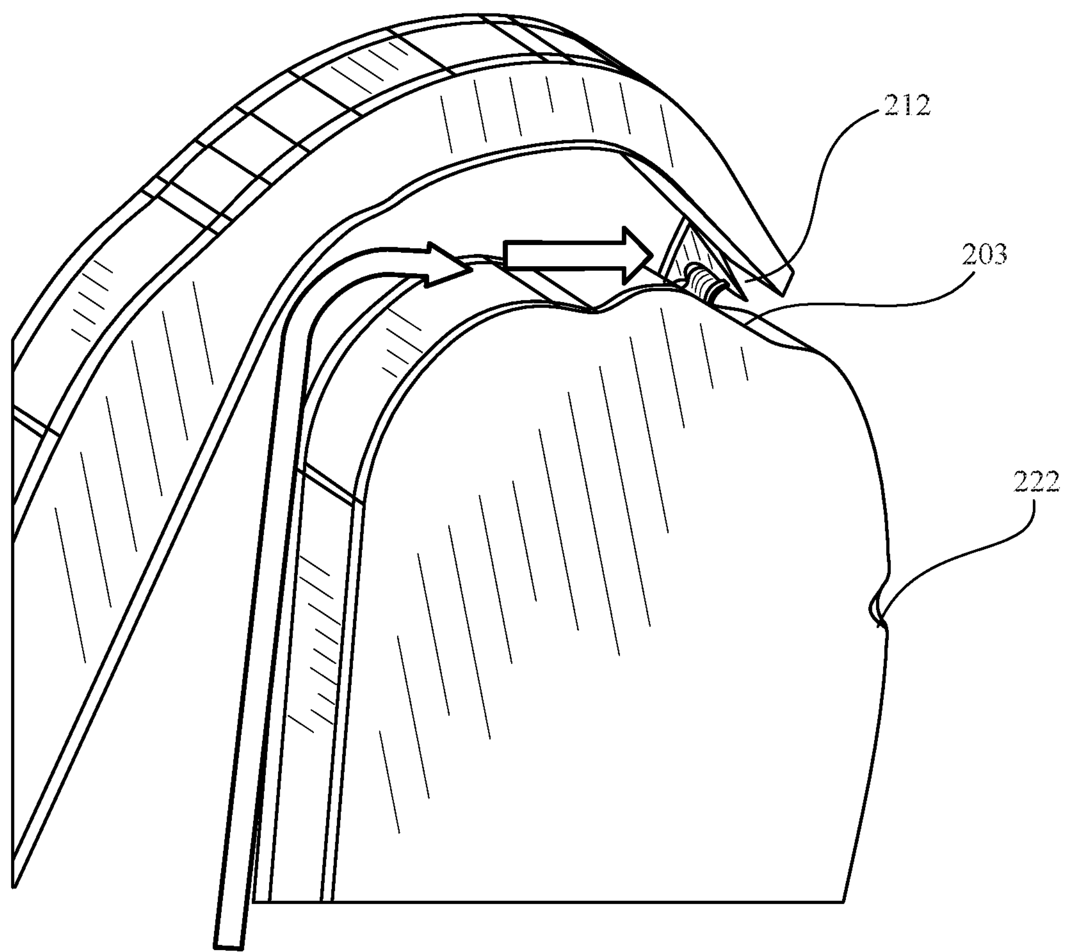
Figure 22C:
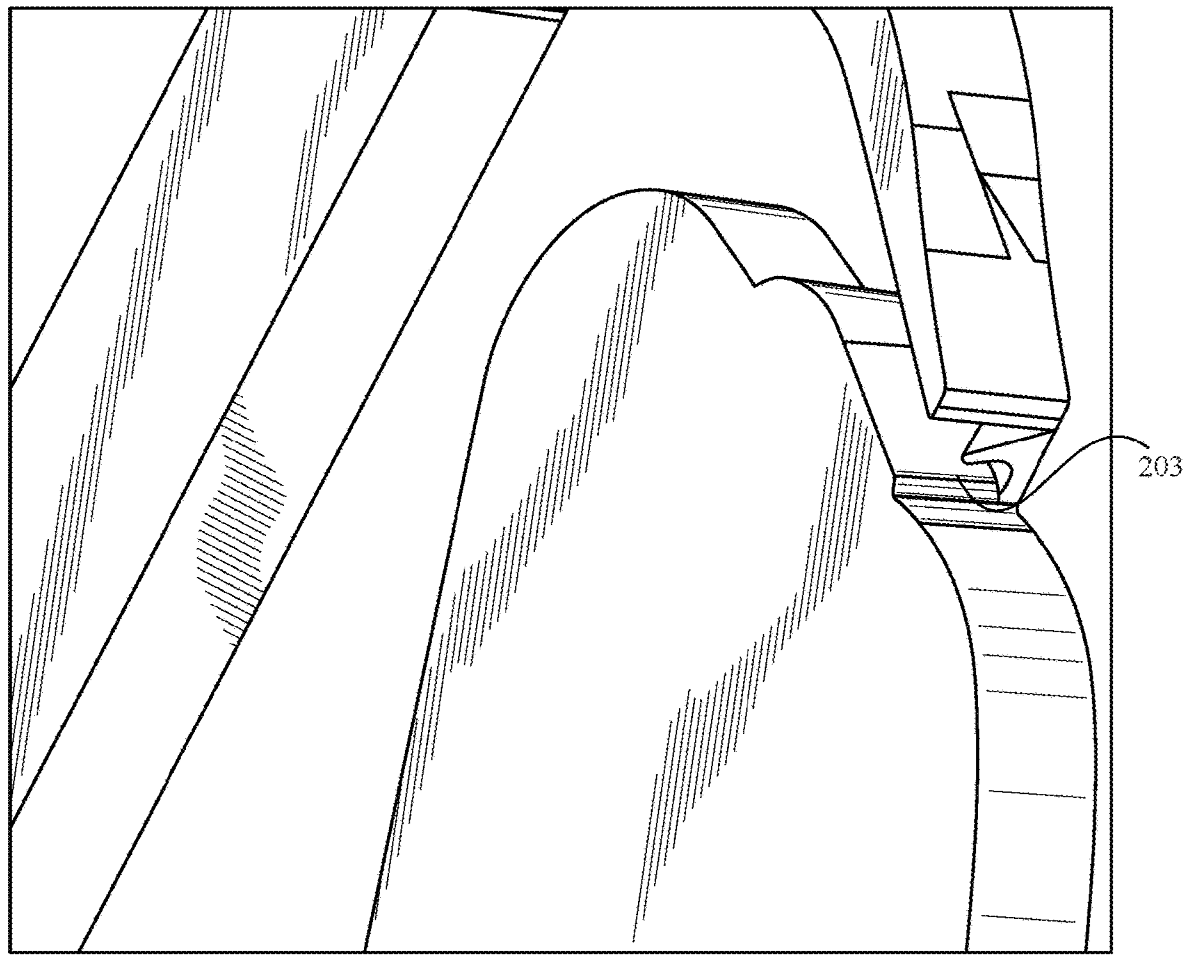
Figure 22D:
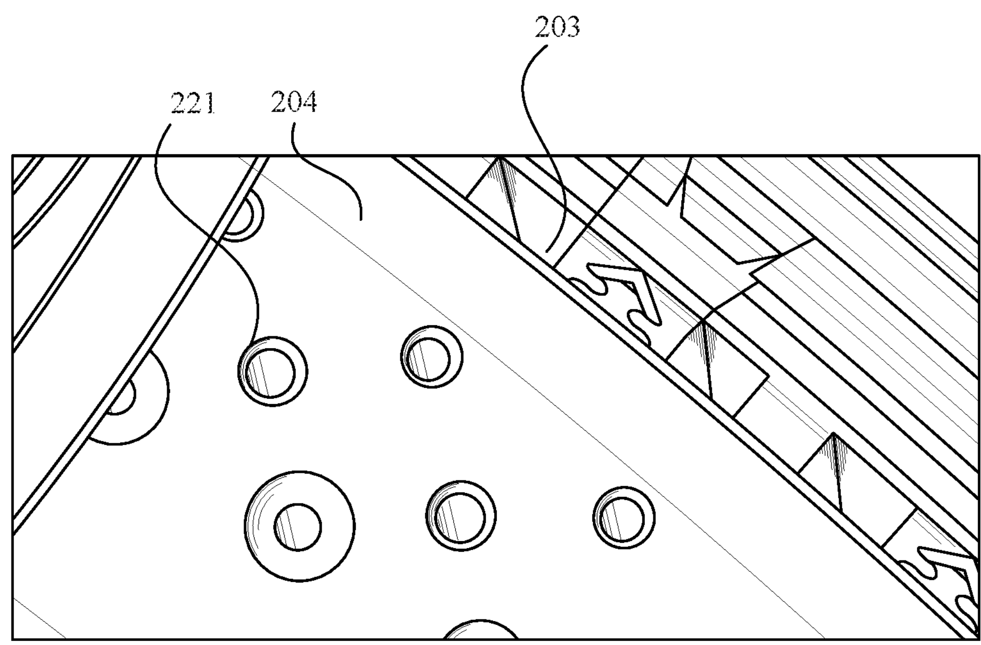
Figure 22E:
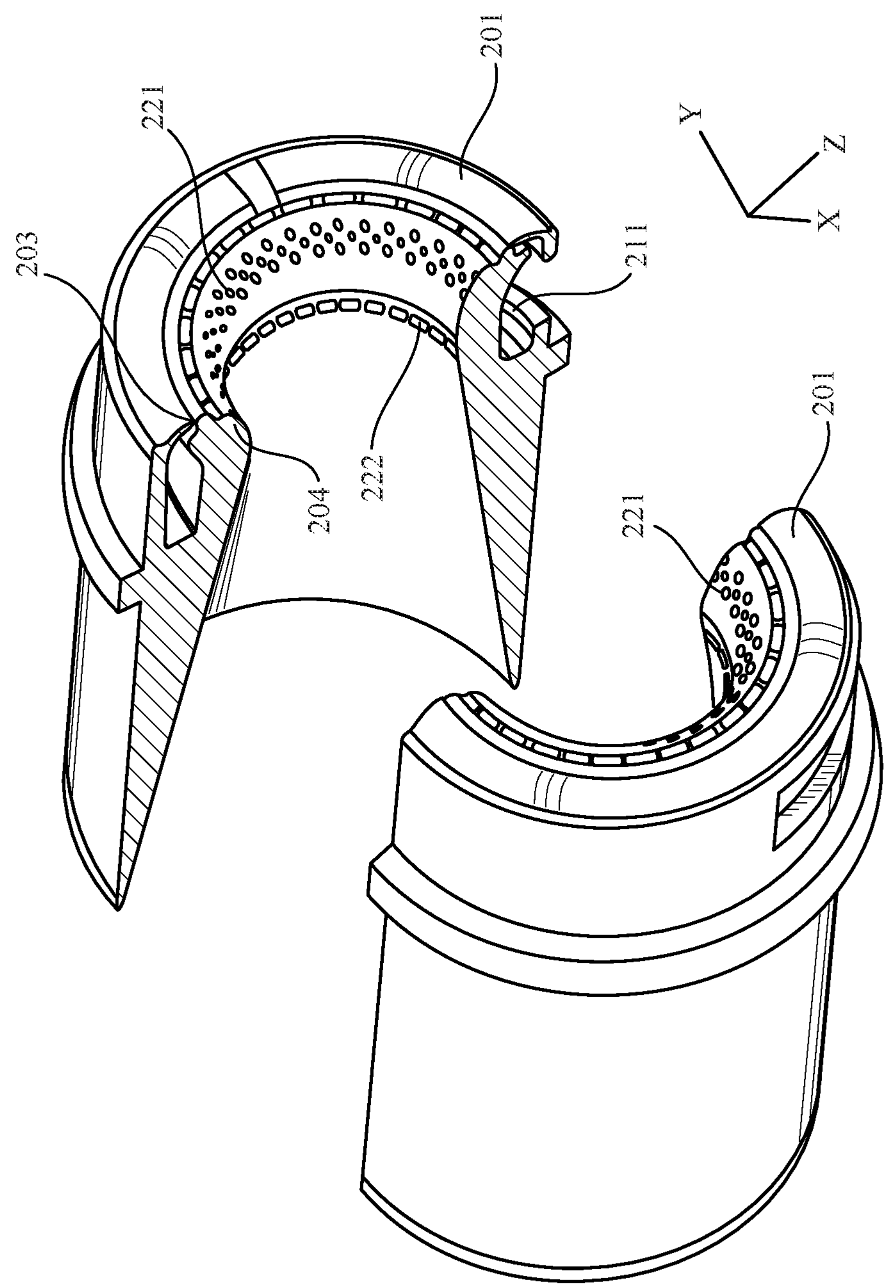
Figure 22F:
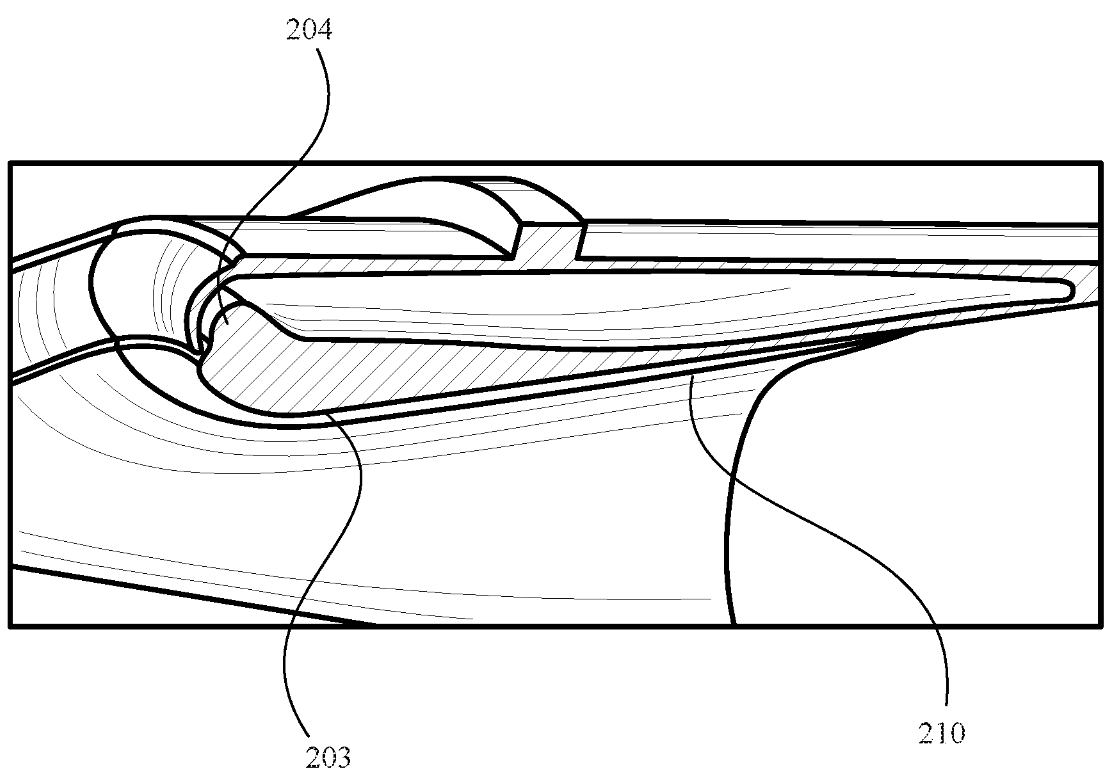

FIGS. 22A through 22F illustrate different embodiments of the present invention, where 3D features are used in the inlet. FIG. 22F features an upper semi-ejector. FIG. 22B shows the element 212 as a delta turbulator placed inside a primary nozzle, that enhances considerably the entrainment of secondary flows, and dimples such as 222 that enhance attachment and prevents separation even at most aggressive turns of the Coanda curved wall 203 of FIGS. 22A through 22F, and FIG. 14.

In FIGS. 22A through 22F, element 212 is also introduced in the primary nozzles to enhance entrainment and they may be employed or not on the opposite side of the ejector, depending on the conditions and to enhance the performance. Dimples 221 are placed on the contour 204 and the diffuser to guarantee a good momentum transfer in the shortest length and generating as uniform as possible exit velocity and temperature profile of the mixture of primary and secondary fluids and avoid separation of the flow. These primary fluids may be pressurized air from a compressor bleed or pressurized exhaust gas from a gas turbine or a mixture of both and can be fed to the upper and lower ejector halves 1401 and 201 separately, adding another degree of freedom on maximizing the efficiency of thrust generation.

In FIG. 22A, 3D features increase the perimeter exposed to the flow and allowing for higher entrainment ratio. In FIGS. 22B and 22C, specially designed turbulators, such as a delta wing placed in the center of the primary slots, cause the flow from the primary fluid plenum, supplied constantly by, e.g., a gas generator, to be accelerated in a passage and forced to flow over the said delta turbulator 212. The element 212 forces the flow into patterns that greatly improve the entrainment of secondary flow via a series of mechanisms including shear layers, rotating and counter-rotating turbulent flows and increased wetted perimeter of said primary slots 203. Embedding fluid oscillators within the primary nozzles provides also additional capability for entrainment via pulsed operation on adjacent primary nozzles.

FIG. 25 shows an arrangement of the ejector with the advantage of having a 3D inlet with the lower lip (22) of the ejector that is closer to the upper airfoil wall side 20 and beyond the apex of said airfoil, staggered axially and positioned ahead of the upper lip (23) of said ejector further away from the airfoil surface 20. The position of the lips are modeled to match the most probable boundary layer velocity profile (21) resulting from airflow near the airfoil. By anticipating the entrainment of the stream closes to the airfoil wall with lip 22, compared to lip 23's entrainment of the boundary layer, a better distribution at the inlet and ejector performance is obtained. In one embodiment of the present invention, the ejector can be moved up and down (in the vertical direction to the upper airfoil wall) to optimize the performance. This will allow for a better performance of the airfoil at higher angles of attack and a better performance of the ejector itself, by a better entrainment process. The 3D elements that differentiate this disclosure from prior art include the position of the inlet lips 22 and 23, the relative position of the curved walls 204, the positioning of the throat area 24, and of the diffuser walls 25. In one embodiment, the two halves of the ejector can independently move relative to each other and the airfoil, resulting in a constantly optimized position with respect to the performance of the aircraft.

FIGS. 17A through 17C show a flat ejector placed on the airfoil that forms a wing and having two halves that can move independently (see FIG. 17A) and also an embodiment where only the upper half of the ejector is used similar to an air-knife but forming a throat and a diffuser with a flap of the wing place on the airfoil, matching the performance needed (see FIG. 17B). In these embodiments, the flap may or may not contain primary nozzles, and the flap moves independently from the upper ejector half, also described as an airknife. The advantage of such a system is that it is simpler, it still allows high angles of incidence on the wing as explained in current disclosure by avoiding the wing stall via ingestion of the boundary layer, and the potential to rotate independently the flap and the airknife for optimized performance and maneuverability.

In particular, FIG. 17A shows the embodiments of a flat ejector as described above with elements such as dimples onto a wing behind the apex of the wing and such that it mostly ingests the boundary layer above the upper surface of the wing. FIGS. 17A through 17C, on the other hand, show the use of an air knife type of ejector which forces ingested air (as secondary fluid) from above the wing to accelerate and propel the aircraft forward. In all these embodiments the ejectors may swivel. Moreover, in another embodiment, the ejectors' inlets may also swivel in a limited manner, but their diffusor walls can extend as further explained in FIG. 14, changing angles, areas of exhaust, etc. as dictated by the conditions of flight. 1401 and 201 can independently rotate around axes 102 and 202 respectively.

Fluidic Propulsive System and Cycle.

Yet another embodiment of the present invention relates generally to a propulsive cycle and system that provides thrust via fluidic momentum transfer. The propulsive system consists of a 1) gas generator that provides several streams of high pressure air or gas sources to 2) conduits network that direct the said compressed fluids to 3) augmenting thrust generation elements installed on the aircraft at various stations. The augmenting thrust generation elements direct a high speed efflux jet with mostly axial direction velocity component in the desired direction, hence generating an opposing thrust force. The efflux jet is a mixture of hot, high energy gases, provided to the thrust generating element via conduits from the high pressure gas generator locations such as compressor bleeds, combustion bleeds, turbine bleeds and/or exhaust nozzle, and is such engineered to entrained surrounding air at very large rates of entrainment. The entrained air is brought to high kinetic energy level flow via momentum transfer with the high pressure gases supplied to said thrust generating element, inside the thrust generating element; the resulting mixture of air and gas emerges out of the thrust generating element and pointing mainly in the axial direction, towards the said thin airfoil leading edge and mainly pressure side of the airfoil preferably in the direction to maximize lift on said downstream airfoil.

FIG. 29 illustrates one embodiment of the present invention, featuring the propulsion device in VTOL configuration. The ejectors 801 and 901 are oriented downwards and the thrust is moving the aerial vehicle upwards. The ejectors are rotating in sync and flow of primary fluid is modulated to match the need of thrust to forward and aft ejectors from compressor bleeds for the ejectors 801 and exhaust gas for ejectors 901.

The most efficient conventional propulsion system for medium and long distance aircraft engines is the high by-pass turbofan. Conventional turbofans employ at least two shafts, one common to the fan and low pressure turbine, and one common to the core, which may consist of a booster, a high pressure compressor and a high pressure turbine. The high efficiency of a turbofan is driven by high by-pass ratio, low Fan Pressure Ratios to determine a high propulsive efficiency; and by high Overall Pressure Ratios, for high thermal efficiency. The specific fuel consumption of the aircraft is inversely proportional to the product of thermal and propulsive efficiencies. The thermal losses in a turbofan are mainly due to combustion and thermodynamic losses in components such as the compressor, turbine and mechanical efficiencies that are less than 100%. The combustion process irreversibility is, in general, the major component leading to lower thermal efficiency and typical high pressure ratio power plants are only 40% thermally efficient. Practicality and other aircraft limitations (weight, drag, etc.) prevent implementation of methods known in the art for thermal efficiency improvement, such as intercooling, heat recovery and other.

The propulsive efficiency is maximized, on the other hand, when the propulsor accelerates a largest amount of air mass flow at small axial velocity, just above and as close as possible to the airspeed of the aircraft. This results in the need of having very large fan diameters and high fan speeds, increasing the drag and the weight of the aircraft. Currently, the most and highest efficiency turbofan is very large as the diameter of the fan is exceeding 11 feet in size. While the increased fan diameter improves the propulsive efficiency, the drag increases due to size of the cowling and a trade-off is generally performed to obtain the ideal system. Current levels of propulsive efficiency exceed 85% and efforts are dedicated to distribute thrusters on wings to maximize it. One popular idea in the art is the concept of distributed propulsive elements. The thrusters may be distributed on wings and fuselage of the aircraft. Mostly they are electrically or mechanically driven fans placed on wings, and receiving the mechanical work or electric power from a central unit. Such concepts are hard to implement due to complexity of the network involved, the weight of the electric motors and their operability at high altitudes, and in case of mechanical transmission networks, efficiency, complexity and weight. The dominant design remains the two engine design.

One disadvantage of the current dominant design is that the turbofan is heavy and complex. More than 30% of its total weight is the fan system alone, including the fan accessories and the low pressure turbine that drives it. Large rotating parts means that additional design limitations exist, including limitations in tip speed, constrains on the lower pressure turbine weight and dimensions, as well as inlet temperatures to the Low Pressure Turbine. The fan blade needs to qualify and be certified in dedicated Fan Blade Ingestion and Fan Blade Out tests. In addition, the fan case needs to contain the liberation of such fan blades and protect the integrity of the aircraft. With smaller systems, the challenge of scaling down a complex turbofan system is significant, if efficiency is to be maintained. Particularly for UAVs and small aircraft, the By-Pass Ratio (BPR) levels are much smaller due to limitations in materials. As they shrink in diameter, fans need to spin faster to retain their efficiency, and tip losses occur at higher speeds driving lower efficiency. For small turbofans, the challenge is that scaling down the fan (and compressor) means that the rotational speed has to increase dramatically. Those familiar with the art understand that the diameter of a fan scales directly proportional to the square root of the mass flow of fluid, while the blade tip speed of the fan is directly proportional to the product of the diameter and the rotational speed (e.g. Pi*Diam*RPM). Hence, if the diameter of the fan is reduced significantly then conversely the rotational speed needs to increase to preserve the same tip speed (for mechanical and compressibility reasons), otherwise the losses in performance increase significantly. For example, if a 50 inch diameter fan spins at 2000 RPM, for same tip speed a 20 inch fan needs to spin at 5000 RPM, and a 10 inch fan would spin at 10000 RPM and so on. This also implies that the Fan Pressure Ratio (FPR) would increase accordingly, driving a lower efficiency of the fan in the smaller diameter range. In addition, containment of such a highly stressed fan component would be difficult to attain and it would incur a thicker fan case, driving up the weight, and it would drive significant complications with respect to the rotor dynamics of the system and its bearing subsystem. This is why large fans are much more efficient than smaller fans. The status quo of small turbofans is significantly less performing than larger systems, at least 3-4 times lower than large fans BPRs and with higher FPRs, driving low efficiencies (high fuel burn), high rotating speeds (high stress and maintenance) and challenging operability and thermal management. Turboprops face the same challenge, albeit for really small systems they have the best propulsive efficiency. Their main disadvantage is the large size of the propellers needed to move massive amounts of air and making it difficult to implement in systems with VTOL capabilities. The modern turboprop uses a low pressure turbine to drive the propeller and employs additional auxiliary systems such as gears and bearings and their sub-systems, pitch control and other.

Another element of modern, aircraft propulsion jets such as turbofans and turboprops is that a certain amount of bleed air is required off the compressor for cabin pressurization, turbine cooling and discharge overboard for operability of the engine itself. The compressor bleed air of a typical, modern jet engine is up to 20% of the total compressor discharge air. The compressor bleeds destined for cabin pressurization are not needed if the aircraft flies at low altitudes or is unmanned, and this portion constitutes at least 10% of the total bleed. If the turbine is not cooled, then another circa 10% of the compressor air could be extracted before it reaches the combustion, at the expense of lower firing temperatures and hence cycle efficiency. However, with the advance of new non-metallic materials and their high temperature and stress capabilities, the turbine and indeed, most of the hot section may be manufactured out of ceramic matrix composites, not only eliminating the need for cooling air but also allowing for higher firing temperatures. For example, while the turbine inlet temperature limitation with current, uncooled metal components is known by those familiar with the topic to be about 1750 F, current CMC materials could support uncooled 2000 F turbine firing temperature or more. This results in a much higher efficiency cycle and in most cases a reduced weight of the engine, with overall benefits to the aircraft. If a 1750 F firing temperature cycle, uncooled, all-metal components engine with 20% compressor bleed air is replaced by a 50% air bleed compressor firing at 2000 F with ceramic components, then the efficiency of the cycle may be comparable, while 50% of compressed air is made available for other purposes, at the compressor discharge station.

TABLE 1 shows such a comparison for various air bleeds for two uncooled engines with same unit flow (i.e. lkg/s) and various bleed percentages and same power output of the turbine supplying the required input power to the compressor. The first line shows the pressure ratio of the cycle, the second line shows the compressor bleed, the metallic engine thermal efficiency calculation is shown on line 3 and the thermal efficiency of the CMC versions with similar bleeds and maximum bleed at same efficiency compared with the metallic version are shown in the last two lines. The general assumption is that the turbine is uncooled in all cases, but air is bled off the compressor for other purpose. The table shows that if the bleed percentage is maintained the same between the metallic and the CMC versions, then at a cycle pressure ratio beyond 8, the CMC engine becomes more efficient. Conversely, if the efficiency of the engine is to be maintained similar to the metallic one, the bleed air percentage can be increased dramatically. This can also be explained by maintaining the same fuel flow to the combustion but reducing the flow of air until the firing temperature becomes 2000 F (CMC uncooled technology) from 1750 F (maximum metallic uncooled technology). By producing the same power outlet from the turbine to balance the compressor power inlet, more compressor air can be made available for higher firing temperatures. Based on this, the inventor has conceived a cycle which allows a large quantity of compressor bleed to be routed via a flow network and to supply an array of distributed augmenting thrust devices placed in locations that enhance and improve current state of the art propulsive efficiency, at similar or better thermal and overall efficiency of the aircraft.

TABLE 1

| | PR cycle | | | |
|---|---|---|---|---|
| | 4 | 6 | 8 | 15 |
| Compressor Bleed | 37% | 43.5% | 44.5% | 42.2% |
| 1750 F. uncooled metallic turbine engine efficiency | 24% | 26% | 27% | 29% |
| 2000 F. uncooled CMC turbine engine efficiency | 24% | 27% | 28% | 31% |
| 2000 F. uncooled CMC engine compressor max bleed for same efficiency as metallic turbine | 44% | 49% | 50% | 45% |

Accordingly, conventional propulsors cannot be scaled down without significant compromise to their efficiencies. One embodiment of the present invention overcomes the current shortcoming through the use of an improved cycle which eliminates the fan subsystem together with the low pressure turbine. As such, this embodiment of the present invention a system particularly suited for smaller aircraft systems and UAVs, particularly those that need to be capable of VTOL and STOL operation, because of its efficient, compact and highly integrated power plants.

The propulsor consists of a "chopped" fan and high pressure compressor placed on the same shaft with a high pressure turbine to form a gas generator, a network of conduits connected to ejectors and the thrust augmenting ejectors. The cycle utilizes a compressor system consisting of a chopped fan (core only pre-compression) and a high pressure single or multistage compressor, preferably a centrifugal compressor with several bleed ports. The compressor bleed ports may bleed up to 50% of the total airflow in the system, with the remainder being directed to a combustor system. The combustion adds heat in the form of a fuel at constant pressure or volume, and generates a hot stream of gas that is directed towards a turbine. The high pressure turbine expands the hot fluid to a pressure and temperature lower that the turbine inlet pressure and temperature in a conventional expansion process. Preferably, the turbine and the combustion are high temperature materials that need little or no cooling flows, such as modern CMCs. The turbine, which can be either centripetal or axial in at least one stage, supplies the work needed to drive the compression system. The exhaust gas leaving the turbine is at lower pressures and temperatures than the inlet conditions to the turbine, but at least twice the pressure of the ambient air and at temperatures typical of current turbofan low pressure turbine levels, i.e. 1500-1800 F. Thus, the expansion process of the high pressure turbine still results in a high energy, high temperature and pressure flow that instead of being directed to a low pressure turbine, is directed via conduits to various location of the aircraft to a fluidic thrust generation propulsor.

The conduits may also be insulated and utilizing high temperature materials such as CMCs. The propulsor elements which are receiving the pressurized air or hot gases are employing fluidics for the entrainment and acceleration of ambient air in a first section; and after mixing the motive fluid and ambient air and completing a thorough momentum transfer from the high energy to the low energy (ambient air), accelerating the mixed flow in a second, diffusing section, thus delivering a high speed jet efflux as a mixture of the high pressure gas (supplied to the propulsor from a gas generator) and entrained ambient air at high speeds, preferably and mostly in axial direction, with a certain axial velocity profile known in the art. The entrainment rates of said propulsor elements are between 3-15 and up to 25 per each part of high pressure fluid delivered. Due to high entrainment and turbulent, thorough mixing of the flows, the jet efflux is accordingly much lower in temperature. Following the law of physics with respect to mixing and momentum transfer, the velocity of the jet efflux from the propulsor element is close to but exceeding the aircraft airspeed. The jet efflux is also non-circular in nature, with little or no rotational components (as opposed to the large propellers of a turboprop or even a turbofan) and can be directed to airfoils to further recover some of its energy after producing thrust, for example, directed towards the leading edge of a short wing placed at certain distance behind the propulsor to generate additional lift. In all embodiments, the gas generator is a modified turbofan where the fan has been chopped to provide only core flow.

FIG. 26A shows a traditional bypass turbofan which bypasses most of the flow and mixes the core and bypass flows at the exit of the turbofan. FIG. 26B shows the turbofan with a chopped fan allowing for the core only and bleed flows off the compressor to produce the thrust needed for propulsion. The bleeds off the compressor are conveniently located throughout the cold section 2601 of the gas generator 800, as opposed to a hot section 2602 of the generator, such that it allows for maximum efficiency at any time during the operation. For example, at take-off, more bleed off the compressor may be required and a higher speed of the rotor may be optionally advantageous. In this portion of the mission the bleed ports are open such that the compressor operation is away from the surge line in a more advantageous condition than if no bleed was present. A current turbofan such as presented in FIG. 26A may only allow for a maximum of 15% bleed throughout the mission, but by changing the chopped fan design in favorable ways, more core flow and more bleed off the compressor may be induced in the present invention, up to and including 50% bleed of total air traversing the engine. Multiple bleeds may also be involved, to enhance efficiency of the system, maximizing the bleed at lower stages and minimizing the bleeds at higher pressure, as those who have the skills of the art would recognize. However, the amount of flow purposely involved in the cycle for bleeding only is particularly applied in this invention. The bleed air off the compressor bleed ports is directed via conduits to the propulsors for augmented thrust, placed in conjunction with the upper surface of an airfoil or immediately behind an airfoil at high angle of incidence.

FIG. 27A illustrates an example of a bleed and conduits network embodied in the present invention. The network contains a gas generator 800 that feeds several cold thrust augmenting ejectors 801 and hot thrust augmenting ejectors 901 via compressor bleed ports 251 and 351 respectively. Pressure and temperature sensors may take flow measurements as signals from elements 1702 (cold) and 1707 (*hot*) are fed to the micro-controller 900 (not pictured). The flow from the gas generator 800 to the thrust augmenting ejectors 801 via compressor bleed conduits 251 is dictated by control valves 1703, controlled by the micro-controller 900. The same controller dictates the actuation of the swiveling joints 1701 (for element 801) and 1705 (for element 901.) FIG. 27A further shows a series of four (4) cold thrust augmenting ejectors 801 being fed from the same ports 251 of the compressor of the said gas generator 800 and controlled by the micro-controller 900.

FIG. 27B depicts a similar network as illustrated in FIG. 27A, but with only two cold thrust augmenting ejectors being fed by the compressor bleed ports off the gas generator 800. Swiveling joints 1701 allow for rotation of the elements 801 in multiple directions and may also allow for the passage of the fluid to the said ejector 801. The position of said ejector with respect to the aircraft is controlled via electric or pneumatic or mechanical means from a micro-controller 900. Sensors 1702 for measuring the flow rate, pressures and temperatures in the conduit downstream of bleed port 251 are used to feed the information to the micro-controller. In turn, the micro-controller commands the rotation of elements 801 around the swiveling joints 1701 at the same time with commanding the adjustment of the flow via the control valves 1703. Similarly, the thrust magnitude and orientation of elements 901 may be adjusted via adjustments in flow rates via the control valves 1707 and orientation adjustments about swiveling joints 1705 until the position of the aircraft is acceptable. The controller is thus being fed information from the propulsion system conduit network, in addition to the gas generator operating parameters and the orientation and magnitude of the thrust on each of the thrust augmentation ejector.

FIG. 27C shows the micro-controller 900 and its network, depicting at least twelve (12) inputs and at least four (4) outputs. The outputs control mainly the flow rate and the thrust (ejector) orientation to control the attitude of the aircraft at any time in its mission.

FIG. 27D offers more details of the network. The flows from compressor bleed ports 251 and exhaust 351 are being fed to thrust augmenting ejectors 801 and 901. Inputs to the micro-controller 900 include the parameters of the gas generator (rpm, compressor bleed air temperature and pressure, exhaust pressure and temperature, etc.) via input 10. Inputs 26 include the feed from accelerometers included in the system. Input 30 is the gyroscope. Input 40 is an ultrasonic or barometric altitude sensor input signaling the altitude of the aircraft. Input 50 is the GPS input. Inputs 70 are the Bluetooth input. Inputs 80 are the R/C receiver.

In addition, FIG. 27D illustrates feedback from sensors on the conduits, shown as feed information 2702 and 2706, to the controller for adjustments of the flow via actuation of the control valves 1703 and 1707. The control valves are connected to the controller via cables 2703 and 2707 respectively, and they adjust based on the input received from the controller. The flow is adjusted and measured accordingly by the sensors 1702 and 1706, which provide feedback information to the controller to signal that adjustment was made accordingly. Similarly, the other sensors 10, 26, 30, 40, 50, 60, 70 and 80, either individually or together, are processed by the controller and adjustments of the ejectors 801 and 901 positions are transmitted via cables 2701 and 2705.

Figure 28A:
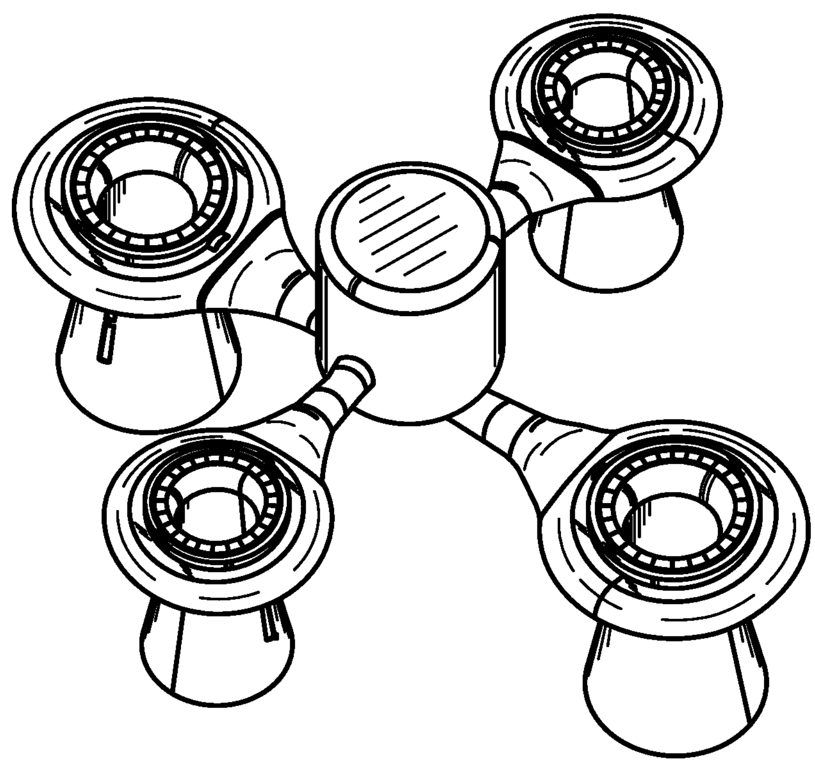
Figure 28A:
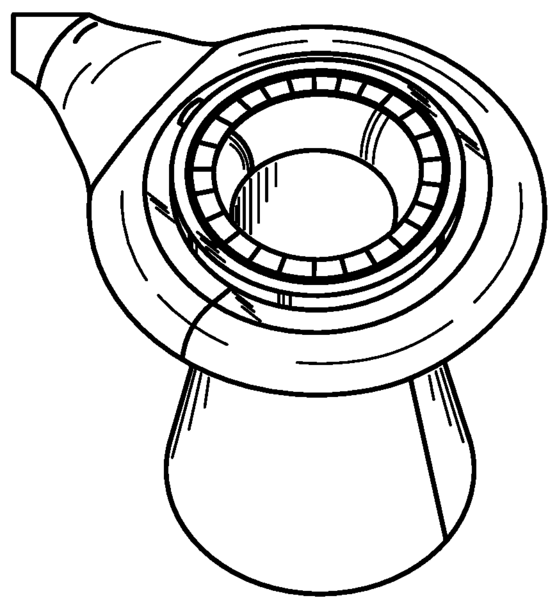
Figure 28B:
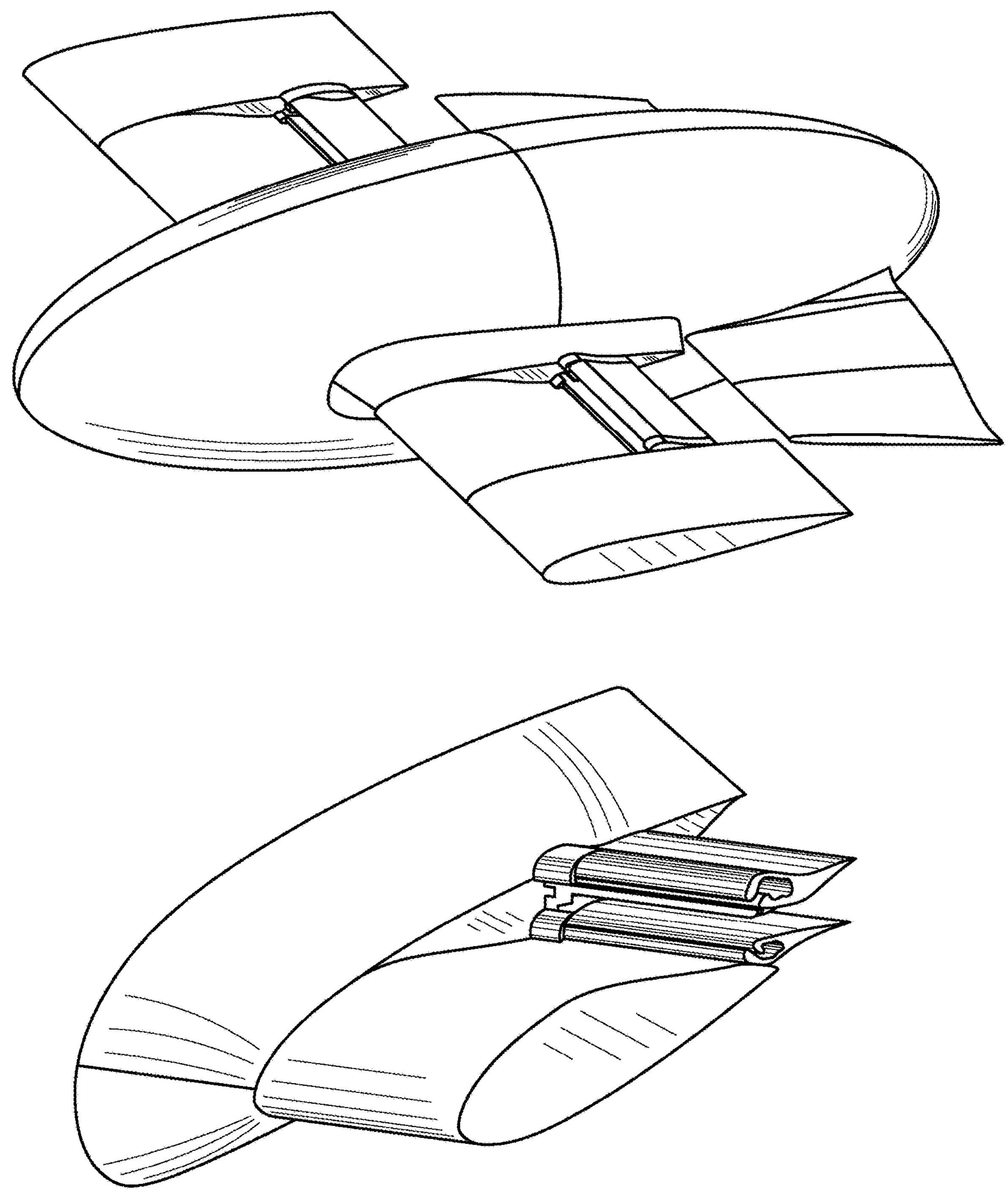
Figure 28C:
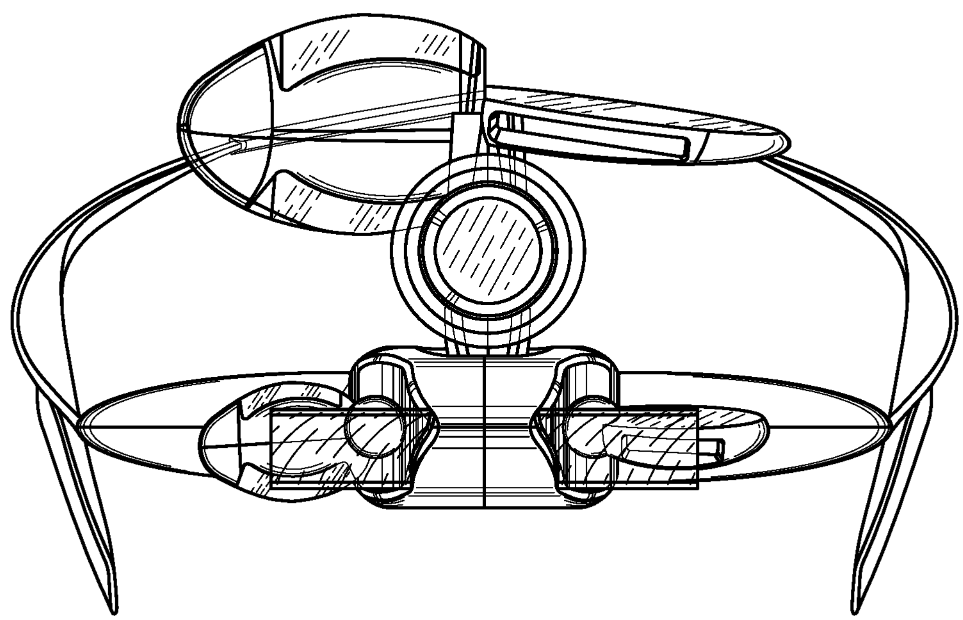
Figure 28C:
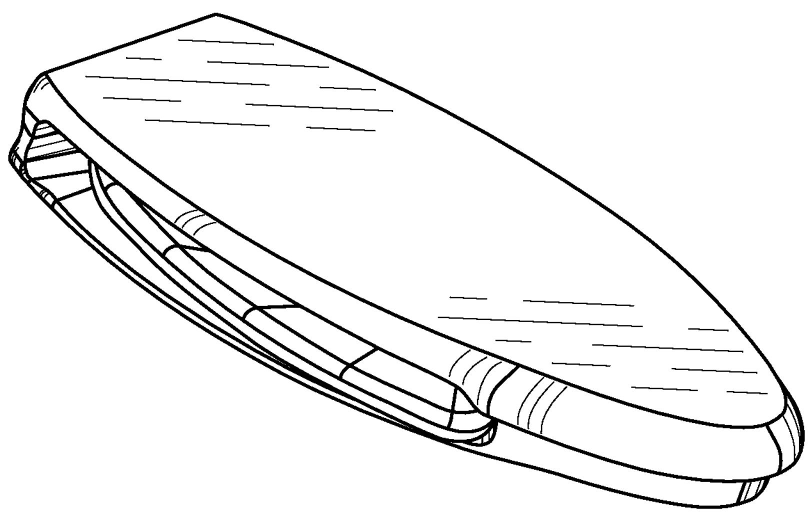
Figure 28D:
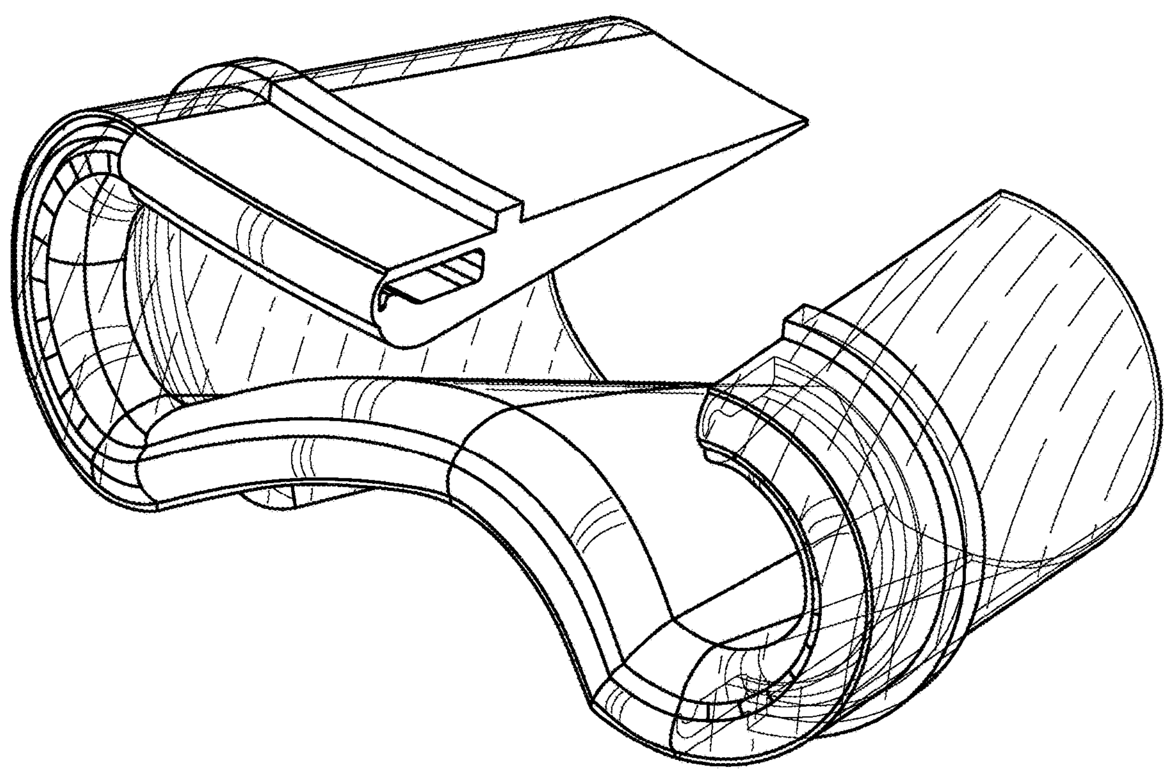
Figure 28E:
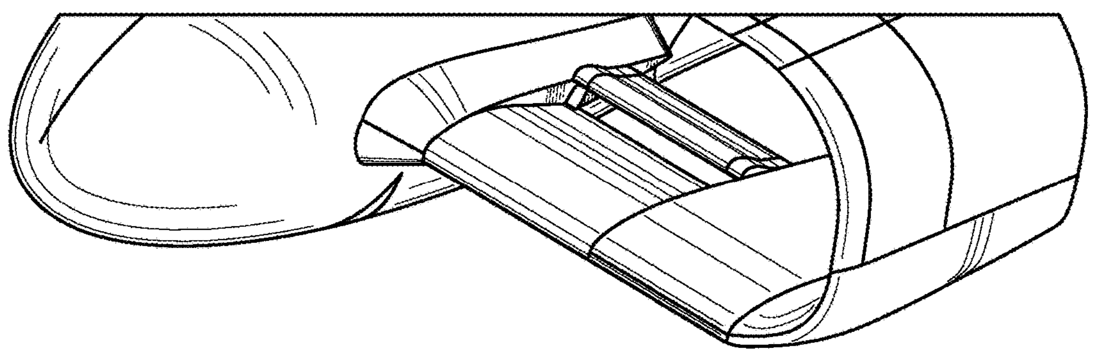

In another embodiment of the present invention, the propulsor can be swiveled downwards to direct the thrust for changing the attitude of the aircraft for vertical take-off or short take-off. FIGS. 28A-28E show possible shapes of a propulsor in the present invention. FIG. 28A illustrates a relatively simple quadro-ejector system with the ejectors being fed by a gas generator in the center. Two of the ejectors (cold) are fed from the compressor bleed ports with compressed air as motive (or primary) air, while the hot ejectors receive exhaust gas from the exhaust port of the gas generator. All four ejectors point downwards, in hovering mode, but adjustments of the attitude of the aircraft is possible via changes in parameters mentioned in FIGS. 27A-27D. FIG. 28B shows an embodiment of the present invention in which the device(s) can be embedded in an aircraft. In FIG. 28B, only the two cold ejectors are shown (out of four). The ejector is flat, and placed behind the apex of the main wing, working to expand the stall margin of the main wing and generate a high-speed efflux for use in downstream lift generating structures. The flat ejector may also rotate along the main axis of the wing for hovering (pointing down towards the ground, mainly) or for adjusting the in-flight altitude. FIG. 28C illustrates a more complex canard-type system consisting of four ejectors (two hot, tail located, and two cold, placed behind the canard airfoils) and the embedded ejector inside the housing system of the canard (cold) ejector side. The ejectors are flat and producing a jet efflux rectangular in shape at their exit plane, mainly in the axial direction of the flight. Alternatively, an ejector having 3D elements is shown in FIG. 28D, where the inlet and throat and diffusor are 3D in nature (rather than 2D), which enhance entrainment and overall performance. Only an upper half of a flat ejector is shown above the wing in FIG. 28E, pairing with the flap of said wing to form a complete structure with the primary fluid only introduced at the upper half of the ejector (a half ejector, paring with the flap of the wing).

FIG. 29 shows one possible arrangement of propulsion system at take-off or hovering in one embodiment of the present invention. The ejectors are pointing downwards to lift the airframe and maintain it in a hovering position.

FIG. 13 shows the maneuverability of a UAV equipped with a propulsion system. Pitch, roll and yaw positioning of the ejectors is shown, both for tail (hot) and cold (canard) ejectors.

In one embodiment of the present invention, the propulsors receiving both the compressor discharge air (at least twice at the ambient air pressure) and hot gas efflux from the high pressure turbine (at least twice the ambient pressure)

are in this embodiment pointing downwards at take-off, hence generating an opposing thrust exceeding the UAV weight for lift-off U.S. Pat. No. 8,087,618 (Shmilovich et al.) discloses the use of such a device embedded in the wing system and utilizing a turbojet engine exhaust for directing the exhaust or compressed air only at take-off and minor portions of the compressor bleed air (less than 15% is mentioned) for additional flow control over a wing. In particular, they are not augmenting thrust but merely redirecting the exhaust stream by controlling it with compressed air during take-off. One embodiment of the present invention utilizes a specially designed power plant that is particularly extracting the bleed air, in excess of 20%, from the compressor and directing it to the said propulsor throughout the flight, from take-off to landing. The particular way this is achieved is by designing a compressor with more open first stages that can accommodate more flow, followed by bleeding of a portion of the flow in large quantities, such as up to 50% of total airflow, and directing this portion at all times to the cold gas propulsors, and utilizing the entire portion of the remainder flow for the thermodynamic cycle with the residual energy of the flow post-high pressure turbine directed to a hot gas propulsor. The compressor bleed flows can also be modulated via employment of flow controls, such as control valves or fluidic valves that modulate the delivery of the flow to propulsors. Both types of propulsors, cold and hot, can be swiveled at least from 90 degrees to 120 degrees pointing down and up compared to the forward direction of flight and independently. The cold gas propulsor may be embedded with or hidden into the wings or preferably in the wake of a very high incidence angle first wing (canard wing) and enhancing its stall margin significantly by placing the inlet of the propulsor in proximity of canard airfoil and preferably in the last third of its chord and closer to the trailing edge. The high incidence angle may cause separation and stall, but the addition of the propulsor at the said location will extend its operability well beyond the stall point.

In another embodiment, the injection of fluids such as water or liquid nitrogen to cool the hot gases delivered to the hot propulsor may increase the take-off thrust generated by said propulsor through increase in mass flow rate of the motive air. In case the propulsion system is embedded into an UAV, the amount of water on board of the aircraft may be such that after take-off, and end of the mission, when the fuel on board has been nearly consumed, the landing will not need the additional thrust by at least 25% and up to 50%.

In yet another embodiment, the use of exhaust gas from the high pressure turbine as primary/motive fluid to the hot ejector may be augmented with additional cold air compressor bleed, particularly to maintain a colder temperature of the mix feed to the primary nozzles of the main hot propulsor, particularly during level flight. In this manner, with the mix at constant pressure and lowering of the temperature of the gas mixture, a longer life and/or cheaper materials may be utilized in the conduits. The modulation of the cold compressor air bleed may be performed via a valve which switches the flow from supplying the cold propulsor to the conduit feeding the hot propulsor, or via a secondary inlet to the plenum of the hot propulsor to extend its life. In this case the cold propulsors become aligned with the main wing system or may be retracted inside the fuselage and hence and do not participate to thrust generation.

The thermodynamic cycle of a typical jet engine is presented in FIG. 30A. The evolution of the working fluid is described from end of the inlet (point 2) to 3 via a compression process, addition of fuel and combustion at constant pressure via an isobaric process from 3-4, expansion over a turbine from 4-5. The latter provides the work required by the compressor and additional energy available for either driving a fan (via a turbine connected to the fan) for a turbofan or direct expansion through a nozzle to atmosphere, in case of a turbojet. This embodiment of the present invention eliminates the free turbine required to drive the fan, connects the chopped fan to the main shaft of the engine and uses the energy of the combustion gases at point 45 to entrain and augment thrust via a specially designed ejector embedded with the aircraft, at all points during the mission of the aircraft (take off, transition, level flight, hovering and landing). The thermodynamic evolution of the invented cycle takes the 45 gases via a nearly isentropic expansion to a lower pressure at high efficiency, much higher than the expansion through a turbine. Process 45-A' describes the evolution and can be recognized as nearly isentropic, as nozzle expansions of this type are known to have very high efficiency. The working fluid evolution 45-A' happens via a multitude of primary slots located within the ejectors described above. The expansion is continued by a constant pressure or constant area mixing with approaching ambient air at $p_{2static}$ conditions. The evolution follows A'-D' for the working fluid, while the ambient air is brought at constant pressure from inlet condition point C to D'. In this process of mixing at constant pressure, the final temperature of the mixture depends on the entrainment ratio of ambient air into the ejector. As described below, a specially designed ejector is utilized in this invention that maximizes the entrainment ratio via several elements of said primary nozzles and mixing section of the ejector to values beyond 5:1 (five parts of entrainment air per each part of primary working fluid). A pumping effect is next, elevating the temperature and pressure of the mixture of hotter, primary fluid and entrained ambient air to $T_{mix}$ and $P_{mix}$ respectively, higher than the $p_{amb}$. This is point D on the diagram of FIG. 30B. A nearly isentropic diffusing and ejecting of the mixture is the evolution D-E, with the final temperature and pressure of $T_{exit}$ and $P_{exit}$ respectively, where $P_{exit}$ is equal to the ambient pressure at the aircraft speed. The point D location is in between point 2 and point 5, closer to point 2 for higher entrainment ratios. The advantage of such as system is then obvious, noting that a large amount of air can be entrained and energized to produce thrust at lower mixture temperature and velocity. This, in turn, allows the exhaust of such thermodynamic cycle to be utilized not only for thrust generation but as well for directing it advantageously over various airfoils for additional lift generation, or vectoring it for VTOL and STOL capabilities of the aircraft, at the exit of the cycle. In addition, the placement of the entrainment inlet of the said ejectors in some embodiments may be such that boundary layer ingestion resulting from an airfoil such as a wing results, with additional benefits to the stall margin of aid airfoil wing. In one embodiment, a first set of wing airfoils is such positioned that it operates at very high angle of incidence, with very small margin to stall. By placing the said ejector right behind the said airfoil apex point, in the area prone to develop separation of the boundary layer, the suction side (i.e. entrainment side or inlet side of the ejector) determines that the stall margin is enhanced significantly, allowing a very high lift generation on said airfoil/wing to be obtained, stall free.

Moreover, in some cases where a short take-off distance is desired, exhaust gas from a turbofan can be directed on the suction side of an airfoil (such as a flap). While several concepts have used this technique, there have been limited results. In this embodiment of the present invention, there is a higher lift proportional to the higher local velocity squared, at least for the portion of the wing exposed to the thrust element emerging jets, because it utilizes the benefits of directing the higher kinetic energy fluid (air of mixture of exhaust gas) directly to the pressure side of the wing or flap, instead of the suction side, or directly to the leading edge much in the fashion of a turbo machinery airfoil (such as a turbine).

In addition, the exhaust of the ejector being at significantly lower temperature and yet higher average exit velocity than the airspeed, may be directed towards a secondary, downstream, thin airfoil as described in FIG. 19D. In FIG. 19D, the ejectors 201 direct their efflux jets towards the airfoils 202 which are thin and may be manufactured out of reinforced composite materials. The higher efflux jet velocity determines a high lift force on the said airfoil compared to the lift generated by the said airfoil 202 would they only receive the airspeed flow of the aircraft. Conversely, the size and shape of the airfoils 202 may be significantly reduced to produce a similar lift force as a very large wing. Reverting now to the inlet of the ejectors 201 and noting their placement right above the airfoil 203, the ingestion of the boundary layer developed past the apex of said airfoil 203 into the ejector and this boundary layer being sucked in by said ejector 201 determines a better stall margin of airfoil 203 and allowing it to operate efficiently at higher angle of incidence.

In another embodiment shown in FIGS. 31A and 31B, the said cold ejectors 801 are placed behind the airfoil 803 and in front of airfoils 802, still impacting both by increasing the stall margin on the 803 due to the suction of the boundary layer of the said airfoil 803 and the lift force due to higher speed of the efflux jet at 801's exit directed efficiently towards the airfoil 802. This allows a more aggressive level flight position of both airfoils 803 and 802, shorter airfoils for same lift and swiveling of the ejector for vertical take-off, hovering and maneuvering of the aircraft. It also allows more beneficial use of the efflux jet of the thermodynamic device to be used towards lift generation and not wasted to the environment, as it is the case for current state of the art jet engines.

While this is not meant to be an exhaustive list, different embodiments of the present invention are designed to provide for some or all of the following improvements and advantages:

Enhance of the ability to maximize the thrust augmentation and vectoring of a jet efflux from a Coanda type flat ejector at all conditions of flight;

Enhance the efficiency and shorten the device for better integration with the wing or fuselage of the aircraft via introduction of particular 3D features in the primary nozzle and Coanda surface;

Embed such a device with a wing to exploit the particular geometries of the wing in order to enhance the efficiency of the aircraft;

Enhance the primary nozzle efficiency to entrain secondary fluid and mix in the shortest period and length of the device via additional features;

Enhance the overall geometry in a non-circular fashion to allow its efficient operation in level flight of the aircraft, in addition to take-off, hovering and landing while enhancing the propulsive efficiency of the aircraft and eliminating the presence of nacelles and main propulsive engines on the wings and fuselage of the aircraft;

Generate additional thrust and lift due to a higher local velocity of the jet over the wing by using the residual kinetic energy of a jet efflux that usually only generates thrust via a mechanical connection;

Shorten the wings while preserving the same lift through extension of the diffusor walls of the propulsor as propulsion and lift generation device;

Improve the ejector to work at better at conditions away from ideal conditions of a fixed geometry ejector (e.g., optimize operations and propulsive thermodynamic cycles through the use of using 2 halves of an ejector, being able to move them relative to each other and adding a flap-like feature to fully expand and collapse the ejector diffusor walls);

Increase lift per wingspan ratio due to relatively low temperature of the jet efflux mixtures emerging from the propulsor and an axial velocity component at higher values than the aircraft's velocity;

Include composites as a type of material used in thin airfoil due to its ability to withstand higher temperatures of the emerging mix jet efflux;

Reduce the overall dimensions and weight of the aircraft because the airfoil can be thinner in width and shorter in wingspan with a high mechanical resistance to stress;

Improve significantly the maneuverability and versatility of an aircraft, including allowing for V/STOL and hovering, via the swiveling and modulating the flow of both the propulsor and airfoil; and/or Enhance the capabilities of aircraft attitude control, hovering and VTOL by allowing for a compact system with small swings and a distributed propulsion system, particularly in UAV, UAS and drones.

Furthermore, in addition to the many features mentioned above, different embodiments of the present invention may also have some or all of the following improvements and advantages:

The thermodynamic cycle is simpler, with an ejector/eductor type element replacing the entire fan and low pressure turbine subsystem functionality hence reducing the weight of the system by at least 30%. This is particularly advantageous for smaller UAV type systems where the turbofans are not efficient due to reasons explained above;

The potential to swivel or vector the eductor type propulsors independently and to allow for take off and land vertically, without moving large rotating parts;

The potential to modulate the flow to these propulsors during take-off and level flight as well as at landing and emergencies therefore applying different thrust levels at various locations of the aircraft, and to completely isolate any number of the said propulsors;

The potential to eliminate large rotating part components with non-moving parts of same functionality, i.e. fan replaced by fluidic propulsor/eductor; a direct improvement in life of components is expected from non-moving vs. rotating parts, especially for small UAVs and airplanes where the dimensions of the fan require very high speeds;

The potential to use light and high temperature materials such as composite materials, carbon fiber based materials and CMCs for the conduits and propulsors;

The potential to modulate the bleeds such that at level flight only the hot propulsors are supplied with hot gas or a mixture of hot exhaust gas and colder, compressor air bleeds from the gas generator;

The benefit that the gas generator is operated at optionally advantageously same rotational speed without large excursions in RPMs between take off and cruise, far away from the surge or stall line;

The benefit of giving any shape to the propulsor and able to integrate greatly with the fuselage and wings of the aircraft;

The benefit of having large entrainment and turbulent mixing inside said propulsors such that the jet efflux from their exhaust is low enough in temperature to allow an airfoil for lift or attitude control of the aircraft to survive and function properly including generating more lift using the higher velocity jet; and/or The benefit of embedding the propulsor into the wing behind the wing's camber apex whereabouts the boundary layer would otherwise separate at high angles of incidence, thereby ingesting said boundary layer and delaying its separation and increasing the tall margin of the said wing at level flight.

It should be noted that any of ejectors 701, 801, 901 can be configured using any ejector geometry described herein.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A vehicle, comprising:

a main body having a fore portion, a tail portion, a starboard side and a port side;

a gas generator coupled to the main body and producing a gas stream;

at least one fore conduit fluidly coupled to the generator;

at least one tail conduit fluidly coupled to the generator;

first and second fore ejectors fluidly coupled to the at least one fore conduit, coupled to the fore portion and respectively coupled to the starboard side and port side, the fore ejectors respectively comprising an outlet structure out of which gas from the at least one fore conduit flows at a predetermined adjustable velocity;

at least one tail ejector fluidly coupled to the at least one tail conduit and coupled to the tail portion, the at least one tail ejector comprising an outlet structure out of which gas from the at least one tail conduit flows at a predetermined adjustable velocity;

first and second primary airfoil elements having leading edges, the primary airfoil elements respectively coupled to the starboard side and port side, the leading edges of the first and second primary airfoil elements being respectively located directly downstream of the first and second fore ejectors such that the gas from the fore ejectors flows over the leading edges of the primary airfoil elements; and at least one secondary airfoil element having a leading edge and coupled to the main body, the leading edge of the at least one secondary airfoil element located directly downstream of the outlet structure of the at least one tail ejector such that the gas from the at least one tail ejector flows over the leading edge of the at least one secondary airfoil, wherein the at least one tail ejector has a leading edge, and the entirety of the at least one tail ejector is rotatable about an axis oriented perpendicular to the leading edge.

2. The vehicle of claim 1, further comprising first and second canard wings coupled to the fore portion and respectively coupled to the starboard side and port side, the canard wings configured to develop boundary layers of ambient air flowing over the canard wings when the vehicle is in motion, the canard wings being respectively located directly upstream of the first and second fore ejectors such that the first and second fore ejectors are fluidly coupled to the boundary layers.

3. The vehicle of claim 2, wherein the first and second fore ejectors respectively comprise first and second inlet portions, and the first and second fore ejectors are positioned such that the boundary layers are ingested by the inlet portions.

4. The vehicle of claim 1, wherein the gas generator is disposed in the main body.

5. The vehicle of claim 1, wherein the gas stream produced by the generator is the sole means of propulsion of the vehicle.

6. The vehicle of claim 1, wherein the first and second fore ejectors each have a leading edge, and the entirety of each of the first and second fore ejectors is rotatable about an axis oriented parallel to the leading edge.

7. The vehicle of claim 1, wherein the first and second fore ejectors each have a leading edge, and the entirety of each of the first and second fore ejectors is rotatable about an axis oriented perpendicular to the leading edge.

8. The vehicle of claim 1, wherein the at least one tail ejector has a leading edge, and the entirety of the at least one tail ejector is rotatable about an axis oriented parallel to the leading edge.

9. The vehicle of claim 1, wherein at least one of the outlet structures is non-circular.

10. The vehicle of claim 1, further comprising a cockpit portion configured to enable manned operation of the vehicle.

11. The vehicle of claim 1, wherein:

the gas generator comprises a first region in which the gas stream is at a first temperature and a second region in which the gas stream is at a second temperature, the second temperature higher than the first temperature;

the at least one fore conduit provides gas from the first region to the first and second fore ejectors; and the at least one tail conduit provides gas from the second region to the at least one tail ejector.

* * * * *